US012410969B2

(12) United States Patent

Oh et al.

(10) Patent No.: US 12,410,969 B2

(45) Date of Patent: Sep. 9, 2025

(54) MULTI-JOINT LINK HINGE AND REFRIGERATOR HAVING THE SAME

(71) Applicants: LG ELECTRONICS INC., Seoul (KR); EPTech Co., Ltd., Gyeonggi-do (KR)

(72) Inventors: Changseok Oh, Seoul (KR); Chunho Byun, Gyeonggi-do (KR)

(73) Assignees: LG ELECTRONICS INC., Seoul (KR); EPTECH CO., LTD., Gyeonggi-Do (KR)

(*) Notice: Subject to any disclaimer, the term of this patent is extended or adjusted under 35 U.S.C. 154(b) by 2 days.

(21) Appl. No.: 18/426,807

(22) Filed: Jan. 30, 2024

(65) Prior Publication Data

US 2024/0167757 A1 May 23, 2024

Related U.S. Application Data

(63) Continuation of application No. 17/320,591, filed on May 14, 2021, now Pat. No. 11,920,855.

(30) Foreign Application Priority Data

May 19, 2020 (KR) ........................ 10-2020-0059986

(51) Int. Cl.
*F25D 23/02* (2006.01)
*E05D 3/06* (2006.01)

(52) U.S. Cl.
CPC ............. *F25D 23/028* (2013.01); *E05D 3/06* (2013.01); *E05Y 2900/31* (2013.01); *F25D 2323/024* (2013.01)

(58) Field of Classification Search
CPC ... F25D 23/028; F25D 2323/024; E05D 3/06; E05D 3/16; E05D 2003/166;
(Continued)

(56) References Cited

U.S. PATENT DOCUMENTS 2,674,761 A 4/1954 Weiss
5,497,534 A 3/1996 Caruso
(Continued)

FOREIGN PATENT DOCUMENTS

CN 101111655 1/2008
CN 201050256 4/2008
(Continued)

OTHER PUBLICATIONS

CN110094127 translation (Year: 2019).*
(Continued)

*Primary Examiner* — Hiwot E Tefera

(74) *Attorney, Agent, or Firm* — KED & ASSOCIATES, LLP

(57) ABSTRACT

A multi-joint link hinge may include hinge bracket provided with a base in which a plurality of screw coupling holes are defined, a plurality of side walls which protrude from the base and are spaced apart from each other in a vertical direction, a plurality of link modules which are vertically arranged between the side portions and axially coupled to the hinge bracket by a rotation shaft, and a door bracket which is axially coupled to each of the plurality of link modules.

19 Claims, 37 Drawing Sheets

(58) Field of Classification Search
CPC ... E05D 2011/0072; E05D 3/14; E05D 11/00; E05Y 2900/31; E05Y 2201/686
USPC .......................................... 16/366, 368–370
See application file for complete search history.

(56) References Cited

U.S. PATENT DOCUMENTS

| | | | |
|---|---|---|---|
| 7,197,790 B1 | 4/2007 | Edmondson | |
| 8,807,673 B2 | 8/2014 | Benigni | |
| 8,844,097 B2 | 9/2014 | Bonomie et al. | |
| 10,876,335 B2 | 12/2020 | Byun | |
| 11,459,810 B1 | 10/2022 | Smith | |
| 11,661,781 B2 | 5/2023 | Kikuchi | |
| 2002/0166208 A1 | 11/2002 | Kondo | |
| 2005/0251962 A1 | 11/2005 | De Mello et al. | |
| 2007/0256447 A1* | 11/2007 | Leimkuehler | E05D 15/505 62/440 |
| 2010/0125970 A1 | 5/2010 | Leimkuehler et al. | |
| 2010/0127514 A1 | 5/2010 | Nilsson | |
| 2010/0269293 A1* | 10/2010 | Wisniewski | E05D 3/14 16/382 |
| 2013/0219797 A1 | 8/2013 | Bonomie et al. | |
| 2014/0201948 A1 | 7/2014 | Dubach | |
| 2017/0045287 A1 | 2/2017 | Liu | |
| 2017/0108266 A1 | 4/2017 | Kim | |
| 2018/0283077 A1 | 10/2018 | Lee | |
| 2019/0101320 A1 | 4/2019 | Dherde | |
| 2019/0368247 A1 | 12/2019 | Carbone | |
| 2020/0208450 A1 | 7/2020 | Ferreira | |
| 2020/0340279 A1 | 10/2020 | Kikuchi | |
| 2021/0148628 A1 | 5/2021 | Lottinville et al. | |
| 2021/0238902 A1 | 8/2021 | Byun | |
| 2021/0364223 A1 | 11/2021 | Oh et al. | |
| 2022/0018591 A1 | 1/2022 | Kikuchi | |

FOREIGN PATENT DOCUMENTS

| | | | |
|---|---|---|---|
| CN | 101663451 | 3/2010 | |
| CN | 105637307 | 6/2016 | |
| CN | 105910372 | 8/2016 | |
| CN | 108278841 | 7/2018 | |
| CN | 208605065 | 3/2019 | |
| CN | 110094127 A * | 8/2019 | E05D 3/06 |
| CN | 110374436 | 10/2019 | |
| CN | 210239421 | 4/2020 | |
| DE | 10239599 | 4/2003 | |
| EP | 0565900 | 10/1993 | |
| EP | 2754982 | 7/2014 | |
| WO | WO 2008/050975 | 5/2008 | |
| WO | WO 2014/154252 | 10/2014 | |
| WO | WO-2017089340 A1 * | 6/2017 | E05D 5/046 |
| WO | WO 2019/117236 | 6/2019 | |

OTHER PUBLICATIONS

European Search Report issued in Application No. 21173946.1 dated Oct. 18, 2021.

European Search Report dated Jan. 31, 2022 issued in Application No. 21174248.1.

Chinese Office Action dated Jul. 22, 2022 issued in Application No. 202110516216.3.

Australian Examination Report dated May 19, 2022 issued in Application No. 2021203213.

U.S. Office Action dated Mar. 28, 2023 issued in parent U.S. Appl. No. 17/320,591.

U.S. Office Action dated Sep. 11, 2023 issued in U.S. Appl. No. 17/324,470.

U.S. Office Action dated Dec. 21, 2023 issued in U.S. Appl. No. 17/324,470.

* cited by examiner

MULTI-JOINT LINK HINGE AND REFRIGERATOR HAVING THE SAME

CROSS-REFERENCE TO RELATED APPLICATIONS

This application is a Continuation application of U.S. patent application Ser. No. 17/320,591 filed May 14, 2021, which claims priority under 35 U.S.C. § 119 to Korean Application No. 10-2020-0059986 filed on May 19, 2020, whose entire disclosure is hereby incorporated by reference.

BACKGROUND

1 Field

The present disclosure relates to a multi-joint link hinge used in furniture, home appliances, and a refrigerator.

2. Background

Refrigerators are home appliances that store food or other items (hereafter "food") at a low temperature. A storage space inside the refrigerator where the food is placed may be covered by a door and be cooled using cool air. The cool air may be generated by being heat-exchanged with a refrigerant circulated in a refrigeration cycle.

The storage space may be partitioned into an upper storage space at an upper side and a lower storage space at a lower side, which may be opened and closed by an upper door and a lower door, respectively. An upper end and a lower end of each of the upper and lower doors may be supported by a hinge device to be rotatably mounted such that the upper and lower storage spaces may be opened and closed by rotation of the upper and lower doors.

Korean Patent Publication No. 10-2016-0099982 discloses an intermediate hinge provided on a front surface of a main body, and a rotation shaft that vertically extends from a horizontal support portion that protrudes between an upper door and a lower door to support a lower end of the upper door and an upper end of the lower door. Since an interference between adjacent objects (e.g., a wall surface or furniture) may occur when the door rotates due to a thickness of the door, the refrigerator may be installed to protrude more than the adjacent lateral objects or to be spaced a predetermined distance from the adjacent lateral objects to reduce or prevent interference. The refrigerator having such a structure may have limited installation configurations that do not provide a sense of unity with the adjacent surroundings. For example, the refrigerator having the above structure may not be able to be configured as a built-in type or otherwise installed to be continuous with adjacent furniture or home appliances.

To solve this limitation, a hinge device has been developed. The developed hinge device rotates so as not to interfere with adjacent objects when the door of the refrigerator rotates. Korean Patent Registration No. 10-1497295 discloses a multi-link hinge having a rotation structure that has multi-joints such that a door mounted with the multi-link hinge does not interfere with adjacent objects. However, the disclosed structure is relatively thick and has a large width, and when a pair of hinges to support upper and lower doors are provided between upper and lower doors of a refrigerator, due to a size of the hinge, a capacity of each of the upper and lower storage spaces may be reduced. A vertical interval between the upper and lower doors may be widened, and the hinge may be exposed due to this wide interval, which comprises an appearance.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
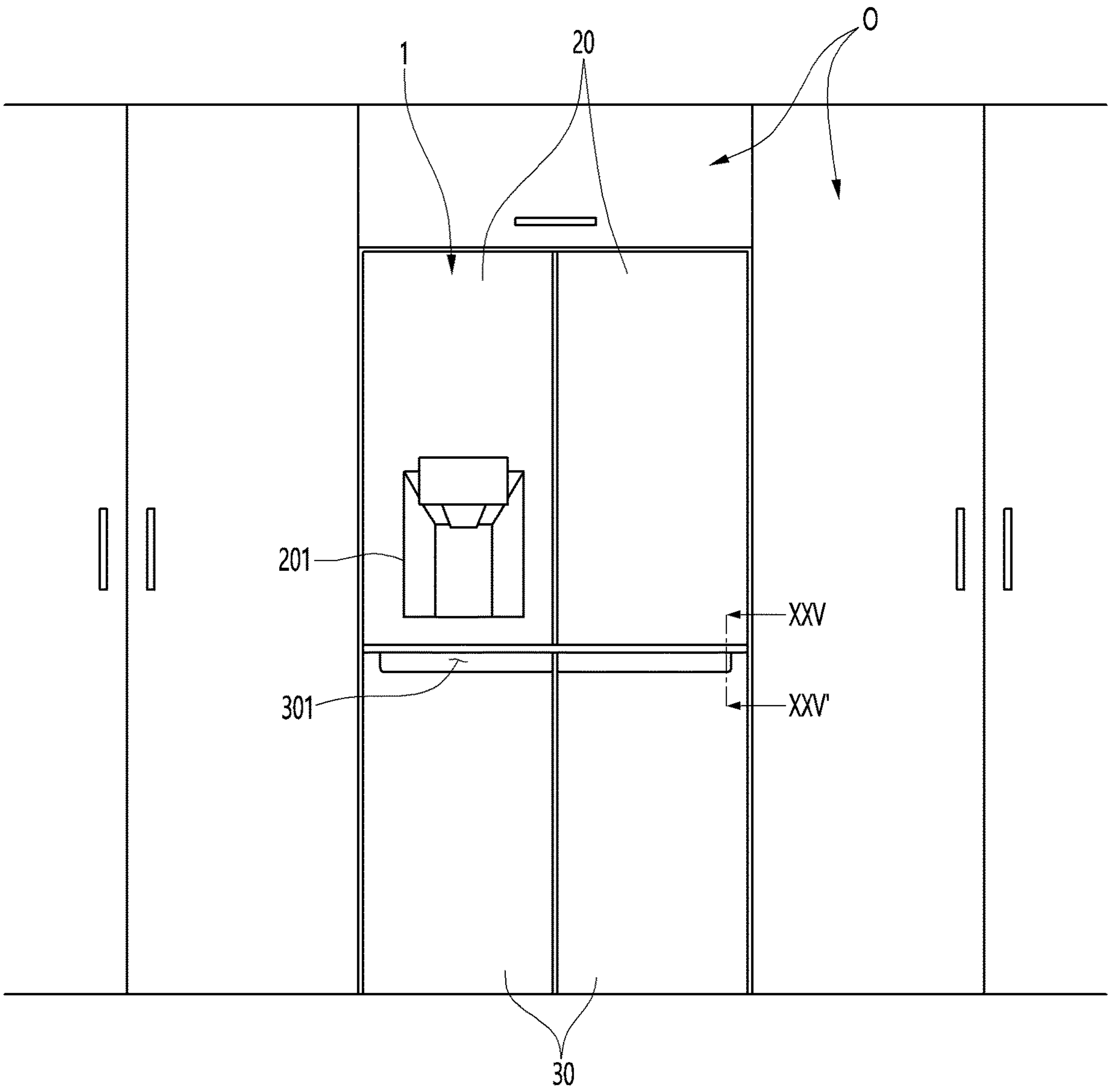
FIG. 1 is a perspective view illustrating a state in which a refrigerator is installed according to an embodiment.
Figure 2:
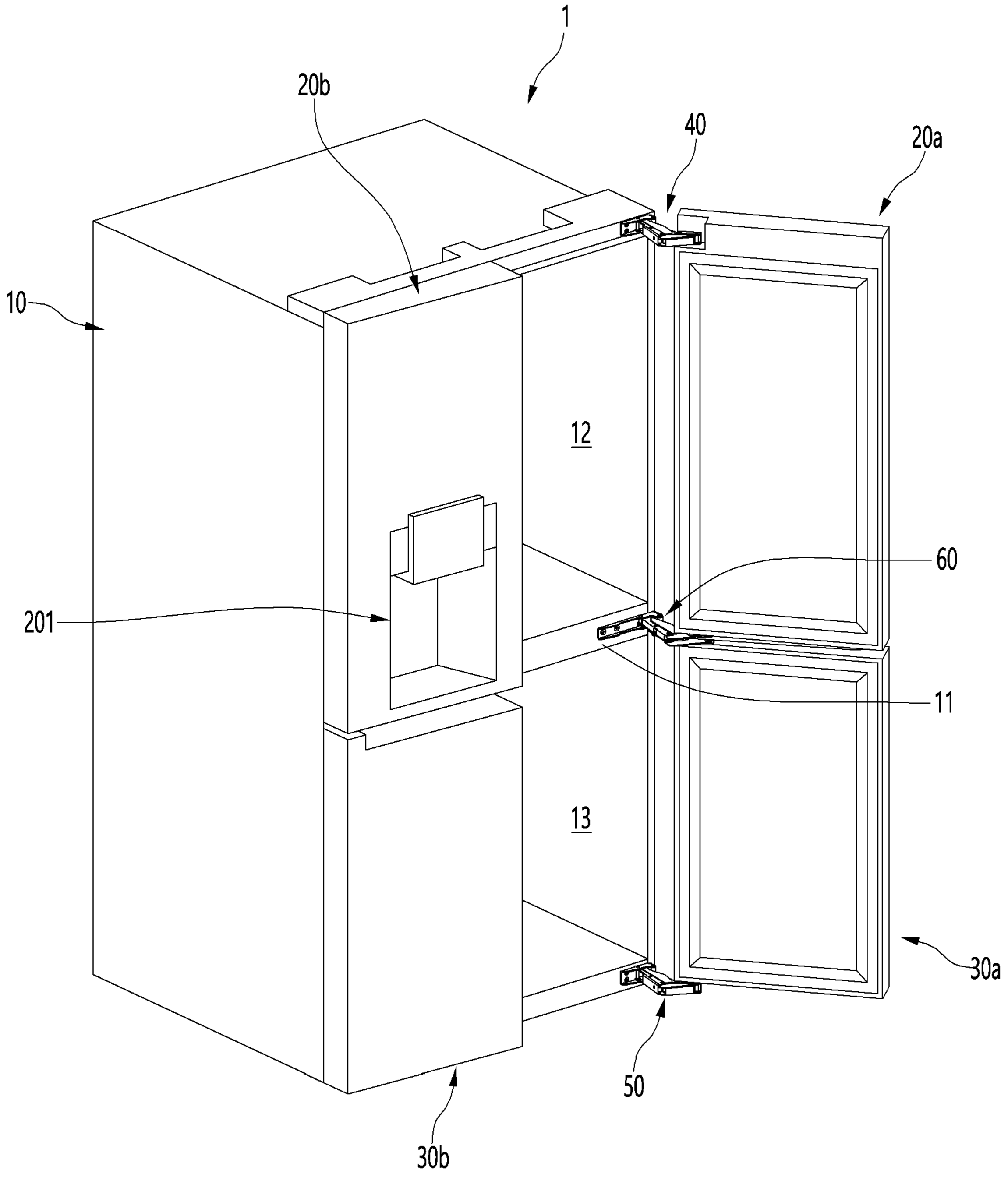
FIG. 2 is a perspective view illustrating a state in which an upper door and a lower door of the refrigerator are opened.
Figure 3:
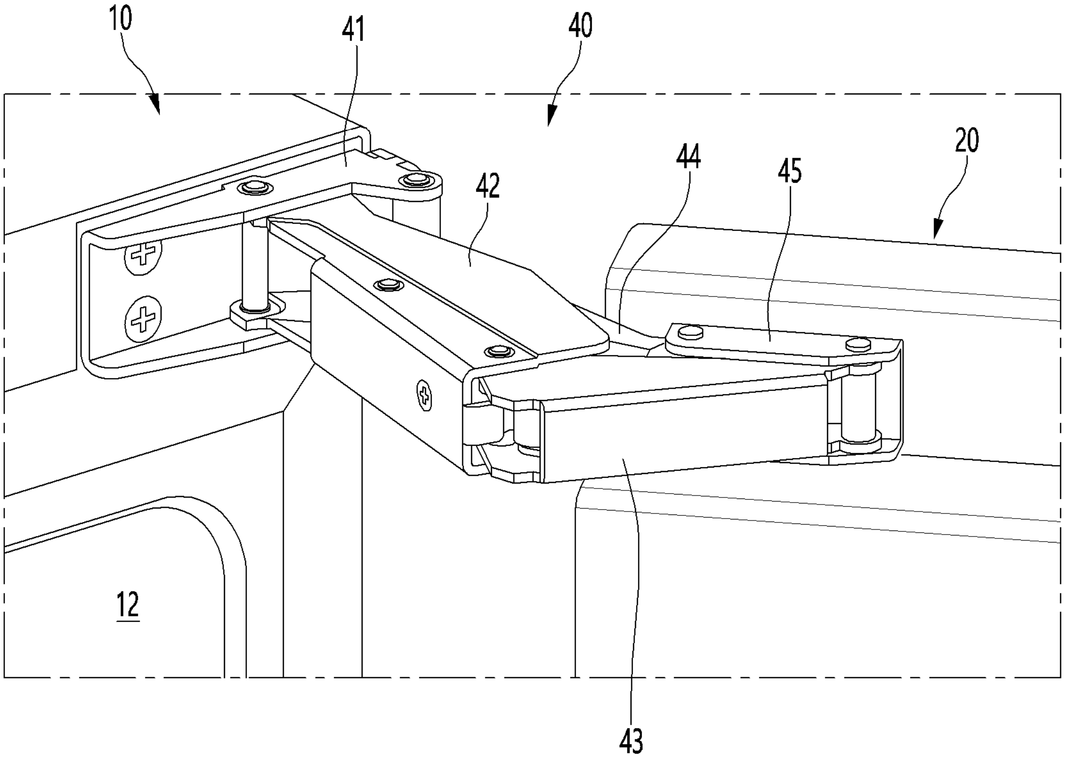
FIG. 3 is a partial perspective view illustrating a state in which an upper hinge is mounted according to an embodiment.

Referring to FIGS. 1-2, a refrigerator 1 according to an embodiment may include a cabinet 10 defining a storage space. The storage space may have an opened front surface, and a door may open or close the storage space at the opened front surface. An outer appearance of the refrigerator 1 may be defined by the cabinet 10 and/or doors 20 and 30.

The refrigerator 1 may be installed or mounted so as to blend in with furniture and/or a wall of an indoor space. For example, as illustrated in FIG. 1, the refrigerator 1 may be installed in an indoor space such as a kitchen and may be provided adjacent to built-in kitchen cabinets, closets, and/or the wall to harmonize an appearance. A front surface of the refrigerator 1 may be installed to be flush with front surfaces of the built-in cabinets and/or wall to create a continuous or uniform appearance.

For convenience of description, the surrounding furniture, built-in cabinets, or wall will be referred to as surrounding or adjacent furniture O. One of ordinary skill in the art will understand that the surrounding furniture O could alternatively be a wall or refer to kitchen cabinets, pantry doors, smaller walls or fences, counters, or other home appliances, fixtures, or furniture. Embodiments disclosed herein are not limited by a configuration of the surrounding furniture O.

A space or recess corresponding to a size of the refrigerator 1 may be provided in the surrounding furniture O, and the refrigerator 1 may be provided in the space to be a built-in type refrigerator. As another alternative, a plurality of refrigerators 1 may be continuously provided, or other home appliances may be continuously provided, in addition to or as a replacement to the surrounding furniture O.

Front surfaces of the doors 20 and 30 may be very close to front surfaces or sides of the surrounding furniture O and be provided on a same or adjacent plane to create a uniform appearance. The front surfaces of the doors 20 and 30 may be made of the same or similar material (e.g., a material having the same texture) as the surrounding furniture O to further enhance a sense of unity.

The cabinet 10 may define a storage space that is partitioned vertically to create an upper storage space 12 and a lower storage space 13, but embodiments disclosed herein are not limited to refrigerators that are vertically split. A barrier 11 (e.g., a partition wall or shelf) may define the upper storage space 12 above the barrier 11 and the lower storage space 13 below the barrier 11. For example, the upper storage space 12 may be used as a refrigerating compartment, and the lower storage space 13 may be used as a freezing compartment and maintained as a temperature below the a temperature of the refrigerating compartment. The upper storage space 12 may alternatively be referred to as a refrigerating compartment, and the lower storage space 13 may alternatively be referred to as a freezing compartment.

Embodiments disclosed herein are not limited to cabinets 10 divided into upper and lower storage spaces 12 and 12. For example, the cabinet 10 may be horizontally partitioned by a vertical barrier or partition wall into left and right storage spaces. As another alternatively, the cabinet 10 may be split into three or more spaces. Embodiments disclosed herein are not limited to a partitioning configuration of the cabinet.

The doors 20 and 30 may include at least one upper door 20 and at least one lower door 30. The upper door 20 may be rotatably mounted on the cabinet 10 to open and/or close the upper storage space 12. The lower door 30 may be rotatably mounted on the cabinet 10 to open and close the lower storage space 13 by the rotation thereof. When the cabinet 10 is partitioned to have left and right storage spaces, the doors 20 and 30 may alternatively include left and right doors 20 and 30 to open and/or close the left and right storage spaces, respectively.

Upper and lower ends of the upper door 20 may be supported by an upper hinge 40 and a multi-joint link hinge 60, respectively. The upper door 20 may rotate by the upper hinge 40 and the multi-joint link hinge 60 to open and/or close the upper storage space 12.

Figure 4:
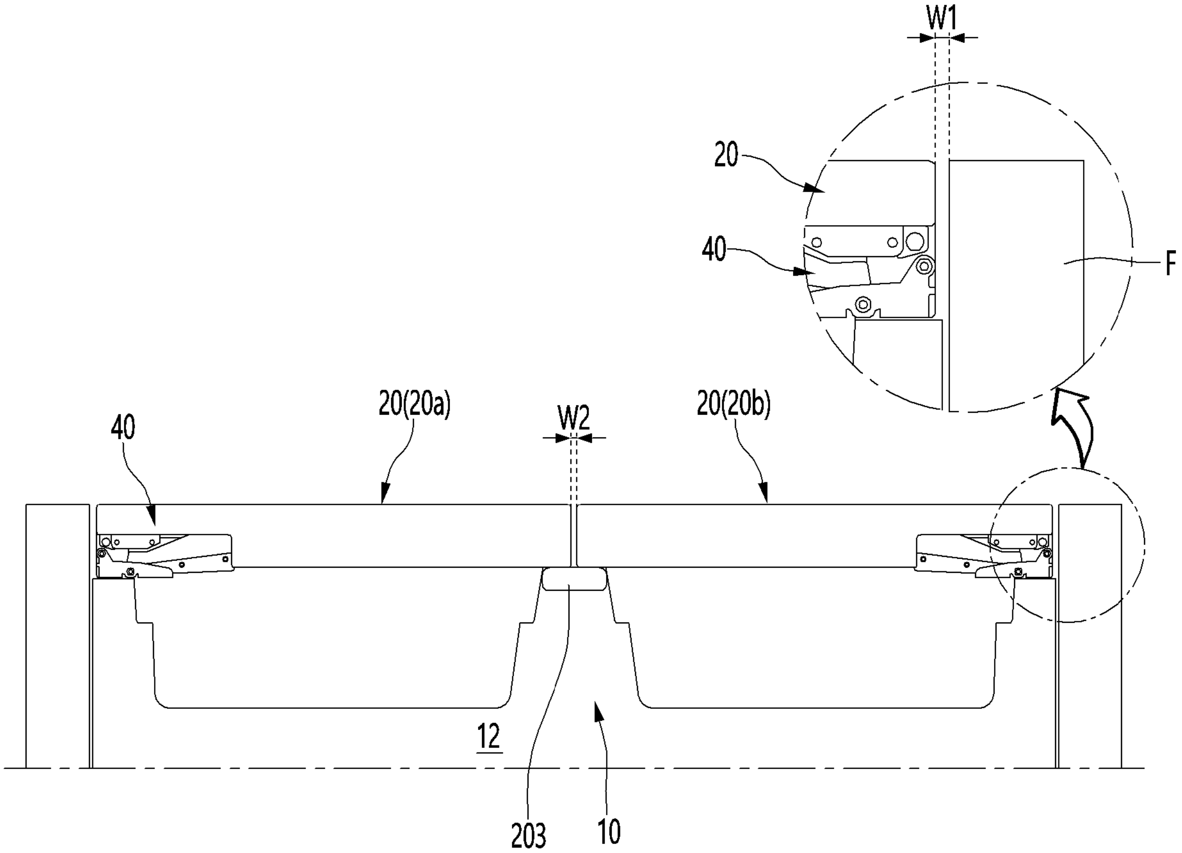
FIG. 4 is a view illustrating a state of the door, a wall, and the upper hinge in a state in which the upper door is closed.

There may be two upper doors 20. For example, the two upper doors 20 may include a left upper door 20*a* and a right upper door 20*b* (where "left" and right" have the orientation as shown in FIG. 4) which each independently rotate to open and/or close left and right sides, respectively, of the upper storage space 12. There may be two upper hinges 40 and two multi-joint link hinges 60 corresponding to the two upper doors 20, respectively. The two upper hinges 40 may include a left upper hinge provided at a left side and rotatably mounted to the cabinet 10 and a right upper hinge provided at a right side and rotatably mounted to the cabinet 10. The two multi-joint link hinges 60 may include a left multi-joint link hinge provided at a left side and rotatably mounted to the cabinet 10 and a right multi-joint link hinge provided at a right side and rotatably mounted to the cabinet 10.

A dispenser 201 configured to dispense water or ice may be provided at an outer side of the upper door 20 so as to dispense water or ice when the upper door 20 is closed. The dispenser 201 may be installed or located on a front surface of the upper door 20 and configured to receive liquid (e.g., water) from a liquid supply.

Upper and lower ends of the lower door 30 may be supported by the multi-joint link hinge 60 and a lower hinge 50, respectively. The upper door 30 may rotate by the multi-joint link hinge 60 and the lower hinge 50 to open and/or close the lower storage space 13.

There may be two lower doors 30. For example, the two lower doors 30 may include a left lower door 30*a* and a right lower door 30*b* (where "left" and "right" correspond to the left and right upper doors 20*a* and 20*b* in FIG. 4) which each independently rotate to open and/or close left and right sides, respectively, of the lower storage space 13. There may be two lower hinges 50 and two multi-joint link hinges 60 corresponding to the two lower doors 20, respectively. The two lower hinges 50 may include a left lower hinge provided at a left side and rotatably mounted to the cabinet 10 and a right lower hinge provided at a right side and rotatably mounted to the cabinet 10. The two multi-joint link hinges 60 may include a left multi-joint link hinge provided at a left side and rotatably mounted to the cabinet 10 and a right multi-joint link hinge provided at a right side and rotatably mounted to the cabinet 10.

A handle or opening/closing space 301 may be between a lower end of the upper door 20 and an upper end of the lower door 30. A separate handle (e.g., a recess or protrusion) to open and/or close the upper door 20 and/or the lower door 30 may be provided to be accessible from the handle space 301, e.g., at a bottom surface of the upper door 20 and/or a top surface of the lower door 30. Such a handle may be recessed in a groove shape. As an alternative, handles (e.g., bars) may be formed on each of the upper and lower doors 20 and 30.

The upper hinge 40, the multi-joint link hinge 60, and the lower hinge 50 may rotate in a same or similar trajectory. The upper door 20 and the lower door 30 may smoothly rotate without interfering with the surrounding furniture O during opening and closing.

Referring to FIGS. 3-8, the upper hinge 40 may be mounted at a corner defined by an upper front end and a side end of the cabinet 10. The upper hinge may be connected to an end of a top surface of the upper door 20.

The upper hinge 40 may have a structure in which a plurality of links are coupled to each other, and thus, when the upper hinge 40 rotates, the upper door 20 may rotate while moving in a direction away from the front surface of the cabinet 10.

The rotation trajectory of the upper door 20 may be determined by the structure of the plurality of links constituting the upper hinge 40. The structure of the upper hinge 40 may be configured such when left and right upper doors 20*a* and 20*b* are provided side by side, and the surrounding furniture O is provided at sides of the left and right upper doors 20*a* and 20*b*, an opening and/or closing of the left and right upper doors 20*a* and 20*b* may not interfere with the surrounding furniture O. The upper hinge 40 may be referred to as a multi-link hinge.

The upper hinge 40 and the lower hinge 50 may have a same or similar structure. The multi-joint link hinge 60 may have a structure different from that of each of the upper and lower hinges 40 and 50, but may be configured to have a same rotational trajectory as the upper and lower hinges 40 and 50. Such rotation trajectories of the upper, lower, and multi-joint link hinges 40, 50, and 60 may be configured so that rotation of the upper door 20 and the lower door 30 may be smoothly performed along a same trajectory.

The upper hinge 40 may include a hinge bracket 41 mounted on the cabinet 10, a main link 42 axially coupled to the hinge bracket 41, a first sub link 43 and a second sub link 44, which are axially coupled to the main link 42, and a door bracket 45 which is axially coupled to ends of the first sub link 43 and the second sub link 44 and is coupled to a top surface of the upper door 20.

Each of the links 42, 43, 44, and 45 may be axially coupled to define a quadrilateral shape as a whole and may be folded or unfolded to provide a trajectory through which the upper door 20 rotates. The hinge bracket 41 and the second sub link 44 may be connected to each other by a linear damper 46 (FIG. 5) having ends that are axially coupled to each other. The linear damper 46 may reduce rotation when the upper hinge 40 is folded to close the upper door 20 to alleviate an impact.

The first sub link 43 may be provided with a spring 47 (FIG. 6) that is tensioned or compressed according to a rotation of the first sub link 43 to force the rotation of the first sub link 43. The spring 47 may be, for example, a compression spring or a tension spring. The spring 47 may be compressed while the upper door 20 is closed and may be restored immediately before the upper door 20 is completely or fully closed. The spring 47 may assist a rotation of the first sub link 43 at the moment the upper door 20 is closed by the spring 47. The upper door 20 may be effectively closed even when the linear damper 46 operates. The plurality of links 42, 43, 44, and 45 of the upper hinge 40 may rotate while maintaining a set trajectory by an action of the linear damper 46 and the spring 47.

Referring to FIG. 4, the pair of upper doors 20 may be provided side by side at a front of the upper storage space 12. The front surface of the upper door 20 may be spaced a prescribed or predetermined interval or distance W1 from the surrounding furniture O, which may be provided at both sides of the refrigerator 1. For example, the predetermined distance W1 may be about 3 mm. While ensuring an initial rotation of the upper door 20 so as not to interfere, when the upper door 20 is closed, a space between the upper door 20 and the surrounding furniture O may be narrowed to enhance the sense of unity.

The upper storage space 12 may be shielded by the pair of upper doors 20, and the left upper door 20*a* and the right upper door 20*b* may independently rotate by the upper hinges 40, respectively. The left upper door 20*a* and the right upper door 20*b* may have a rotational structure independent from each other. A distance or space between the left upper door 20*a* and the right upper door 20*b* may be a predetermined or prescribed interval W2 so that the left upper door 20*a* does not interfere with a rotation of the right upper door 20*b* during rotation and vice versa. For example, the predetermined interval W2 may be about 7 mm to about 8 mm. The predetermined interval may be set differently according to a thickness of the upper door 20.

A pillar 203 (or alternatively, filter material) may be provided between the left upper door 20*a* and the right upper door 20*b* to shield the space between the pair of upper doors 20. The pillar 203 may be rotatably mounted on, for example, the right upper door 20*b* (or alternatively, the left upper door 20*a*) and may be unfolded by a guide provided in the cabinet 10 while the right upper door 20*b* is closed. As illustrated in FIG. 4, when the right upper door 20*b* is fully closed, the pillar 203 may be unfolded to shield the space between the left upper door 20*a* and the right upper door 20*b*.

Figure 5:
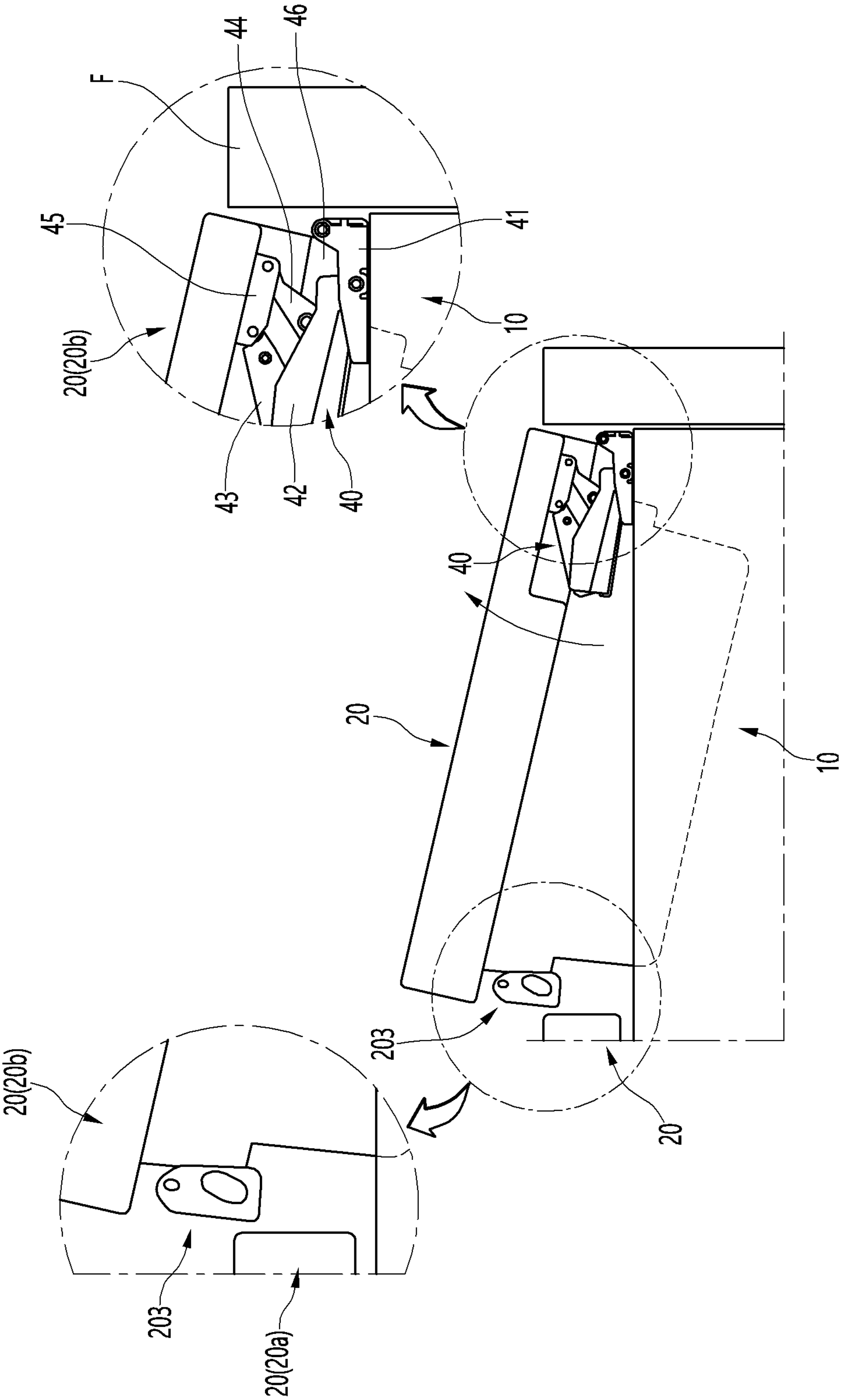
FIG. 5 is a view illustrating a state of the door, the wall, and the upper hinge in a state in which the upper door rotates at a set angle.

While the right and/or left upper doors 20*b* and/or 20*a* is opened, the pillar 203 may be folded as illustrated in FIG. 5 by the guide provided in the cabinet 10. While the right upper door 20*b* rotates, the right upper door 20*b* may not interfere with the left upper door 20*a* or the surrounding furniture O.

The upper hinge 40 may rotate from a fully folded state, shown in FIG. 4, to a partially unfolded the state, shown in FIG. 5, according to the rotation operation of the upper door 20 (e.g., the right upper door 20*b*). An operation of the right upper door 20*b* may be described or referred to for convenience of description, but the left upper door 20*a* and the upper hinge 40 connected to the left upper door 20*a* may have a same or similar structure to have a same or similar operation.

When the upper door 20 is opened at a first predetermined or prescribed angle between the front surface of the upper door 20 and the front surface of the cabinet 10 (e.g., 13°), the upper door 20 may rotate while moving forward. The pillar 203 of the right upper door 20*b* may move to a front side of the left upper door 20*a* without interfering with an end or side of the left upper door 20*a*. A left end of the right upper door 20*b* may also be maintained to be spaced apart from the surrounding furniture O so as not to interfere. The main link 42, the first sub link 43, the second sub link 44, and the door bracket 45, which constitute the upper hinge 40, may start to rotate.

Figure 6:
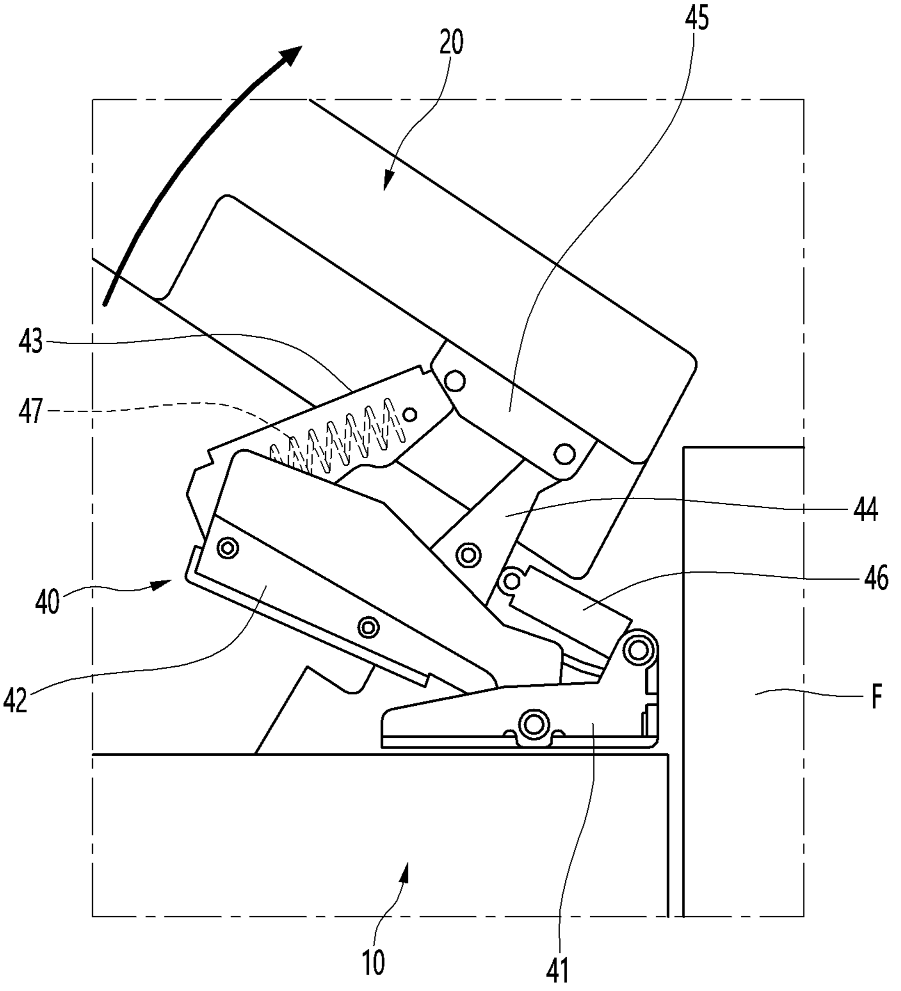
FIG. 6 is a view illustrating a state of the door, the wall, and the upper hinge in a state in which the upper door is opened more than in FIG. 5.
Figure 7:
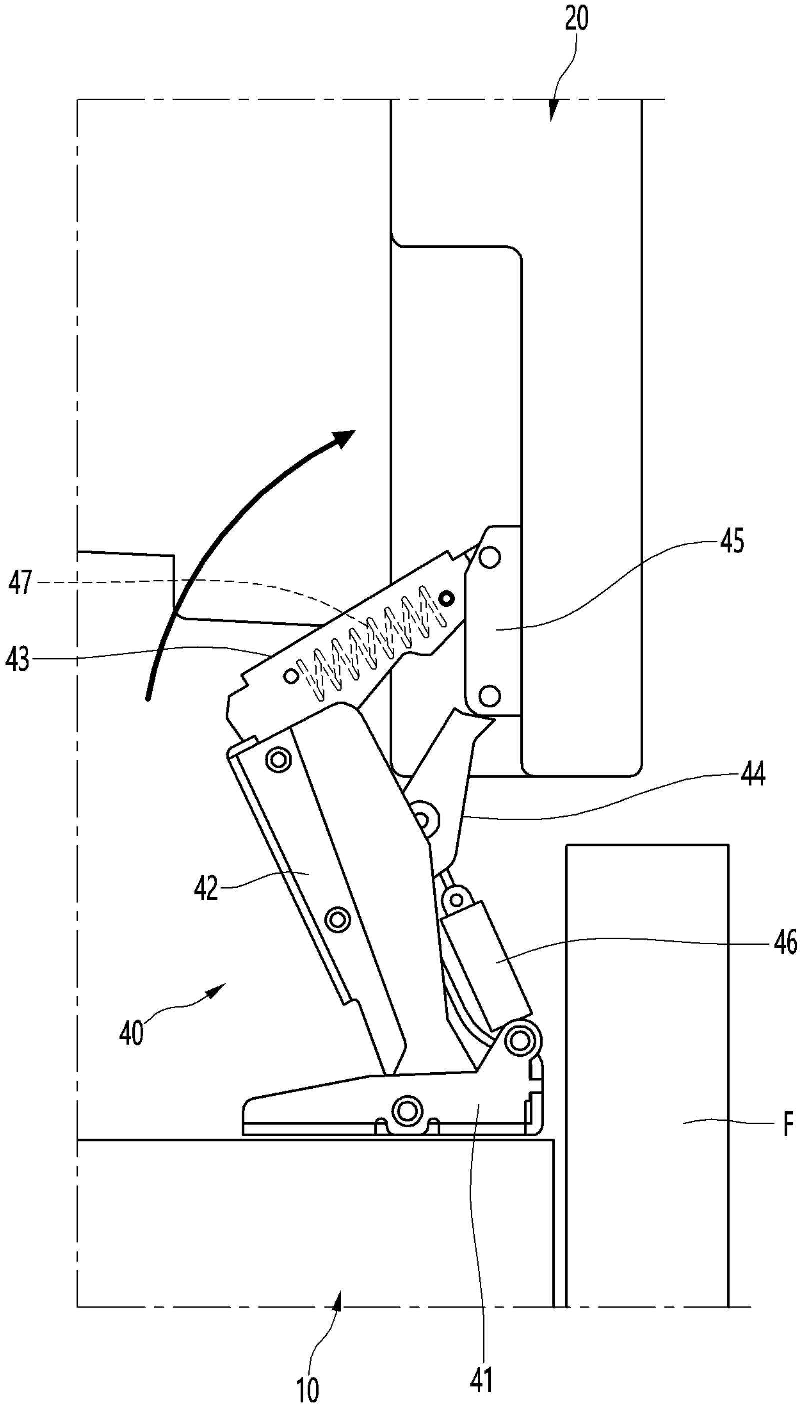
FIG. 7 is a view illustrating a state of the door, the wall, and the upper hinge in a state in which the upper door is opened more than in FIG. 6.

As illustrated in FIGS. 6 and 7, the upper door 20 may gradually rotate to be opened. Here, the main link 42, the first sub link 43, the second sub link 44, and the door bracket 45 may rotate so that the end of the upper door 20 rotates so as not to interfere with the surrounding furniture O. Even when the upper door 20 rotates to a second and/or third predetermined angle (e.g., about 30° in FIG. 6 and/or about 90° in FIG. 7), the upper door 20 may rotate by the upper hinge 40 so as not to interfere with the surrounding furniture O.

Figure 8:
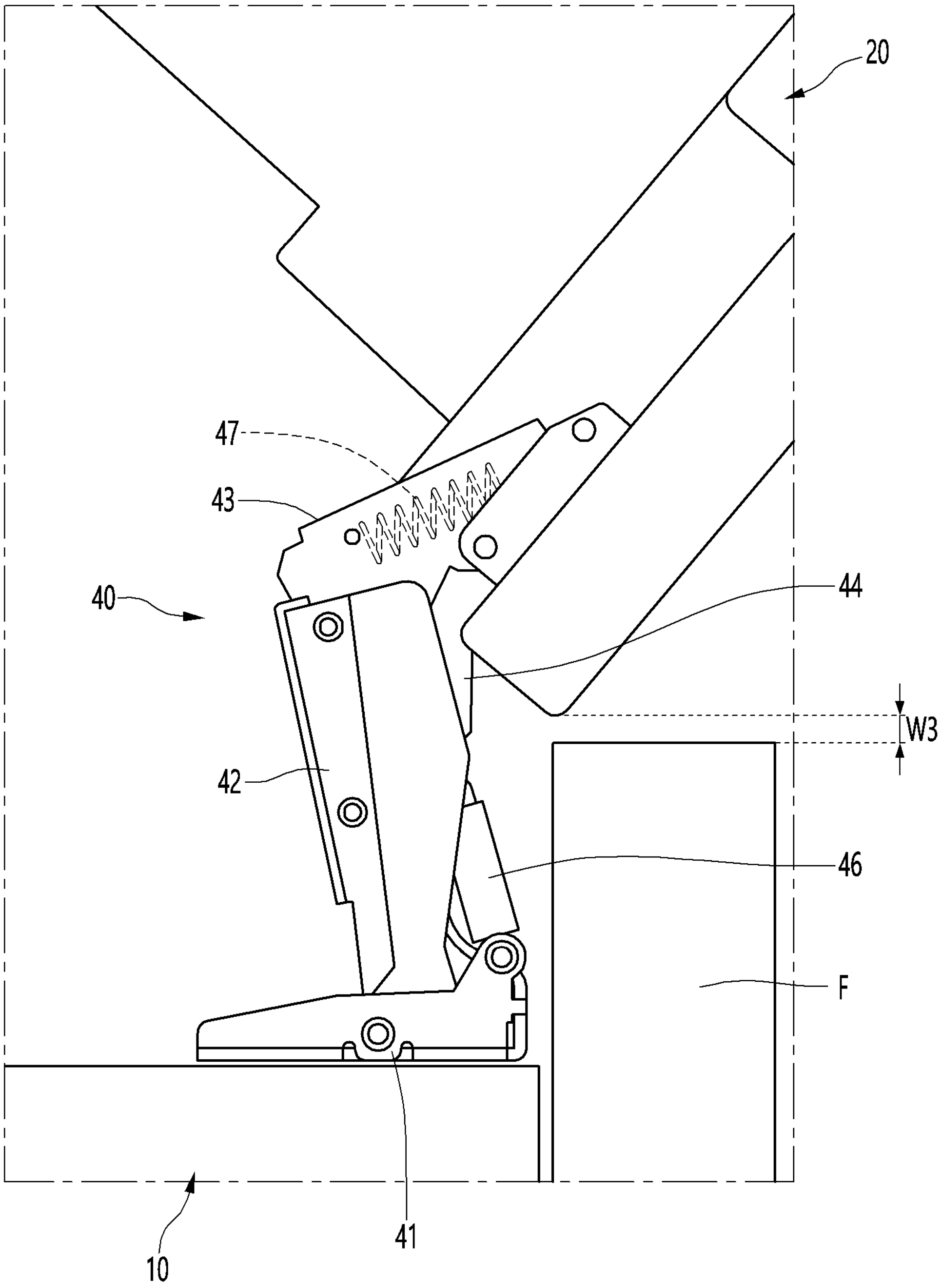
FIG. 8 is a view illustrating a state of the door, the wall, and the upper hinge in a state in which the upper door is fully opened.

As illustrated in FIG. 8, the upper door 20 may rotate up to a maximum open state at a fourth or "opened state" predetermined angle (for example, 130°). When the upper door 20 is fully opened, access to storage members (e.g., shelves and drawers) inside the cabinet 10 is easy. When the storage member (e.g., drawer) is pulled in and out, the storage member may be configured rotate up to an angle at which the storage member does not interfere with the doors 20 and 30.

When the upper door 20 fully rotate to be opened at the opened state predetermined angle, a structure such as a door dike protruding along a circumference of a rear surface of the upper door 20 may not interfere with an insertion or withdrawal of a drawer or other insertable storage member. When the upper door 20 fully rotates, the main link 42, the first sub link 43, the second sub link 44, and the door bracket 45 may rotate so that the end of the upper door 20 rotates so as not to interfere with the surrounding furniture O. A distance between the end of the upper door 20 and a front surface of the surrounding furniture O may be spaced a predetermined or prescribed interval W3 (e.g., 9 mm) from each other.

As described above, when the upper door 20 rotates, the upper door 20 may rotate by the upper hinge 40 along a corner of the surrounding furniture O while maintaining the predetermined interval W3 so as not to interfere with the corner of surrounding furniture O. If the upper door 20 and the surrounding furniture O are too far from each other, an interference may occur between the adjacent upper doors 20, and a user's finger or body may be caught between the upper door 20 and the surrounding furniture O.

The predetermined interval W3 between the upper door 20 and the surrounding furniture O may be maintained to be about 3 mm to about 6 mm. The upper hinge 40 may be configured in a combination of the plurality of coupled link structures, the spring 47, and the linear damper 46 so that the upper door 20 rotates along a predetermined or prescribed trajectory while being maintained at a predetermined or prescribed space from the adjacent upper door 20 and the surrounding furniture O when opening and closing the upper storage space 12.

Figure 9:
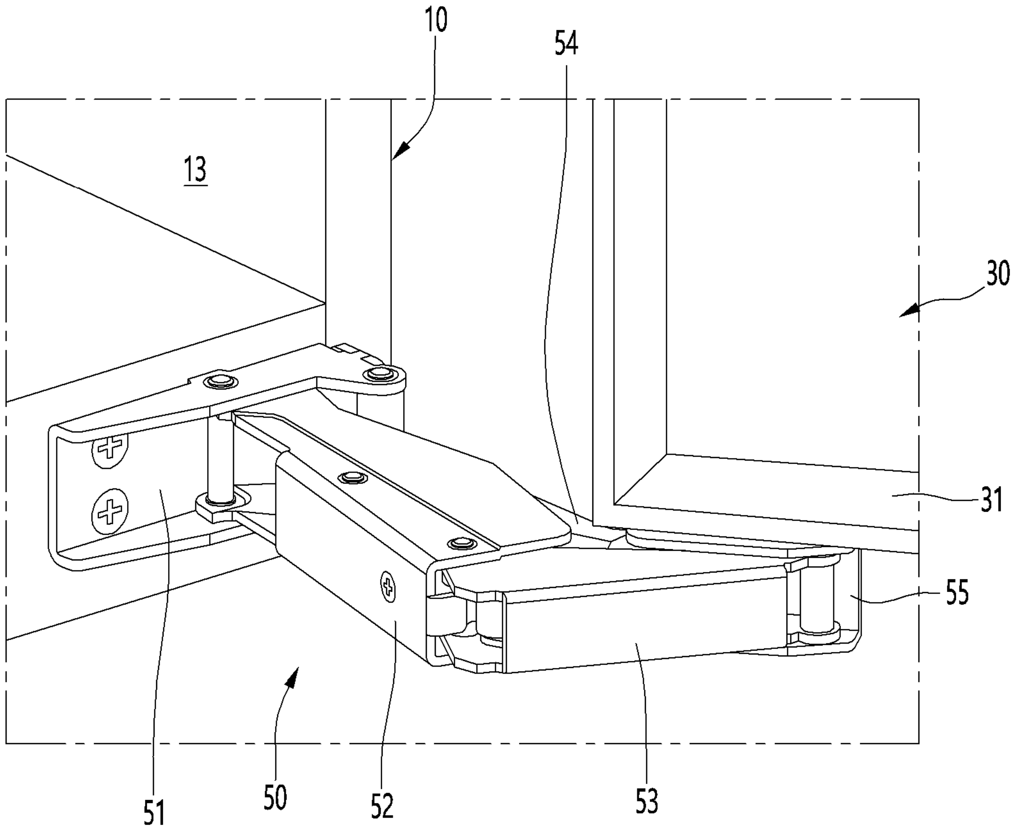
FIG. 9 is a partial perspective view illustrating a state in which a lower hinge is mounted according to an embodiment.
Figure 10:
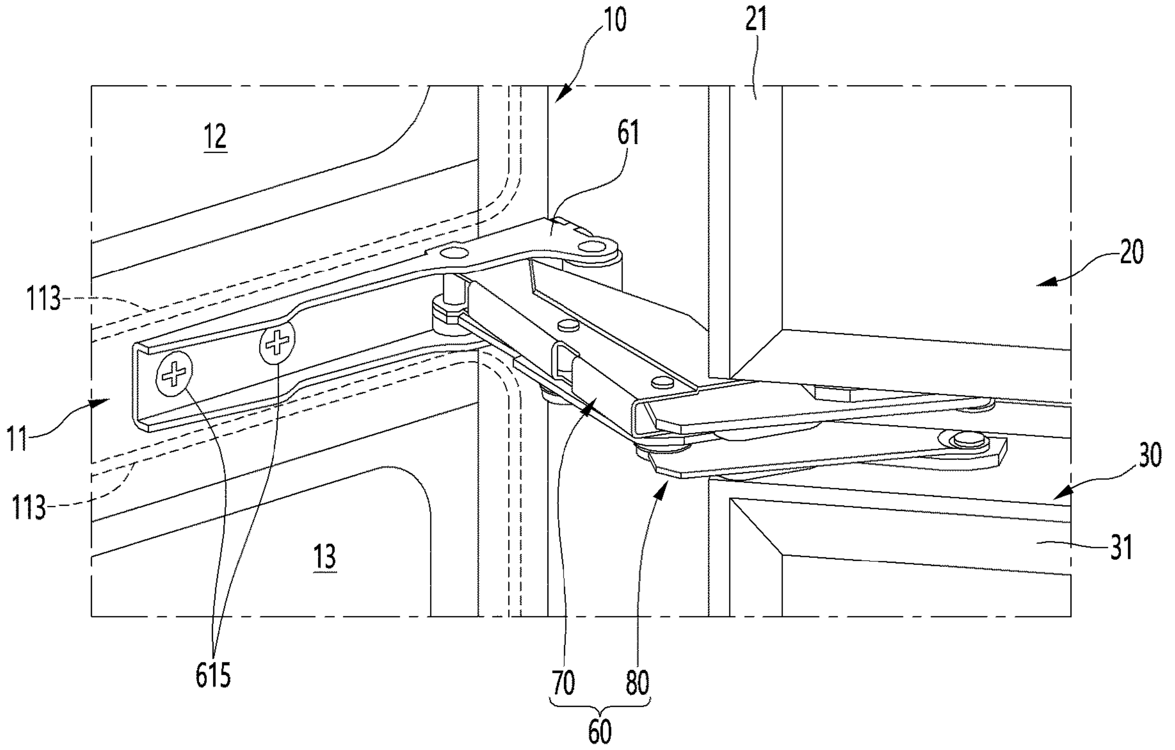
FIG. 10 is a partial perspective view illustrating a state in which a center hinge is mounted according to an embodiment.

Hereafter a lower hinge 50 rotatably supporting the lower door 30 will be described with reference to the drawings. Referring to FIG. 9, the lower hinge 50 may be mounted on a front lower end of the cabinet 10 to rotatably support a lower end of the lower door 30 at a lower side.

The lower door 30 may be provided in pair like the upper door 20 at both left and right sides. A width of the lower door 30 may be the same as or similar to that of the upper door 20, and the front surface of the refrigerator 1 may appear symmetrical when viewed from a front side.

The lower door 30 may rotate along a same or similar trajectory as the upper door 20. The lower hinge 50 for the rotation of the lower door 30 may have substantially the same or similar structure as the upper hinge 40. The lower hinge 50 may include a hinge bracket 51 mounted on the cabinet 10, a main link 52 axially coupled to the hinge bracket 51, a first sub link 53 and a second sub link 54, which are axially coupled to the main link 52, and a door bracket 55 which is axially coupled to ends of the first sub link 53 and the second sub link 54 and is coupled to a bottom surface of the lower door 30.

Each of the links 52, 53, and 54 may be axially coupled to define a quadrilateral shape as a whole and may be folded or unfolded to provide a trajectory through which the lower door 30 rotates. The hinge bracket 51 and the second sub link 54 may be connected to each other by a lower linear damper having both ends that are axially coupled to each other. The lower linear damper may reduce rotation when the lower hinge 50 is folded to close the lower door 30, reducing an impact.

The first sub link 53 may be provided with a spring that is tensioned or compressed according to a rotation of the first sub link 53 to force the rotation of the first sub link 53. The spring may be, for example, a compression spring or a tension spring. The spring may be compressed while the lower door 30 is closed and may be restored immediately before the lower door 30 is completely closed. The spring may assist the rotation of the first sub link 53 at the moment at which the lower door 30 is closed by the spring 47. The lower door 30 may be effectively closed even when the lower linear damper 46 operates. The plurality of links 52, 53, 54, and door bracket 55 constituting the lower hinge 50 may rotate while maintaining a set trajectory by the action of the lower linear damper 46 and the spring.

Referring to FIGS. 10-15, the multi-joint link hinge 60 may be provided on the front surface of the cabinet 10. Each of the bottom surface of the upper door 20 and the top surface of the lower door 30 may be independently rotatably supported by the multi-joint link hinge 60.

Since the multi-joint link hinge 60 may be positioned between the upper hinge 40 and the lower hinge 50, the multi-joint link hinge 60 may be referred to as a center hinge 60. The multi-joint link 60 may be applied to furniture or home appliances in which doors are vertically arranged, and is not limited to a structure of the refrigerator.

The multi-joint link hinge 60 may rotatably support the upper door 20 and the lower door 30. The multi-joint link hinge 60 may be provided in a space between the bottom surface of the upper door 20 and the top surface of the lower door 30 and may be mounted on the front surface of the cabinet 10. The multi-joint link hinge 60 may be mounted on a front surface of the barrier 11 and be connected to the bottom surface of the upper door 20 and the top surface of the lower door 30, respectively, so that the upper door 20 and the lower door 30 rotate independently.

The multi-joint link hinge 60 may include a hinge bracket 61 (The hinge bracket 61 may alternatively be referred to as a first bracket) mounted on the barrier 11, an upper link module or assembly 70 (The upper link module 70 may alternatively be referred to as a first linkage), and a lower link module or assembly 80 (The lower link module 70 may alternatively be referred to as a second linkage). The upper and lower link assemblies 70 and 80 may include a plurality of links that are axially coupled to the hinge bracket 61. The upper link assembly 70 may be coupled to the bottom surface of the upper door 20. The lower link assembly 80 may be coupled to the top surface of the lower door 30. The upper and lower link assemblies 70 and 80 may alternatively be referred to as upper and lower linkages.

The upper link assembly 70 and the lower link assembly 80 may be vertically provided in an inner region of the hinge bracket 61. A thickness of the multi-joint link hinge 60 may be determined by a vertical width of the hinge bracket 61, and a sum of the vertical widths of the upper link assembly 70 and the lower link assembly 80 may be equal to or less than a sum of the vertical widths of the hinge bracket 61.

The upper link assembly 70 may have a structure that supports the upper door 20 at a lower side, and the upper door 20 may apply a load to upper link assembly 70, which may cause drooping or deformation of the upper door 20. The lower link assembly 80 may have a structure that supports the lower door 30 at an upper side, and the lower door 30 may apply a relatively low load. The lower door 30 may be supported by the lower hinge 50.

The upper link assembly 70 may have a thickness greater than that of the lower link assembly 80 to prevent the upper link assembly 70 from drooping or being deformed downward by the load of the upper door 20. A limited width of the multi-joint link hinge 60, i.e., the vertical width of the upper link assembly 70 within the vertical width of the hinge bracket 61 may be designed to be greater than the vertical width of the lower link assembly 80 to prevent the upper link assembly 70 from drooping or being deformed.

The vertical width of the hinge bracket 61 may be determined according to the vertical width of the barrier 11. The barrier 11 may be designed to have a thickness at which the upper storage space 12 and the lower storage space 13 are partitioned in an adiabatic state.

A portion of an upper door gasket 21 and a lower door gasket 31, which may be provided along rear circumferences of the upper door 20 and the lower door 30, may not interfere with the multi-joint link hinge 60 and be in close contact with the front surface of the barrier 11. A heating member 113 may be provided along a circumference of the upper storage space 12 and a circumference of the lower storage space 13 in addition to the barrier 11. The heating member may be provided as a hot gas pipe or a heater.

The heating member 113 may be configured to prevent condensation from being generated on the front surface of the cabinet 10 and may be provided inside the barrier 11 to extend to left and right sides. The heating member 113 may be provided along each of the upper storage space 12 and the lower storage space 13 and thus may be spaced apart from each of upper and lower portions of the hinge bracket 61.

The hinge bracket 61 may be mounted on the front surface of the barrier 11. The hinge bracket 61 may be provided between the heating members 113 that are provided vertically and may be provided between the upper door gasket 21 and the lower door gasket 31.

As the vertical width of the hinge bracket 61 may be reduced or minimized, an interval between the heating members 113, which may be arranged vertically, and an interval between the upper door gasket 21 and the lower door gasket 31 may be designed to be narrower. A thickness of the barrier 11 may be also reduced to increase storage capacity of each of the upper storage space 12 and the lower storage space 13.

The vertical width of the multi-joint link hinge 60 may be reduced or minimized to allow a range of movement for opening and closing of the upper door 20 and the lower door 30. To minimize or reduce the vertical width of the multi-joint link hinge 60, the upper link assembly 70 and the lower link assembly 80 may be provided together on one hinge bracket 61. The multi-joint link hinge 60 may have a compact structure to occupy a relatively small or minimum space between the cabinet 10, the upper door 20, and the lower door 30.

Figure 11:
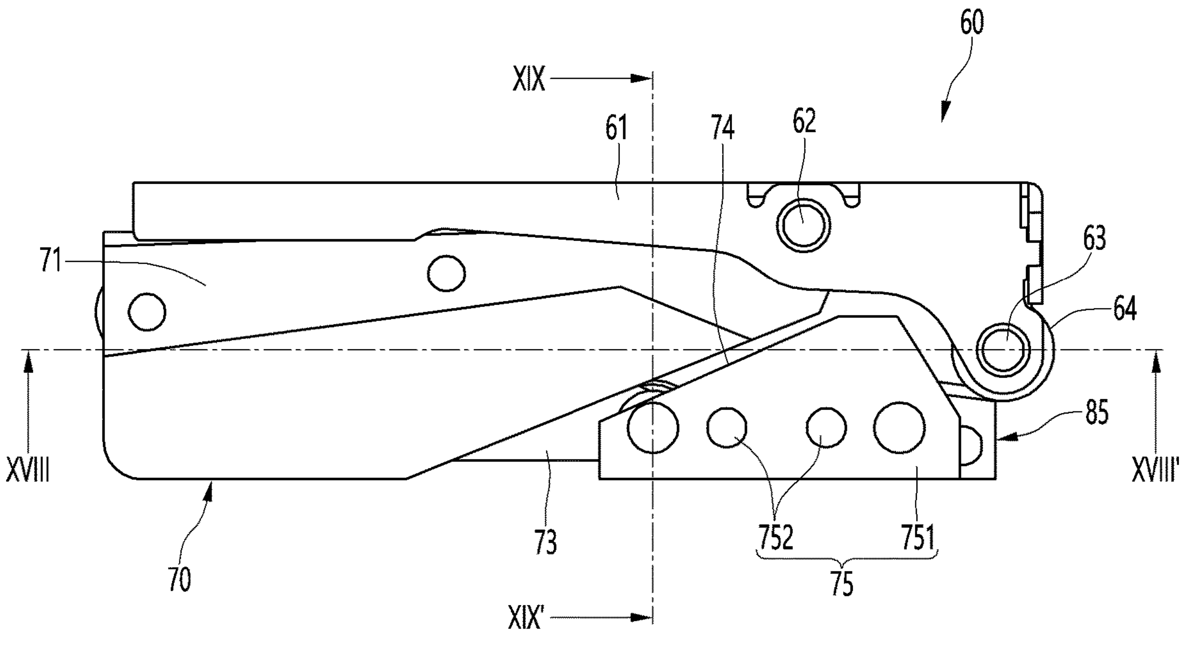
FIG. 11 is a plan view illustrating a state in which the center hinge is folded.
Figure 12:
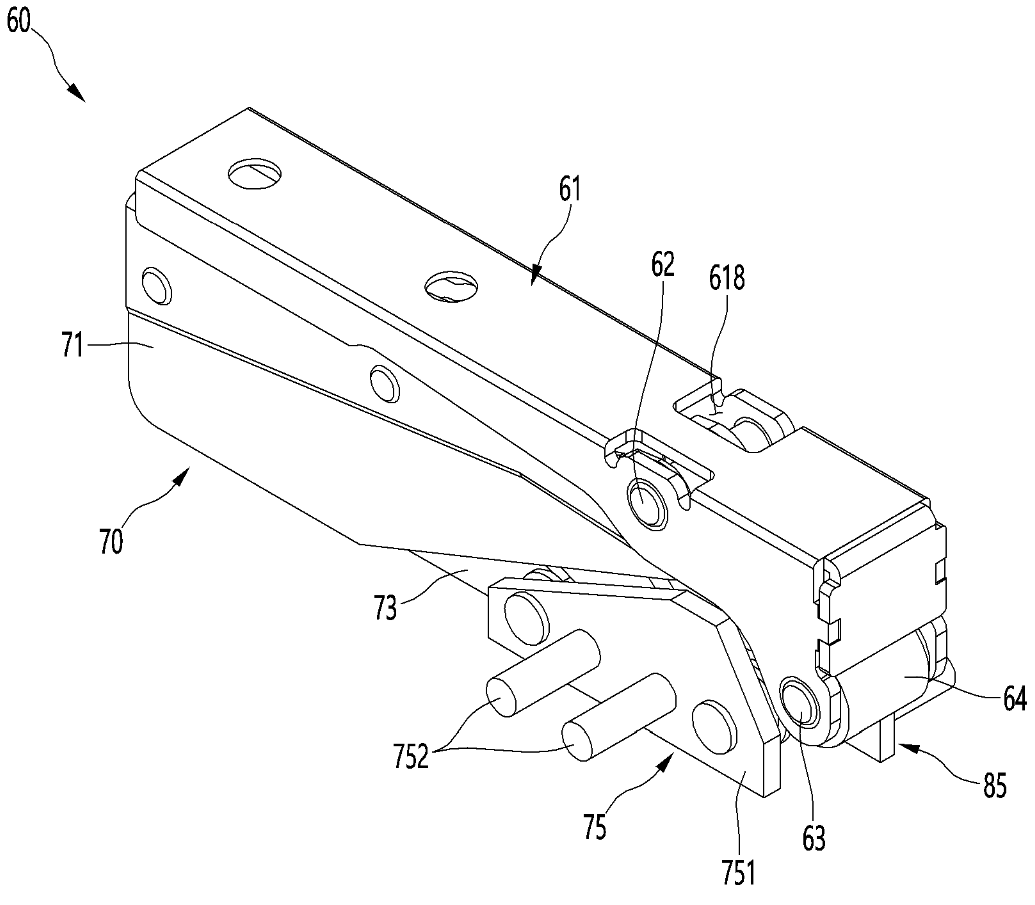
FIG. 12 is a perspective view illustrating the state in which the center hinge is folded when viewed from an upper side.
Figure 13:
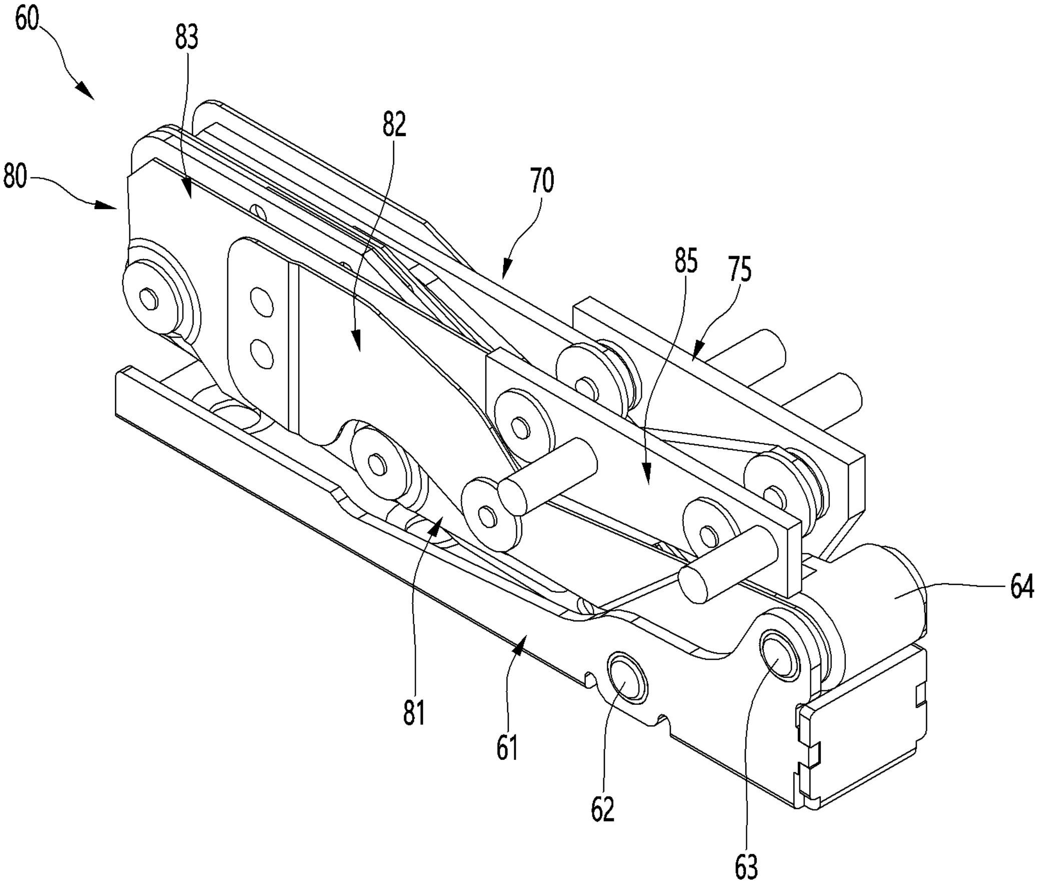
FIG. 13 is a perspective view illustrating the state in which the center hinge is folded when viewed from a lower side.
Figure 14:
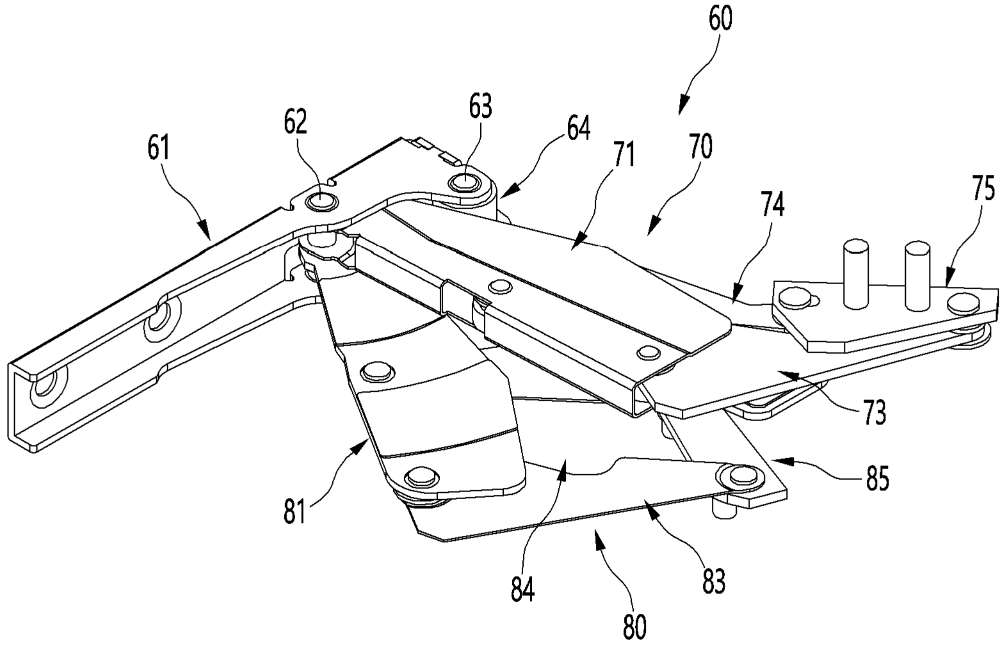
FIG. 14 is a perspective view illustrating a state in which the center hinge is unfolded at a predetermined angle.
Figure 15:
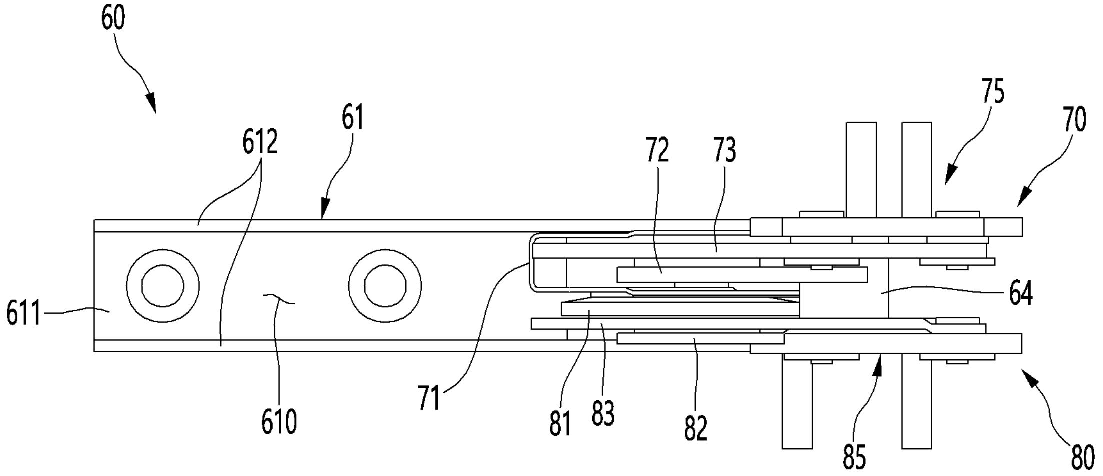
FIG. 15 is a front view of the center hinge.

When the upper door 20 and the lower door 30 are closed so that both the upper link assembly 70 and the lower link assembly 80 are fully folded, as illustrated in FIGS. 11 to 13, the multi-joint link hinge 60 may have an approximately hexahedral shape and also may have a shape in which the plurality of links constituting the hinge bracket 61, the upper link assembly 70, and the lower link assembly 80 correspond to each other or fit together in a folded state so as not to interfere with each other.

The upper link assembly 70 and the lower link assembly 80 may be configured to have the same or similar rotation trajectory, but may differ in thickness and coupling structure, and lengths and coupling structures of the links may be the same as or similar to each other.

To stably open and close the upper door 20 and the lower hinge 50, the multi-joint link hinge 60 may have the same rotation trajectory as each of the upper hinge 40 and the lower hinge 50. Configurations of the upper link assembly 70 and the lower link assembly 80 constituting the multi-joint link hinge 60 may correspond to the configurations of the upper hinge 40 and the lower hinge 50, respectively.

The upper link assembly 70 and the lower link assembly 80 may be mounted to the hinge bracket 61 to have the same rotation axis, but may rotate independently. The main rotation shaft 62 and the sub rotation shaft 63 mounted on the hinge bracket 61 may be provided to pass through both the upper link assembly 70 and the lower link assembly 80, and the upper link assembly 70 and the lower link assembly 80 may be spaced apart from each other so that the upper link assembly 70 and the lower link assembly 80 do not interfere with each other during the rotation.

The structure of each of the hinge bracket 61, the upper link assembly 70, and the lower link assembly 80, which constitute the multi-joint link hinge 60, in addition to unexplained reference numerals, will be described in more detail with reference to the drawings.

Figure 16:
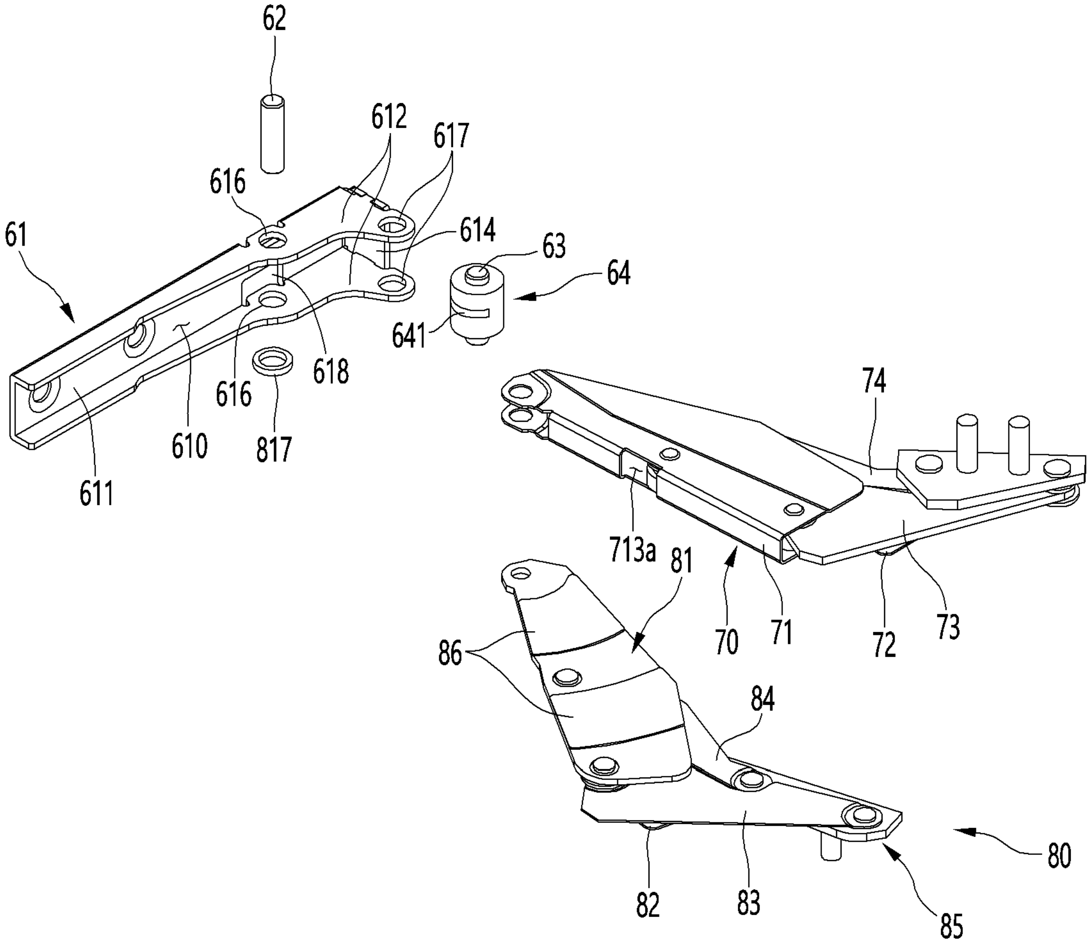
FIG. 16 is an exploded perspective view illustrating a state in which the center hinge is disassembled when viewed from one side.
Figure 17:
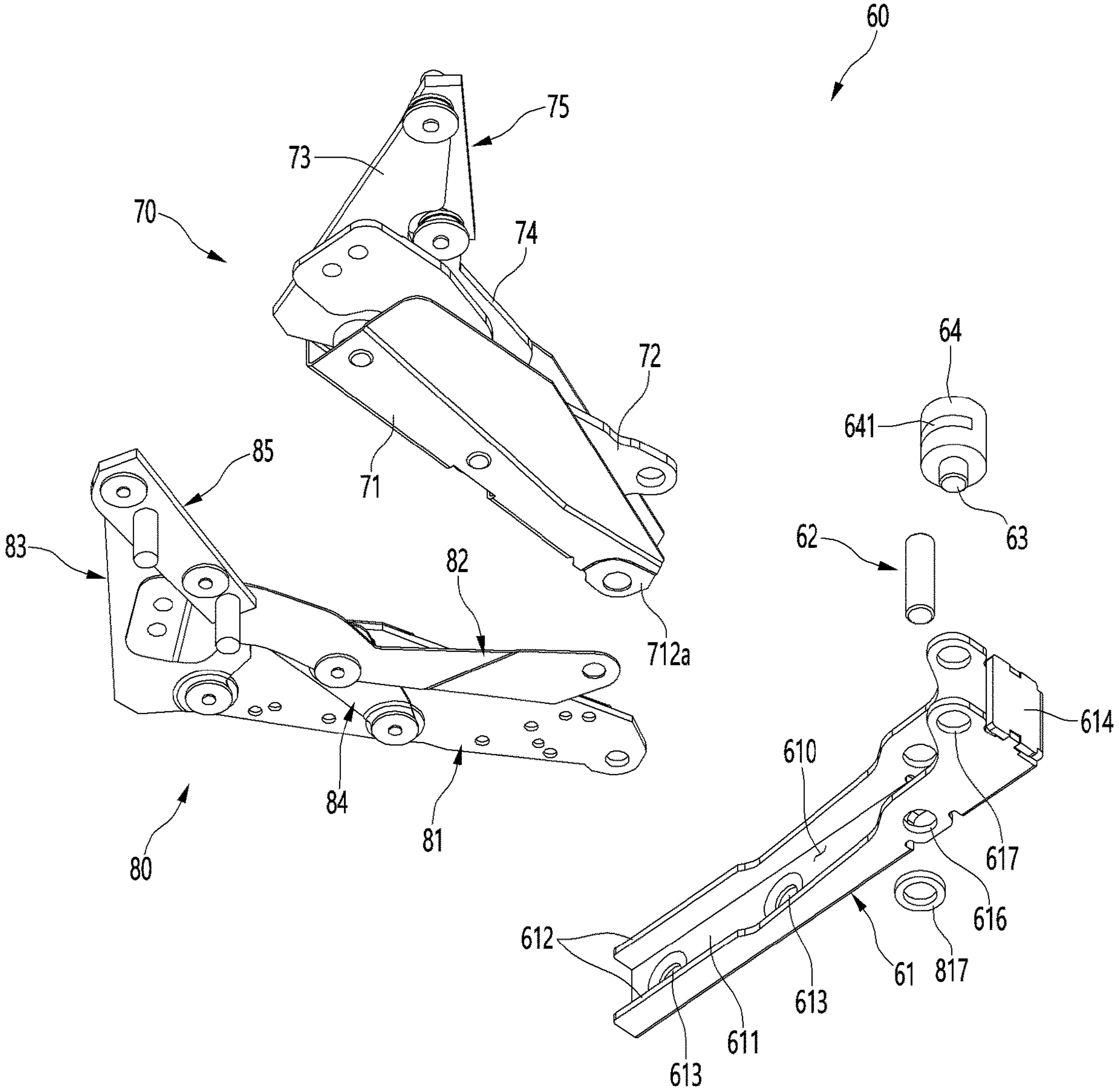
FIG. 17 is an exploded perspective view illustrating a state in which the center hinge is disassembled when viewed from the other side.
Figure 18:
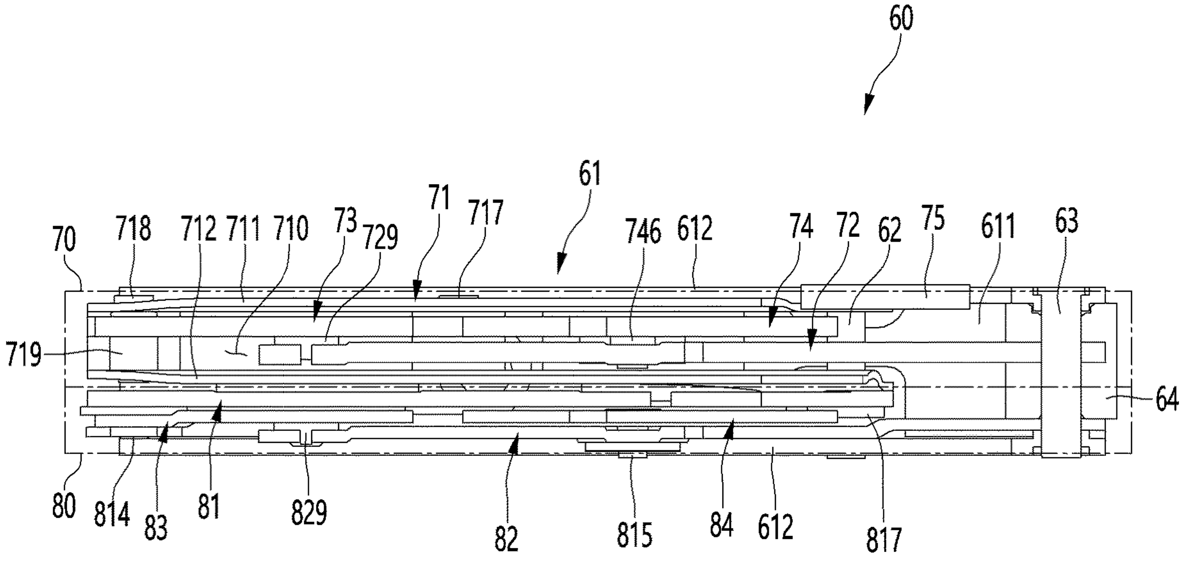
FIG. 18 is a cross-sectional view taken along line XVIII-XVIII' of FIG. 11.
Figure 19:
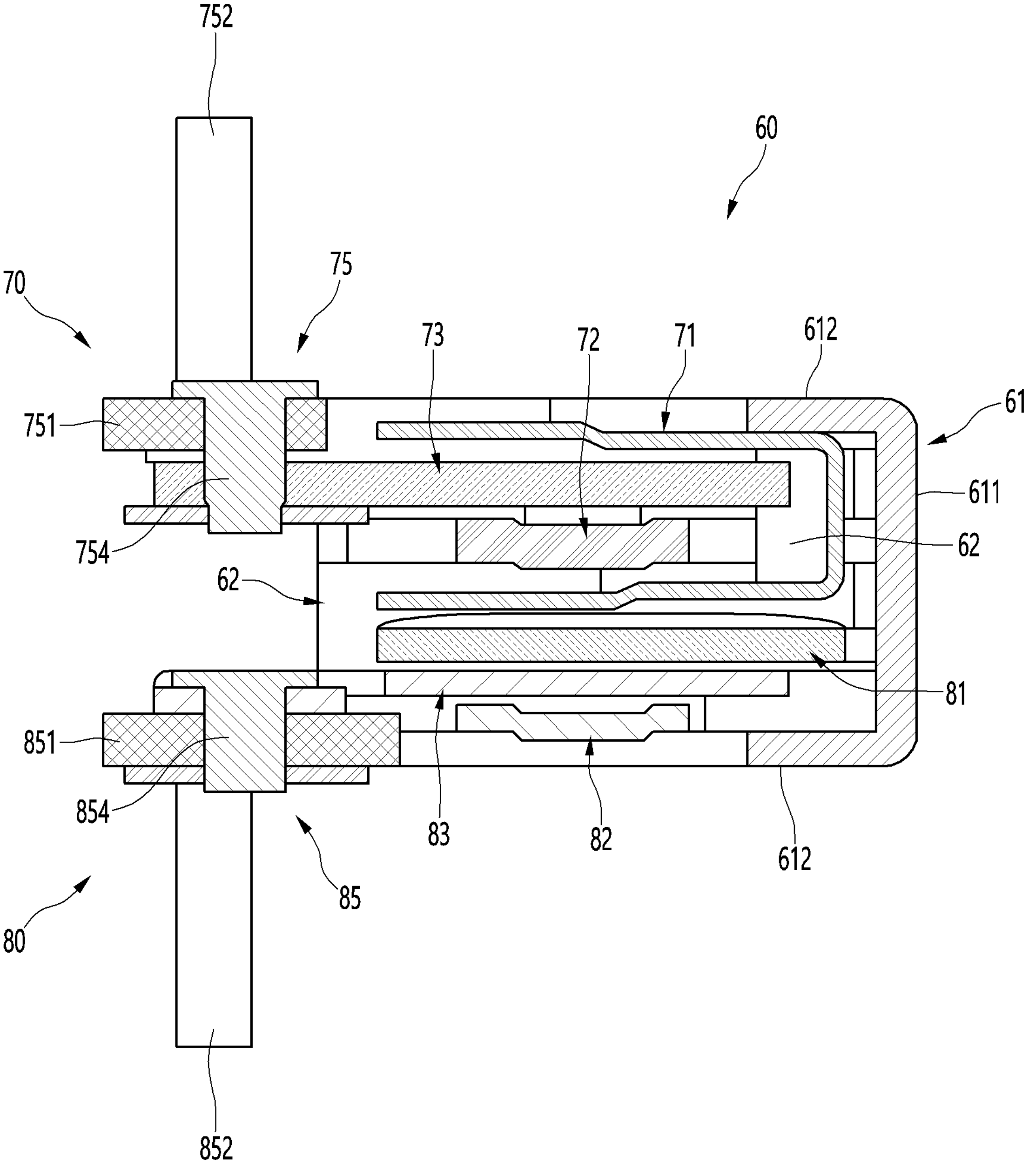
FIG. 19 is a cross-sectional view taken along line XIX-XIX' of FIG. 11.
Figure 20:
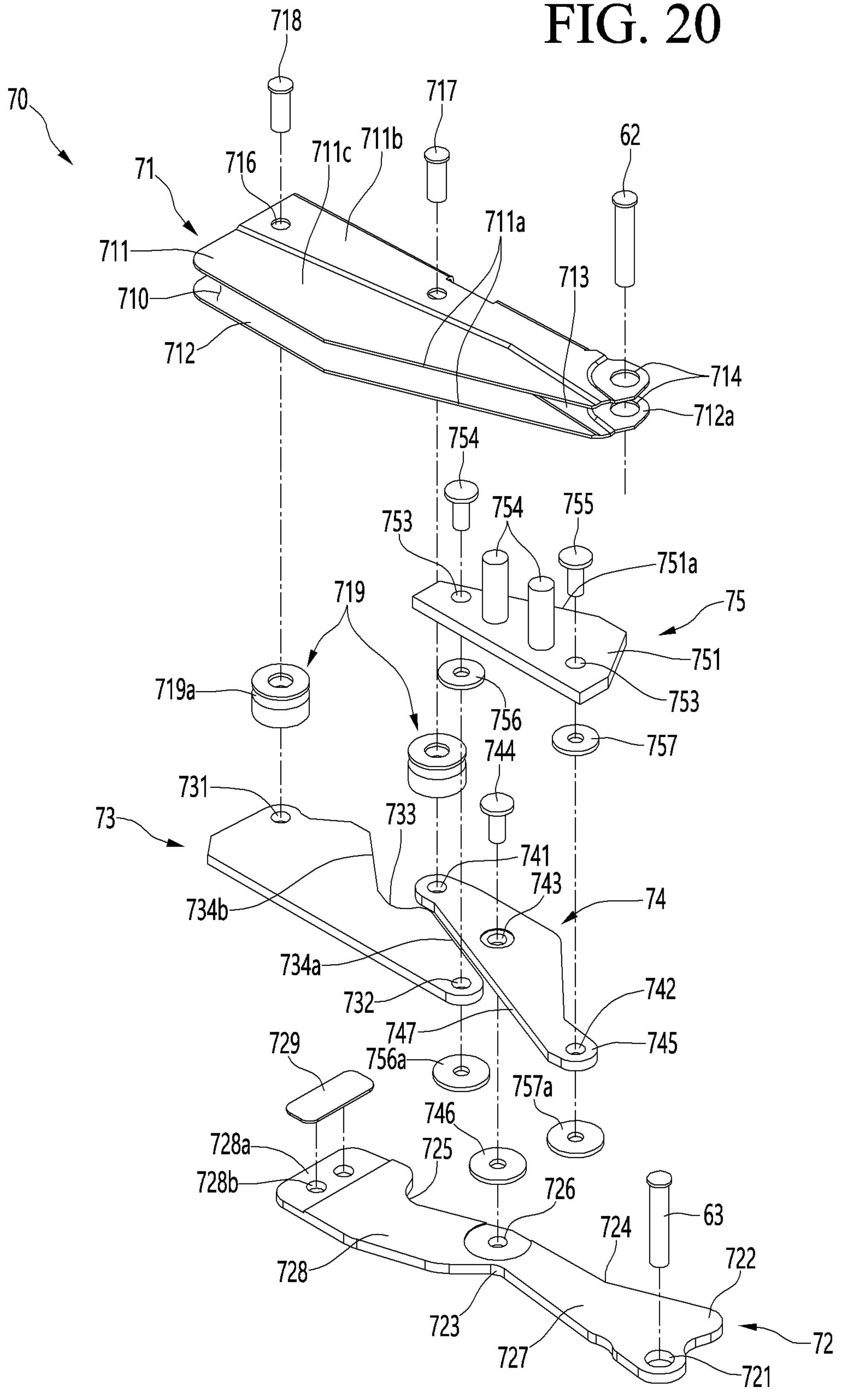
FIG. 20 is an exploded perspective view of an upper link module that is one component of the center hinge when viewed from the upper side.
Figure 21:
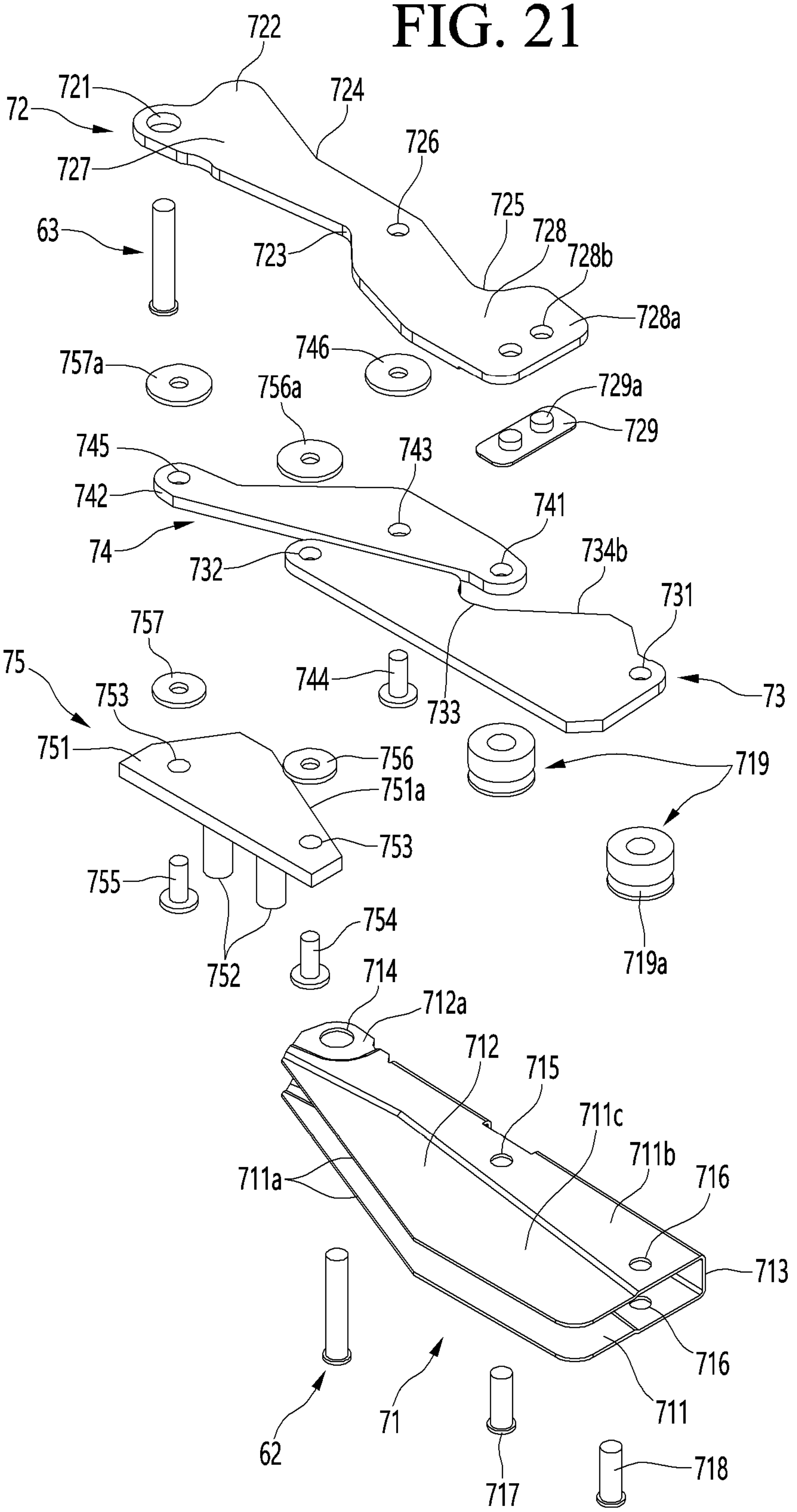
FIG. 21 is an exploded perspective view of the upper link module when viewed from the lower side.

Referring to FIGS. 16-17, the hinge bracket 61 may be provided in a plate shape made of a metal material, and the top and bottom surfaces may be bent to define an accommodation or receiving space 610 in which the upper link assembly 70 and the lower link assembly 80 are accommodated.

The hinge bracket 61 may include a base or plate 611 that is fixed to the cabinet 10 and a side or wall 612 that is bent to extend forward from each of upper and lower ends of the base 611.

The base 611 may be provided in a plate shape, and a plurality of coupling holes 613 may be provided in the base 611. A coupling member such as a screw 615 (FIG. 10) may be inserted into the plurality of coupling holes 613 to allow the hinge bracket 61 to be fixed and mounted on the front surface of the cabinet 10.

The side 612 may be bent perpendicularly from the base 611 to extend forward. As the side 612 extends from one end to the other end, a width in the extension direction may increase. A main side hole 616 and a sub side hole 617 may be provided in the side 612. A main rotation shaft 62 and a sub rotation shaft 63 may pass through the main side hole 616 and sub side hole 617, respectively.

The side 612 may have a narrower width in an inner direction (left side in FIG. 16) toward the center of the inside of the cabinet 10 with respect to a center of the hinge bracket 61, and have a wider width in an outer direction (right side in FIG. 16) of the cabinet 10 toward a side surface of the cabinet 10. The main side hole 616 and the sub side hole 617 may be provided outside the side 612 of which a width is relatively wide to provide a structure in which the upper link assembly 70 and the lower link assembly 80 are rotatable. The sub side hole 617 may be provided at an outer end of the side 612 and may be provided further in front of the main side hole 616.

A shape of the extending front end of the side 612 may correspond to a shape of each of the upper link assembly 70 and the lower link assembly 80, and thus, the upper link assembly 70 and the lower link assembly 80 may not interfere with each other even in the fully folded state.

A base opening 618 may be provided in the base 611 and correspond to the position of the main rotation shaft 62. An interference between ends of an upper main link 71 and a lower main link 81 penetrated by the main rotation shaft 62 may be avoided by the base opening 618.

The multi-joint link hinge 60 may be mounted to protrude more than the upper hinge 40 and the lower hinge 50 due to an influence of the heating member 113 provided inside the barrier 11. The base opening 618 may be provided so that an axial coupling position of the upper link assembly 70 and the lower link assembly 80 are closer to the front surface of the barrier 11, and an operation may not interfere with the hinge bracket 61. Despite the protruding structure of the front surface of the barrier 11, the upper link assembly 70 and the lower link assembly 80 of the multi-joint link hinge 60 may have the same or similar rotation trajectory as the upper hinge 40 and the lower hinge 50.

A shielding portion or cover 614 may be further provided on an outer end of the base 611. The shielding portion 614 may be bent forward from the outer end of the base 611 and may be coupled to an outer end of the side 612. A portion of an outer surface of the hinge bracket 61 may shield a side of the receiving space 610 to prevent the upper link assembly 70 and the lower link assembly 80 from being exposed to a side of the hinge bracket 61.

The shielding portion 614 may connect the base 611 to the side 612 so that strength of the hinge bracket 61 is further reinforced. An extending end of the shielding portion 614 may be provided behind the sub side hole 617. The shielding portion 614 may prevent the upper link assembly 70 and the lower link assembly 80 from interfering with each other when the upper link assembly 70 and the lower link assembly 80 rotate.

The upper link assembly 70 and the lower link assembly 80 may be vertically arranged and be penetrated by the main rotation shaft 62 and the sub rotation shaft 63 to rotate independently. The upper link assembly 70 and the lower link assembly 80 may be provided inside the receiving space 610 to be close to, but vertically spaced apart from, each other so as not to be caught and/or restricted during the rotation operation.

The main rotation shaft 62 may pass through the main side hole 616 and sequentially pass through the upper main link 71 of the upper link assembly 70 and the lower main link 81 of the lower link assembly 80. Each of the upper and lower main links 71 and 81 may be spaced apart from each other by a forming or contact portion **712*a*. The forming portion 712*a*** may alternatively be referred to as a spacer or protrusion.

The forming portion **712*a* may be formed to protrude by forming a portion of a bottom surface of the upper main link 71 through which the main rotation shaft 62 passes. The forming portion 712*a* may protrude to be in contact with a top surface of the lower main link 81, and remaining portions of the bottom surface of the upper main link 71 and the top surface of the lower main link 81 except for the forming portion 712*a*** may be maintained to be spaced apart from each other.

A main rotation shaft spacer 817 may be further provided below the lower main link 81. The lower main link 81 may be spaced apart from the side 612 and may be rotatable without interfering with the side 612.

The sub rotation shaft 63 may pass through the sub side hole 617 and may sequentially pass through an upper connection link 72 of the upper link assembly 70 and a lower connection links 82 of the lower link assembly 80. Each of the upper and lower connection links 72 and 82 may be spaced apart from each other by a sub rotation shaft spacer 64.

The sub rotation shaft spacer 64 may be provided between the side portions 612 and be penetrated by the sub rotation shaft 63. A spacer groove 641 may be provided in a circumferential surface of the sub rotation shaft spacer 64 between an upper end and a lower end of the sub rotation shaft spacer 64. An end of the upper connection link 72 may be inserted into the spacer groove 641, and the upper connection link 72 may be penetrated by the sub rotation shaft 63 and inserted into the spacer groove 641. A vertical height of the upper connection link 72 may be maintained inside the upper main link 71 by the sub rotation shaft spacer 64, and while the upper link assembly 70 operates, the upper connection link 72 may not interfere with the upper main link 71 but operate inside the upper main link 71.

The lower connection link 82 may be provided below the sub rotation shaft spacer 64. The upper connection link 72 may be spaced apart from the side 612 and the lower connection link 82 by the sub rotation shaft spacer 64.

The upper link assembly 70 may include the upper main link 71, the upper connection link 72, a first upper sub link 73, a second upper sub link 74, and an upper door bracket 75. The lower link assembly 80 may include the lower main link 81, the lower connection link 82, a first lower sub link 83, a second lower sub link 84, and a lower door bracket 85. The upper and lower door brackets 75 and 85 may alternatively be referred to as second and third brackets.

The upper link assembly 70 and the lower link assembly 80 may be configured as a combination of a plurality of links and may have a same or similar coupling structure so as to have the same or similar rotation trajectory. The upper link assembly 70 and the lower link assembly 80 may be configured to have the same or similar rotational trajectory as the upper hinge 40 and the lower hinge 50, and the upper door 20 and the lower door 30 may smoothly rotate.

Referring to FIGS. 18-21, the first upper sub link 73 and the second upper sub link 74 may be rotatably connected to each other between the upper main link 71 and the door bracket 75. The upper connection link 72 may connect the second upper sub link 74 to the hinge bracket 61.

The upper main link 71 may be made of a plate-shaped metal material and be bent several times to accommodate at least portion of the upper connection link 72, the first upper sub link 73, and the second upper sub link 74 therein. The upper main link 71 may have a shape that does not interfere with the hinge bracket 61 and the upper door 20 during the rotation and may be provided so as not to interfere with the door bracket 75. The hinge bracket 61, the upper main link 71, and the door bracket 75 may be provided so as not to interfere with each other during the folding or unfolding.

The upper main link 71 may include a top surface 711, a bottom surface 712, and a connection surface or side wall 713 connecting the top surface 711 to the bottom surface 712. The top surface 711 and the bottom surface 712 may be vertically bent from upper and lower ends of the connection surface 713, respectively, and may extend in the same direction. The top surface 711 and the bottom surface 712 may have the same outer shape and may be provided to face each other. A predetermined or prescribed inner space 710 may be defined by the top surface 711, the bottom surface 712, and the connection surface 713.

The upper main hole 714 through which the main rotation shaft 62 passes may be provided in one end of each of the top surface 711 and the bottom surface 712. The forming portion 712*a* protruding downward may be further provided at one end of the bottom surface 712, and the upper main hole 714 may be provided in the forming portion 712*a* of the bottom surface 712. The forming portion 712*a* may have a shape protruding downward to be in contact with a top surface of the lower main link 81. The bottom surface of the upper main link 71 and the top surface of the lower main link 81 may be spaced apart from each other by the forming portion 712*a*.

The top surface 711 and the bottom surface 712 of the upper main link 71 have shaft holes 715 and 716 in which the ends of the first upper sub link 73 and the second upper sub link 74 are axially coupled to each other, respectively. Shafts 717 and 718 may pass through the shaft holes 715 and 716, and the first upper sub link 73 and the second upper sub link 74 may be rotatably coupled to each other. A spacer 719 may be provided on each of the shafts 717 and 718. Each of the first upper sub link 73 and the second upper sub link 74 may be provided at an appropriate or predetermined height between the top and bottom surfaces of the upper main link 71 by the spacer 719 to secure smooth rotation without interfering with the upper main link 71 and the upper connection link 72.

The spacer 719 may have a cylindrical shape, and a hole may be provided in a center of the spacer 719 so that the shafts 717 and 718 pass in the vertical direction. A spacer groove 719*a* guiding an insertion of the spacer 719 may be provided in a circumferential surface of the spacer 719. When an end of each of the first upper sub link 73 and the second upper sub link 74 is inserted onto the spacer groove 719*a*, the shafts 717 and 718 may pass through the upper main link 71, the spacer 719, and the first upper sub link 73 or the second upper sub link 74.

The first upper sub link 73 and the second upper sub link 74 may be coupled to each other in a state of being rotatable inside the upper main link 71. A vertical height of each of the first upper sub link 73 and the second upper sub link 74 may be maintained in the inner space 710 of the upper main link 71 by the spacer 719*a* and be rotatable without interfering with other components constituting the upper link assembly 70.

The top surface 711 and the bottom surface 712 of the upper main link 71 may extend to have a predetermined or prescribed width. The top surface 711 and the bottom surface 712 of the upper main link 71 may be provided in a stepped shape, and strength may be reinforced to reduce a deformation of the upper main link 71 even if a load is applied.

The top surface 711 and the bottom surface 712 of the upper main link 71 may include a first section 711*b* in which the upper main hole 714 and the shaft holes 715 and 716 are formed and a second section 711*c* extending forward from the first section 711*b* and bent to be stepped in the vertical direction. A boundary between the first section 711*b* and the second section 711*c* may be stepped to provide a bent line or alternatively a straight line, thereby reinforcing the strength of the top surface 711 and the bottom surface 712 of the upper main link 71. An interval between the top surface 711 and the bottom surface 712 of the upper main link 71 in the second section 711*c* may be greater than that in the first section 711*c*.

A main tilted portion or section 711*a* may be provided on one end of each of the top surface 711 and the bottom surface 712 of the upper main link 71. When the upper link assembly 70 is fully folded, the main tilted portion 711*a* may be provided to be parallel to a bracket tilted portion 751*a* of the door bracket 75 so as not to interfere with the door bracket 75. Each of the top surface 711 and the bottom surface 712 of the upper main link 71 may have a shape that does not interfere with the door bracket 75 during the operation of the upper link assembly 70.

A thickness of the upper main link 71 may be determined by the connection surface 713, and the connection surface 713 may have a minimum or predetermined width configured to receive and accommodate the upper connection link 72, the first upper sub link 73, and the second upper sub link 74.

A connection surface opening 713*a* that is opened at a position facing the shaft 715 may be provided in the connection surface 713. The connection surface opening 713*a* may be opened so that an end of the second upper sub link 74 does not interfere with the connection surface 713 during the rotation of the second upper sub link 74. The structure of each of the upper link assembly 70 and the upper main link 71 may be more compact by the connection surface opening 713*a*.

The first upper sub link 73 may be axially coupled to the end of the upper main link 71 by the shaft 718. The first upper sub link 73 may be provided in a metal plate shape and may be supported by the spacer 719 in an inner space of the upper main link 71.

The first upper sub link 73 may extend to be connected to one side of the door bracket 75 and may be rotatably coupled by the door bracket 75 and the shaft 754. The first upper sub link 73 may have shaft holes 731 and 732 in both ends (i.e., first and second ends) thereof. Rotation shafts 718 and 754 may be coupled to the shaft holes 731 and 732, respectively, so as to be rotatably coupled to the upper main link 71 and the door bracket 75, respectively. A washer 756 may be provided on the shaft 754 connecting the first upper sub link 73 to facilitate a smooth rotation of the first upper sub link 73.

An outer portion of a circumferential or outer surface of the first upper sub link 73 may be provided in a linear shape. When the upper link assembly 70 is folded, the outer portion of the circumferential surface of the first upper sub link 73 may correspond to an outer end of the upper main link 71, which may have a straight-line shape.

A first tilted portion 734*a* and a second tilted portion 734*b* may be provided inside the first upper sub link 743 based on a sub recessed portion 733. The first tilted portion 734*a* may extend from the sub recessed portion 733 to a front end and may be in contact with the tilted portion 747 of the second upper sub link 74 when the upper link assembly 70 is fully folded. The second tilted portion 734*b* extends from the sub recessed portion 733 to a rear end and is in contact with the tilted portion 747 of the second upper sub link 74 when the upper link assembly 70 is fully unfolded. A slope of the first tilted portion 734*a* and a slope of the second tilted portion 734*b* may be different from each other, and a slope of the second tilted portion 734*b* may be greater than that of the first tilted portion 734*a*.

A sub recessed portion 733 may be provided in an inner partial section of the outer surface of the first upper sub link 73 at a side facing the second upper sub link 74. The sub recessed portion 733 may have a shape corresponding to that of an end of the second upper sub link 74, and when the upper link assembly 70 is fully unfolded, the sub recessed portion 733 and an end of the second upper sub link 74 may be fitted into each other.

When the upper link assembly 70 is fully unfolded, the first upper sub link 73 and the second upper sub link 74 may move to complete the rotation of the upper link assembly 70. Ends of the first upper sub link 73 and the second upper sub link 74 may have shapes corresponding to each other so as not to interfere with each other until the upper door 20 is fully opened. When the upper door 20 is fully opened, the upper link assembly 70 may no longer rotate due to being coupled and engaged.

The second upper sub link 74 may have a plate shape made of a metal material, and one end of the second upper sub link 74 may be rotatably mounted to the upper main link 71 by the shaft 717. The end of the second upper sub link 74 may be rotatably mounted between the first upper sub link 73 and the main rotation shaft 62.

The second upper sub link 74 may extend to be connected to the door bracket 75 and may be rotatably coupled to the door bracket 75 by the shaft 755. The second upper sub link 74 may have shaft holes 741 and 742 in both (i.e., first and second) ends thereof, and shafts 717 and 755 may be inserted through the shaft holes 731 and 732, respectively so as to be rotatably coupled to the upper main link 71 and the door bracket 75, respectively. A washer 757 may be provided on the shaft 755 connecting the second upper sub link 74 to facilitate a smooth rotation of the second upper sub link 74.

A tilted portion 747 may be provided at one side of a circumference or outer side of the second upper sub link 74, and when the upper link assembly 70 is fully folded, the tilted portion 747 may have a slope corresponding to that of the first tilted portion 734*a* of the first upper sub link 73 to be in contact with the first tilted portion 734*a*.

A sub insertion portion 745 having a shape corresponding to that of the sub recessed portion 733 may be provided in one end of the second upper sub link 74. The sub insertion portion 745 may be coupled to be engaged with the sub recessed portion 733 when the upper link assembly 70 is fully opened, and the upper link assembly 70 may not further rotate.

Each of ends of the first upper sub link 73 and the second upper sub link 74 may be connected to the door bracket 75. The door bracket 75 may be configured to support the upper door 20 at the lower side and may connect the upper link assembly 70 to the upper door 20.

The door bracket 75 may be made of a metal material and include a plate-shaped upper plate 751 and an upper shaft 752. The upper plate 751 may have a plate shape, and a plate hole 753 through which an end of each of the first upper sub link 73 and the second upper sub link 74 is axially coupled may be provided. One plate hole 753 may be provided in each of both sides, and the first upper sub link 73 and the second upper sub link 74 may be rotatably connected to each other by the shafts 754 and 755.

A portion of a circumference or outer surface of the upper plate 751 may have a bracket tilted portion 751*a* corresponding to the main tilted portion 711*a* of the upper main link 71. When the upper link assembly 70 is fully folded, the main tilted portion 711*a* of the upper main link 71 and the corresponding tilted portion 751*a* may be provided to face each other so as not to interfere with each other. An opposite side of the bracket tilted portion 751*a* on the circumference of the upper plate 751 may have a straight line shape and be provided in parallel to or along a same extension line as the end of the upper main link 71 when the upper link assembly 70 is folded.

The upper shaft 752 may extend upward from the upper plate 751 and include a pair of shafts are spaced apart from each other. The upper shaft 752 may be inserted into the bottom surface of the upper door 20, and the upper door 20 may be coupled to rotate together with the upper link assembly 70. An end of each of the first upper sub link 73 and the second upper sub link 74 may be coupled to the upper plate 751 at the bottom surface of the upper plate 751 so as not to interfere with the upper shaft 752.

The shafts 754 and 755 connecting the upper plate 751, the first upper sub link 73, and the second upper sub link 74 to each other may be provided with washers 756, 756*a*, 757, and 757*a*. The first upper sub link 73 and the second upper sub link 74 may be stably axially coupled to the upper plate 751.

A sub connection hole 743 may be further provided in the second upper sub link 74 between the shaft holes 741 and 742 at both ends of the second upper sub link 74. The second upper sub link 74 may be connected to the upper connection link 72. The shaft 744 passing through the sub connection hole 743 of the second upper sub link 74 may be coupled to pass through the connection hole 726 of the upper connection link 72, and the second upper sub link 74 and the upper connection link 72 may be rotatably coupled to each other.

The upper connection link 72 may be provided in an inner space of the upper main link 71 to prevent the first upper sub link 73 and the second upper sub link 74 from drooping downward and assist the rotation of the second upper sub link 74. One end of the upper connection link 72 may be rotatably connected to the hinge bracket 61 by the sub rotation shaft 63 to extend to an end of the upper main link 71. The upper connection link 72 may extend to pass below the first upper sub link 73 and the second upper sub link 74. The upper connection link 72 may be rotatably provided inside the upper main link 71 to support the first upper sub link 73 and the second upper sub link 74 at the lower side.

A sub rotation shaft hole 721 through which the sub rotation shaft 63 passes may be provided in one end of the upper connection link 72. The upper connection link 72 may be mounted on the hinge bracket 61 to rotate based on the sub rotation shaft 63.

A protrusion 722 may be provided on one end of the upper connection link 72 in which the sub rotation shaft hole 721 is provided. When the upper link assembly 70 is fully folded, the protrusion 722 may be in contact with an inner surface of the shielding portion 614 to restrain the upper link assembly 70 so that the upper link assembly 70 is not folded any more.

A front recessed or bent portion 723 may be provided at one side of a circumferential or outer surface of the upper connection link 72 which faces a front side. The front recessed portion 723 may be recessed so as not to interfere with the shaft 754 of the first upper sub link 73 when the upper link assembly 70 is fully folded.

A first rear recessed or bent portion 724 and a second rear recessed or bent portion 725 may be provided at one side of the circumferential surface of the upper connection link 72 which faces a rear side. The first rear recessed portion 724 and the second rear recessed portion 725 may be recessed so as not to interfere with the shaft 717 coupled to the second upper sub link 74 according to the operation of the upper link assembly 70.

For example, when the upper link assembly 70 is fully unfolded, the shaft 717 coupled to the second upper sub link 74 may be provided at the first rear recessed portion 724, and in the state in which the upper link assembly 70 is fully folded, the shaft 717 coupled to the second upper sub link 74 may be provided at the second rear recessed portion 725.

A connection hole 726 connected to the second upper sub link 74 may be further provided in the upper connection link 72. The shaft 744 passing through the sub connection hole 743 of the second upper sub link 74 may be coupled to pass through the connection hole 726. The second upper sub link 74 may rotate in a state in which the upper main link 71 and the upper connection link 72 are axially coupled to each other. The washer 746 penetrated by the shaft 744 may be provided above the upper connection link 72.

The connection hole 726 may be provided at an approximately intermediate point of the upper connection link 72. The upper connection link 72 may include a connection portion or section 727 and a support portion or section 728 which extend to left and right sides based on the connection hole 726. The connection hole 426 and the sub rotation shaft hole 721 may be provided in the connection portion 727, and each of the upper connection link 72 and the second upper sub link 74 may be rotatably coupled. The support portion 728 may be provided to extend to the first upper sub link 73 through at least the second upper sub link 74 and be provided in the inner space 710 of the upper main link 71 under the first upper sub link 73 and the second upper sub link 74.

A support member 729 may be further provided at one end of the support portion 728. The support member 729 may be mounted on the support portion 728 and be made of a plastic material. For example, the support member 729 may be made of an engineering plastic material or a polyoxymethylene (POM) material having wear resistance and lubricity.

A support member mounting portion **728*a* on which the support member 729 is mounted may be provided to be stepped or recessed in the support portion 728. A protrusion 729*a* may be provided on a bottom surface of the support member 729, and a groove 728*b* may be provided in the support member mounting portion 728*a*. The support member 729 may be fixed and mounted to the support portion 728**.

The support member 729 may protrude more than a top surface of the upper connection link 72 when mounted on the support portion 728. The support member 729 may be in contact with a bottom surface of the first upper sub link 73 while the first upper sub link 73 rotates.

The links 72, 73, and 74 may be provided in the inner space 710 of the upper main link 71 and may have a slim vertical thickness to reduce a total thickness of the multi-joint link hinge 60. During the operation of the upper link assembly 70, the first upper sub link 73 or the second upper sub link 74 may structurally droop downward. The support member 729 of the upper connection link 72 may support the first upper sub link 73 or the second upper sub link 74 to prevent the first upper sub link 73 or the second upper sub link 74 from drooping downward, preventing the first upper sub link 73 or the second upper sub link 74 from interfering with other components.

When a heavy object is accommodated in the upper door 20 or an excessive downward load is applied, the upper link assembly 70 may partially droop. While the upper door 20 is opened and closed, the first upper sub link 73 and the second upper sub link 74 may be unfolded to be more susceptible to drooping.

Even if the first upper sub link 73 or the second upper sub link 74 droops, the first upper sub link 73 and the second upper sub link 74 may be supported by the support portion 725 at the lower side. The first upper sub link 73 may be in contact with the support member 729 if downward drooping occurs during the rotational operation. The rotation of the first upper sub link 73 may be more smoothly performed. When the first upper sub link 73 is supported by the protruding support member 729, the second upper sub link 74 may be maintained to be spaced apart from the upper connection link 72. The second upper sub link 74 may rotate smoothly without interfering with the upper connection link 72.

Figure 22:
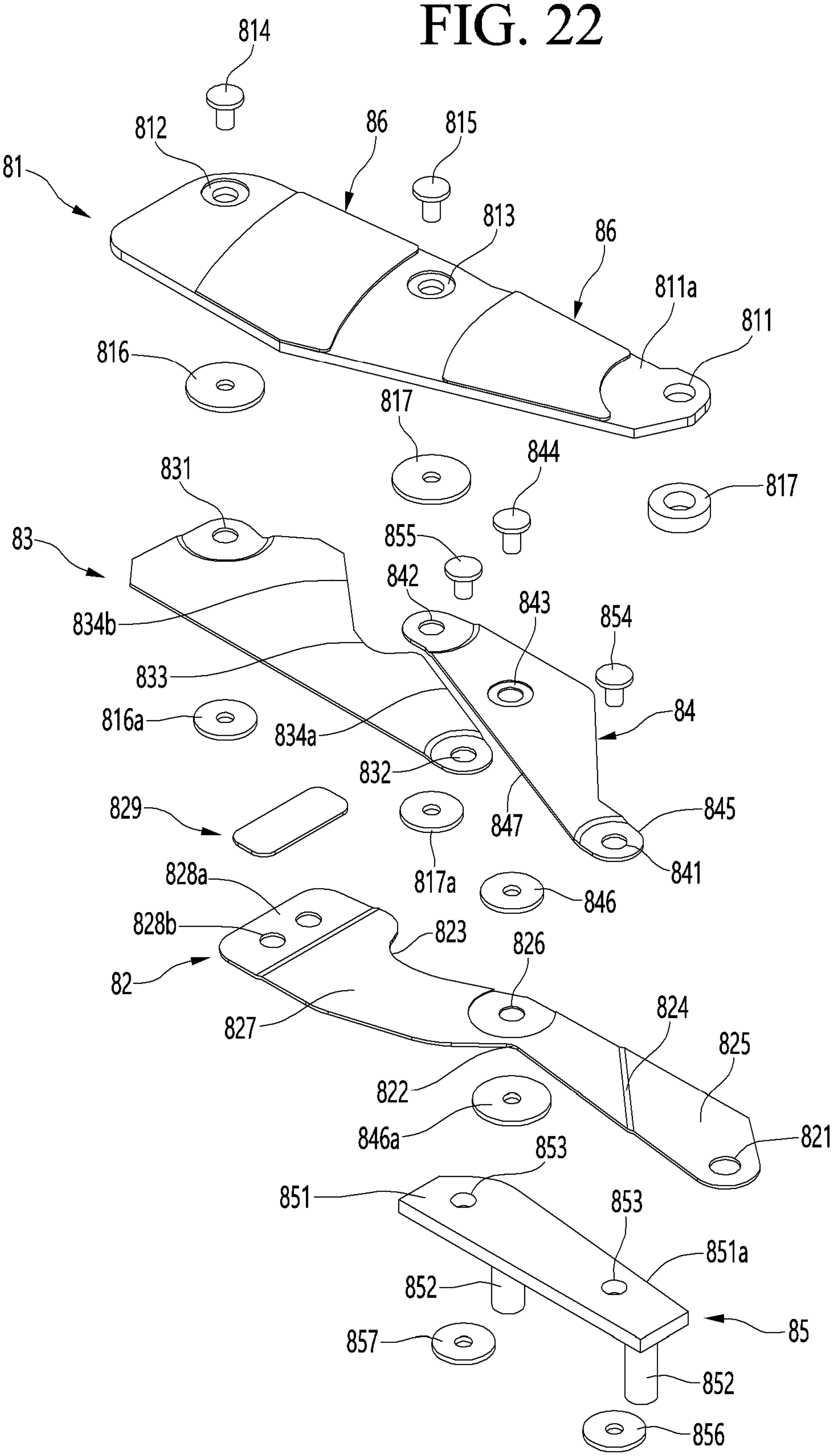
FIG. 22 is an exploded perspective view of a lower link module that is one component of the center hinge when viewed from the upper side.
Figure 23:
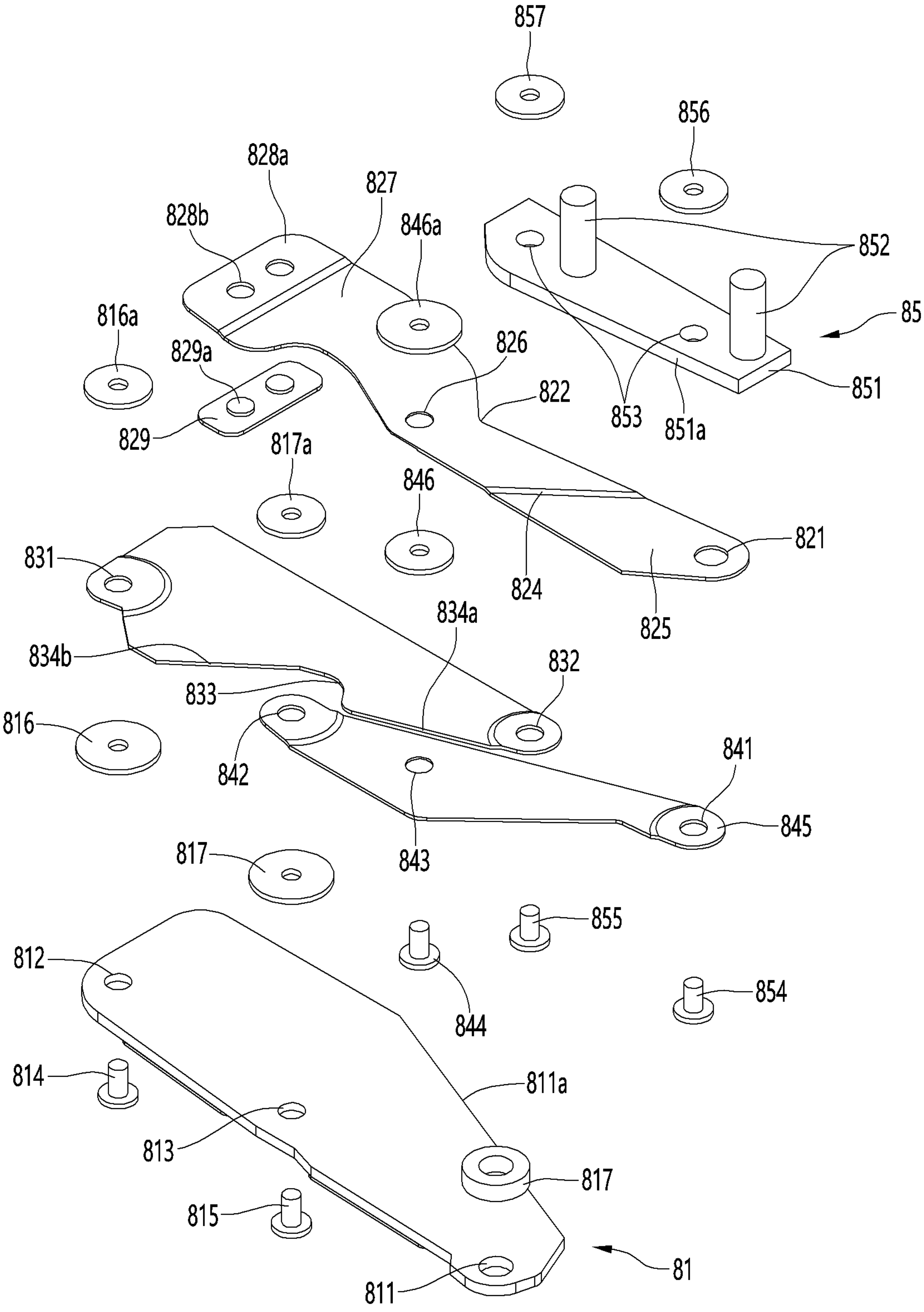
FIG. 23 is an exploded perspective view of the lower link module when viewed from the lower side.
Figure 24:
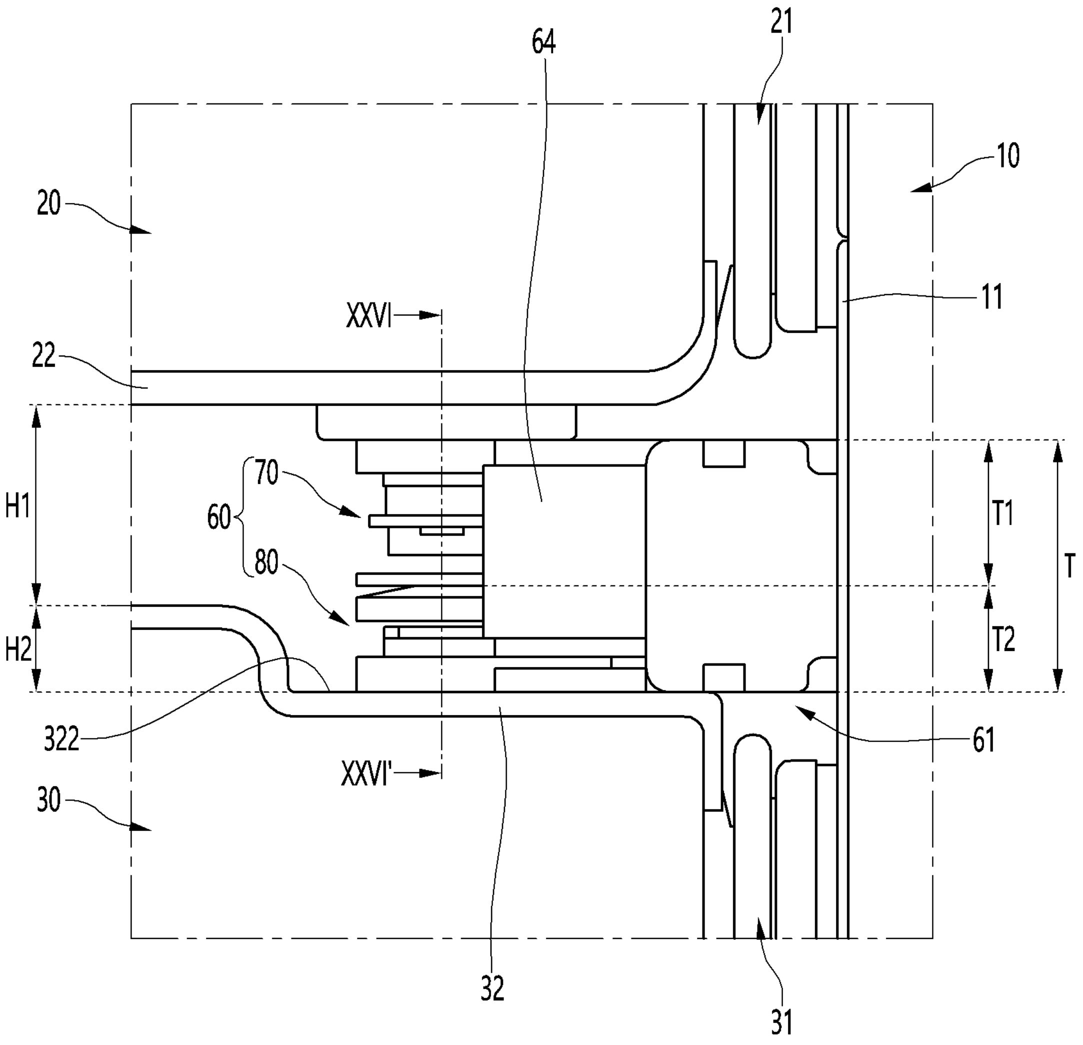
FIG. 24 is a view illustrating a state in which the center hinge is mounded when viewed from one side.

Referring to FIGS. 22-23, the lower link assembly 80 may have the same or similar planar shape as the upper link assembly 70 as a whole and may have the same or similar structure and shape as the upper link assembly 70 when viewed from an upper side even in the state of being folded or unfolded. The lower link assembly 80 may include the lower main link 81, the first lower sub link 83, the second lower sub link 84, and a lower door bracket 85. The first lower sub link 83 and the second lower sub link 84 may be rotatably connected to each other between the lower main link 81 and the door bracket 85. The lower link assembly 80 may further include the lower connection link 82 connecting the second lower sub link 84 to the hinge bracket 61.

The lower main link 81 may be made of a plate-shaped metal material. Like the planar shape of the upper main link 71, the lower main link 81 may have a shape that does not interfere with the hinge bracket 61, the lower door 30, and the lower door bracket 85 during the rotation. The hinge bracket 61, the lower main link 81, and the lower door bracket 85 may be configured so as not to interfere with each other during the folding or unfolding.

A lower main hole 811 through which the main rotation shaft 62 passes may be provided in one end of the lower main link 81. A spacer 817 through which the main rotation shaft 62 passes may be further provided below the lower main hole 811, and the lower main link 81 may be maintained to be spaced apart from the bottom surface of the hinge bracket 61.

Shaft holes 812 and 813 in which ends of the first lower sub link 83 and the second lower sub link 84 are axially coupled, respectively, may be provided in the lower main link 81. The shafts 814 and 815 may pass through the shaft holes 812 and 813, and the first lower sub link 83 and the second lower sub link 84 may be rotatably coupled to each other. At least one washer 816, 816*a*, 817, and 817*a* may be provided on the shafts 814 and 815. An interval space between the lower main link 81, the first lower sub link 83, and the second lower sub link 84 may be constantly maintained by the washers 816, 816*a*, 817, and 817*a* to facilitate a smooth rotational operation.

A main tilted portion 711*a* may be provided on one end of the lower main link 81. When the lower link assembly 80 is fully folded, the main tilted portion 711*a* may be provided to be parallel to the bracket tilted portion 751*a* of the lower door bracket 85 so as not to interfere with the lower door bracket 85.

The lower main link 81 may have a plate shape. A thickness of the lower main link 81 may be thinner than that of the upper main link 71. A thickness of the entire lower link assembly 80 may be significantly less than that of the upper link assembly 70. The lower link assembly 80 may simply fix the upper end of the lower door 30 so that a substantial load of the lower door 30 is supported by the lower hinge 50. The thickness of the upper link assembly 70 may be reduced or minimized to accommodate the thickness of the lower link assembly 80, and the multi-joint link hinge 60 may have a reduced thickness.

A pair of supporters 86 may be provided on a top surface of the lower main link 81. The supporter 86 may support the upper link assembly 70 so as not to be caught and restricted by the lower link assembly 80 even if downward drooping occurs during rotation of the upper link assembly 70. The supporter 86 may be made of engineering plastic or POM material having abrasion resistance and lubricity. When the upper link assembly 70 is in contact with the supporter 86, the upper link assembly 70 may not be caught, but smoothly rotate.

The first lower sub link 83 may have a metal plate shape and may be axially coupled to an end of the lower main link 81 by the shaft 814. The first lower sub link 83 may extend to be connected to one side of the lower door bracket 85 and may be rotatably coupled by the lower door bracket 85 and the shaft 855. The first lower sub link 83 may have shaft holes 831 and 832 provided in both ends thereof, and shafts 814 and 855 may be inserted through the shaft holes 831 and 832, respectively, to be rotatably coupled to the lower main link 81 and the lower door bracket 85, respectively. Washers 816, 816*a*, and 857 may be provided on the shaft 814 and 855 to which the first lower sub link 83 is axially coupled to allow the first lower sub link 83 to smoothly rotate.

A portion of an outer portion of a circumferential or outer surface of the first lower sub link 83 may be provided in a linear shape. In a state in which the lower link assembly 80 is folded, an outer portion of the circumferential surface of the first lower sub link 83 may have a straight-line shape to correspond to an outer end of the lower main link 81. A sub recessed portion 833 may be provided in an inner partial section of the circumferential surface of the first lower sub link 83 at a side facing the second lower sub link 84.

A first tilted portion 834*a* and a second tilted portion 834*b* may be provided inside the first lower sub link 84 based on a sub recessed portion 833. The first tilted portion 834*a* may extend from the sub recessed portion 833 to a front end and be in contact with the tilted portion 847 of the second lower sub link 84 when the lower link assembly 80 is fully folded. The second tilted portion 834*b* may extend from the sub recessed portion 833 to a rear end and be in contact with the tilted portion 847 of the second lower sub link 84 when the lower link assembly 80 is fully unfolded. A slope of the first tilted portion 834*a* and a slope of the second tilted portion 834*b* may be different from each other, and a slope of the second tilted portion 834*b* may be greater than that of the first tilted portion 834*a*.

The sub recessed portion 833 may have a shape corresponding to that of an end of the second lower sub link 84, and when the lower link assembly 80 is fully unfolded, the sub recessed portion 833 and an end of the second lower sub link 84 may be fitted into each other. Even if the lower link assembly 80 is fully unfolded, the first lower sub link 83 and the second lower sub link 84 may interfere with each other to complete the rotation of the lower link assembly 80. Ends of the first lower sub link 83 and the second lower sub link 84 may have shapes corresponding to each other so as not to interfere with each other until the lower door 30 is fully opened. When the lower door 30 is fully opened, the lower link assembly 80 no longer rotates due to being coupled and engaged.

The second lower sub link 84 may have a plate shape made of a metal material, and one end of the second lower sub link 74 may be rotatably mounted to the upper main link 81 by the shaft 815. One end of the second lower sub link 84 may be rotatably mounted between the shaft 814 to which the first lower sub link 83 is coupled and the main rotation shaft 62.

The second lower sub link 84 may extend to be connected to the lower door bracket 85 and may be rotatably coupled by the lower door bracket 85 and the shaft 854. The second lower sub link 84 may have shaft holes 841 and 842 in both ends thereof, and shafts 815 and 854 may be coupled to the shaft holes 841 and 842 so as to be rotatably coupled to the lower main link 81 and the lower door bracket 85, respectively. Washers 817, 817*a*, and 856 may be provided on the shaft 815 and 854 to which the second lower sub link 84 is axially coupled to allow the second lower sub link 84 to smoothly rotate.

A sub insertion portion or tab 845 having a shape corresponding to that of the sub recessed portion 733 may be provided at an end of the second lower sub link 84 through which the shaft 854 passes. The sub insertion portion 845 may be coupled to be engaged with the sub recessed portion 833 when the lower link assembly 80 is fully opened so that the lower link assembly 80 does not further rotate.

Each of the ends of the first lower sub link 83 and the second lower sub link 84 may be connected to the lower door bracket 85. The lower door bracket 85 may be connected to the top surface of the lower door 30 to connect the lower link assembly 80 to the lower door 30.

The lower door bracket 85 may be made of a metal material and include a plate-shaped lower plate 851 and a lower shaft 852. The lower plate 851 may have a plate shape, and a plate hole 853 through which an end of each of the first lower sub link 83 and the second lower sub link 84 is axially coupled may be provided. One plate hole 853 may be provided in each of both sides, and the first lower sub link 83 and the second lower sub link 84 may be rotatably connected to each other by the shafts 854 and 855.

A portion of a circumference or outer surface of the lower plate 851 may have a tilted portion 851*a* corresponding to the tilted portion 811*a* of the lower main link 81. When the lower link assembly 80 is fully folded, the tilted portion 811*a* of the lower main link 81 and the corresponding tilted portion 851*a* may be provided to face each other so as not to interfere with each other. An opposite side of the tilted portion 851*a* on the circumference of the lower plate 851 may have a straight line shape and be provided in parallel to or in the same extension line as the end of the lower main link 81 when the lower link assembly 80 is folded.

The lower shaft 852 may extend downward from the lower plate 851 and be provided as a pair of shafts spaced apart from each other. The lower shaft 852 may be inserted into the bottom surface of the lower door 20, and the lower door 30 may be coupled to rotate together with the lower link assembly 80. An end of each of the first lower sub link 83 and the second lower sub link 84 may be coupled to the lower plate 851 at the top surface of the lower plate 851 so as not to interfere with the lower shaft 852. The shafts 854 and 855 connecting the lower plate 851, the first lower sub link 83, and the second lower sub link 84 to each other may be provided with at least one or more washers 856 and 857, and the first lower sub link 83 and the second lower sub link 84 may be stably axially coupled to the lower plate 851.

A sub connection hole 843 may be provided in the second lower sub link 84 between the shaft holes 841 and 842 at each of both ends of the second lower sub link 84. The shaft 844 may pass through the sub connection hole 843 of the second lower sub link 84 and may be coupled to pass through the connection hole 826 of the lower connection link 82. The second lower sub link 84 and the lower connection link 82 may be rotatably coupled to each other.

The lower connection link 82 may be provided under the first lower sub link 83 and the second lower sub link 84 to prevent the first lower sub link 83 and the second lower sub link 84 from drooping downward and assist the rotation of the second lower sub link 84. One end of the lower connection link 82 may be rotatably connected to the hinge bracket 61 by the sub rotation shaft 63 to extend to an end of the lower main link 81. The lower connection link 82 may extend to pass below the first lower sub link 83 and the second lower sub link 84. The lower connection link 82 may be rotatably provided inside the lower main link 81 to support the first lower sub link 83 and the second lower sub link 84 at the lower side.

A sub rotation shaft hole 821 through which the sub rotation shaft 63 passes may be defined in one end of the lower connection link 82. The lower connection link 82 may be mounted on the hinge bracket 61 to rotate based on the sub rotation shaft 63.

A front recessed portion 822 may be provided at one side of a circumferential or outer surface of the lower connection link 82 which faces a front side. The front recessed portion 822 may be recessed so as not to interfere with the shaft 855 of the first lower sub link 83 when the lower link assembly 80 is fully folded.

A rear recessed portion 823 may be provided at one side of a circumferential or outer surface of the lower connection link 82 which faces the rear side. The rear recessed portion 823 may be recessed so as not to interfere with the shaft 814 coupled to the first lower sub link 83 according to the operation of the lower link assembly 80. For example, a shaft 814 coupled to the first lower sub link 83 may be provided in the rear recessed portion 823 when the lower link assembly 80 is fully unfolded.

A connection hole 826 connected to the second lower sub link 84 may be further provided in the lower connection link 82. The shaft 844 passing through the sub connection hole 743 of the second lower sub link 84 may be coupled to pass through the connection hole 826. The second upper sub link 74 may rotate when the upper main link 71 and the upper connection link 72 are axially coupled to each other. The connection hole 826 may be provided at an approximately intermediate point of the upper connection link 72. The washers 846 and 846*a* penetrated by the shaft 844 may be provided above and below the lower connection link 82.

A bent portion 824 may be provided on the lower connection link 82. The lower connection link 82 may include a first connection portion 825 and a second connection portion 827 based on the bent portion 824. The first connection portion 825 may be provided higher than the second connection portion 827 by the bent portion 824, and the lower connection link 82 may be stepped. A difference in height between the first connection portion 825 and the second connection portion 827 may be greater than a thickness of each of the first lower sub link 83 and the second lower sub link 84. A space may be defined between an upper side of the second connection portion 827 and a lower side of the lower main link 81 so that the first lower sub link 83 and the second lower sub link 84 may rotate smoothly.

A sub rotation shaft hole 821 through which the sub rotation shaft 63 passes may be provided in an end of the first connection portion 825. The lower connection link 82 may rotate about the sub rotation shaft 63 in the hinge bracket 61. A connection hole 826 may be provided in the second connection portion 827, and the second upper sub link 74 may have a rotatable coupling structure. The lower connection link 82 and the second lower sub link 84 may be rotatable with each other around the shaft 844.

The second connection portion 827 may extend to the first lower sub link 83 via the second lower sub link 84 to support the first lower sub link 83 under the first lower sub link 83 and the second lower sub link 83. A support member 829 may be further provided at one end of the second connection portion 827. The support member 829 may be mounted on an end of the second connection portion 828 and be made of a plastic material (e.g., an engineering plastic material or a POM material having wear resistance and lubricity).

A support member mounting portion 828*a* on which the support member 829 is mounted may be provided to be stepped or recessed in the second connection portion 827. A protrusion 829*a* may be provided on a bottom surface of the support member 829, and a groove 828*b* may be defined in the support member mounting portion 828*a*. The protrusion 829*a* and the groove 828*b* may be coupled to each other so that the support member 829 is fixed to the support member mounting portion 828*a*.

The support member 829 may protrude more than a top surface of the upper connection link 72 when mounted on the second connection portion 827. The support member 829 may be in contact with a bottom surface of the first lower sub link 83 while the first lower sub link 83 rotates.

The lower link assembly 80 may have a plate-like structure having a thin thickness to reduce a total thickness of the multi-joint link hinge 60. During the operation of the lower link assembly 80, the first lower sub link 83 or the second lower sub link 84 may structurally droop downward. The support member 829 of the lower connection link 82 may support the first lower sub link 83 or the second lower sub link 84 to prevent the first lower sub link 83 or the second lower sub link 84 from drooping downward, thereby preventing the first lower sub link 73 or the second lower sub link 74 from interfering with other components.

When a heavy object is provided in the lower door 30 or an excessive downward load is applied, the lower link assembly 80 may partially droop. While the lower door 30 is opened and closed, the first lower sub link 83 and the second lower sub link 84 may be unfolded to be more susceptible to the drooping.

Even if the first lower sub link 83 and the second lower sub link 84 droop, the first lower sub link and the second lower sub link may be supported by the second connection portion 827 at the lower side. The first lower sub link 83 may be in contact with the support member 829 if downward drooping occurs during rotation to facilitate a smooth rotation of the first lower sub link 83. When the first lower sub link 83 is supported by the protruding support member 829, the second lower sub link 84 may be naturally maintained in a state of being spaced apart from the lower connection link 72. The second lower sub link 84 may rotate smoothly without interfering with the lower connection link 72.

Figure 25:
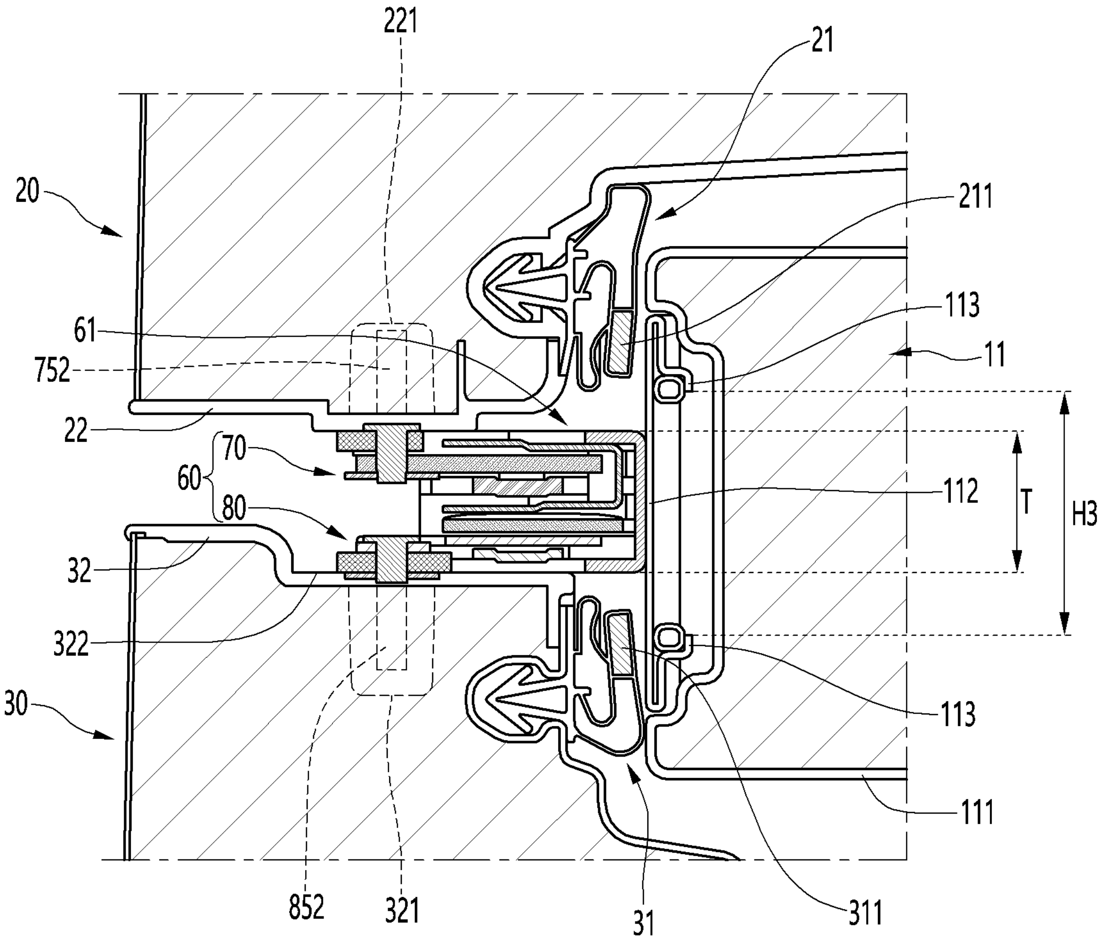
FIG. 25 is a cross-sectional view taken along line XXX-XXX' of FIG. 1.
Figure 26:
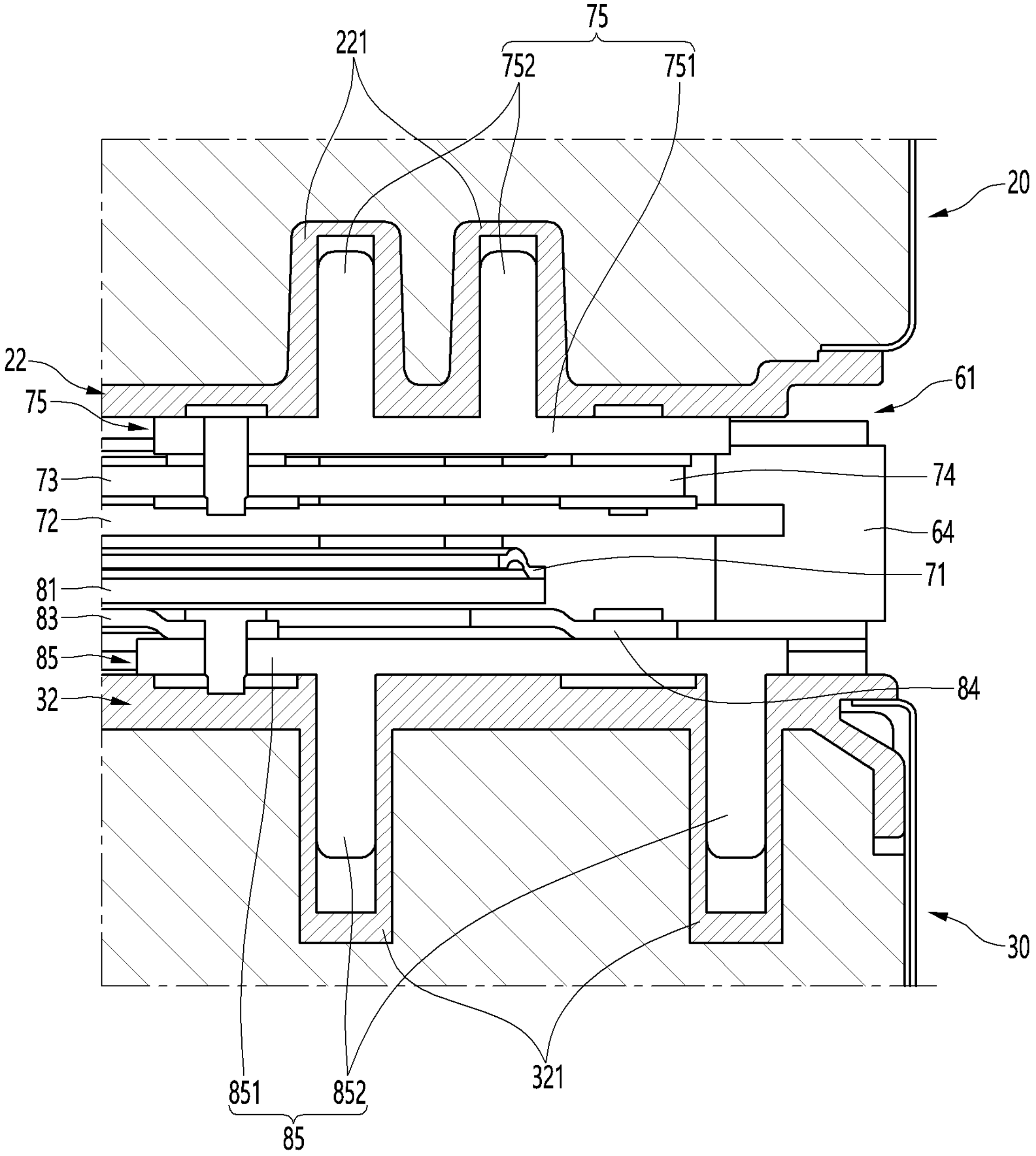
FIG. 26 is a cross-sectional view taken along line XXVI-XXVI' of FIG. 24.

Referring to FIGS. 25-26, the multi-joint link hinge 60 may be provided between the upper door 20 and the lower door 30 and may be mounted on the front surface of the cabinet 10. A total thickness T of the multi-joint link hinge 60 may correspond to a vertical width of the hinge bracket 61. The thickness T1 of the upper link assembly 70 may be greater than a thickness T2 of the lower link assembly 80. Since the upper link assembly 70 and the lower link assembly 80 are provided in the receiving space 610 inside the hinge bracket 61, the sum of the thickness T1 of the upper link assembly 70 and the thickness T2 of the lower link assembly 80 may be equal to or slightly less than the thickness T of the hinge bracket 61.

The multi-joint link hinge 60 may be between the bottom surface of the upper door 20 and the top surface of the lower door 30. When viewed from the front side, at least a portion of the multi-joint link hinge 60 may be covered.

An upper decor or frame 22 may be provided on the bottom surface of the upper door 20. The upper decor 22 may define the bottom surface of the upper door 20, and an upper link mounting portion 221 may be provided on one end of the upper decor 22. The upper link mounting portion 221 may be recessed upward, and the upper shaft 752 of the upper link assembly 70 may be inserted into the upper link mounting portion 221. The door bracket 45 may be coupled to the upper link mounting portion 221, and the upper link assembly 70 may be mounted to support the upper door 20 at the lower side and rotate by the upper link assembly 70.

A lower decor 32 may be provided on the bottom surface of the lower door 30. The lower decor 32 may define a top surface of the lower door 30, and the lower link mounting portion 321 may be provided on one end of the lower decor 32. The lower link mounting portion 321 may be recessed downward, and the lower shaft 852 of the lower link assembly 80 may be inserted into the upper link mounting portion 221. The door bracket 55 may be coupled to the lower link mounting portion 321, and the lower door 30 may rotate by the lower link assembly 80.

A decor recessed portion or recess 322 may be provided in the lower decor 32. The decor recessed portion 322 may be recessed downward, and a lower link mounting portion 321 may be provided at the decor recessed portion 322.

The decor recessed portion 322 may be recessed by a predetermined depth H1 and be provided under the multi-joint link hinge 60. When viewed from the front side, the lower portion of the multi-joint link hinge 60 may be covered by the lower door 30. A height of the upper end of the lower door 30 may be less than that of the lower end of the upper link assembly 70. When the upper link assembly 70 operates, the upper link assembly 70 may not interfere with the upper end of the lower door 30.

A distance H1 between the lower end of the upper door 20 and the upper end of the lower door 30 may be less than the thickness T of the multi-joint link hinge 60 and greater than the thickness T1 of the upper link assembly 70. While the upper link assembly 70 may operate smoothly, an exposure of the multi-joint link hinge 60 may be reduced or minimized. The multi-joint link hinge 60 may allow the upper door 20 and the lower door 30 to reduce or minimize the exposure of the multi-joint link hinge 60 between the upper door 20 and the lower door 30 while allowing the upper door 20 and the lower door 30 to be smoothly opened and/or closed. A gap between the upper door 20 and the lower door 30 may be reduced to improve an outer appearance when the upper door 20 and the lower door 30 are closed.

The multi-joint link hinge 60 may be mounted on a front surface of a barrier plate 112 defining the front surface of the barrier 11. The multi-joint link hinge 60 may be provided at an intermediate position with respect to a vertical height of the barrier 11.

The barrier 11 may include a barrier case 111 in which an insulating material is provided and the barrier plate 112. The barrier plate 112 may be mounted in a recessed space in front surface of the barrier case 111 to define the front surface of the barrier 11. A pair of heating members 113 may be provided on a rear surface of the barrier plate 112. The heating members 113 may be provided along the barrier 11 and be provided at positions corresponding to the upper door gasket 21 and the lower door gasket 31 on the rear surfaces of the upper door 20 and the lower door 30, respectively. Magnets 211 and 311 may be embedded in the upper door gasket 21 and the lower door gasket 31, respectively. The upper door gasket 21 and the lower door gasket 31 may be in close contact with the front surface of the barrier plate 112 made of a metal material.

Each of the heating members 113 may be provided on the rear surface of the barrier plate 112 corresponding to the position of each of the magnets 211 and 311 to extend in a horizontal direction along the barrier plate 112. The heating members 113 may be arranged vertically and may be spaced a predetermined or prescribed distance H3 from each other. The multi-joint link hinge 60 may be provided between the heating members 113. Each of the thickness of the multi-joint link hinge 60 and the vertical width of the hinge bracket 61 may be less than the distance H3 between the heating members 113.

Even if the hinge bracket 61 is screwed on the barrier 11 *b*, the heating member 113 may be prevented from being damaged. Since ends of the upper door gasket 21 and the lower door gasket 31 may be provided at positions corresponding to the heating members 113, respectively, the upper door gasket 21 and the lower door gasket 31 may be prevented from interfering or colliding with the multi-joint link hinge 60.

The multi-joint link hinge 60 may be provided between the upper door gasket 21 and the lower door gasket 31, but may not be provided at a center between the upper door gasket 21 and the lower door gasket 31. The multi-joint link hinge 60 may be provided farther from a lower end of the upper door gasket 21 than from an upper end of the lower door gasket 31. The upper door gasket 21 may droop downward by its own weight in the mounted state, and a distance between the multi-joint link hinge 60 and the upper door gasket 21 may be greater than that between the multi-joint link hinge 60 and the lower door gasket 31. Even if the upper door gasket 21 droops or sags due to continuous, extended use, collision with the multi-joint link hinge 60 may be prevented.

An exposure of the multi-joint link hinge 60 may be reduced or minimized, and when the upper link assembly 70 and the lower link assembly 80 operate, an interference or collision between the upper door gasket 21 and the lower door gasket 31 may be prevented to facilitate a smooth rotation of the upper door 20 and the lower door 30.

Figure 27:
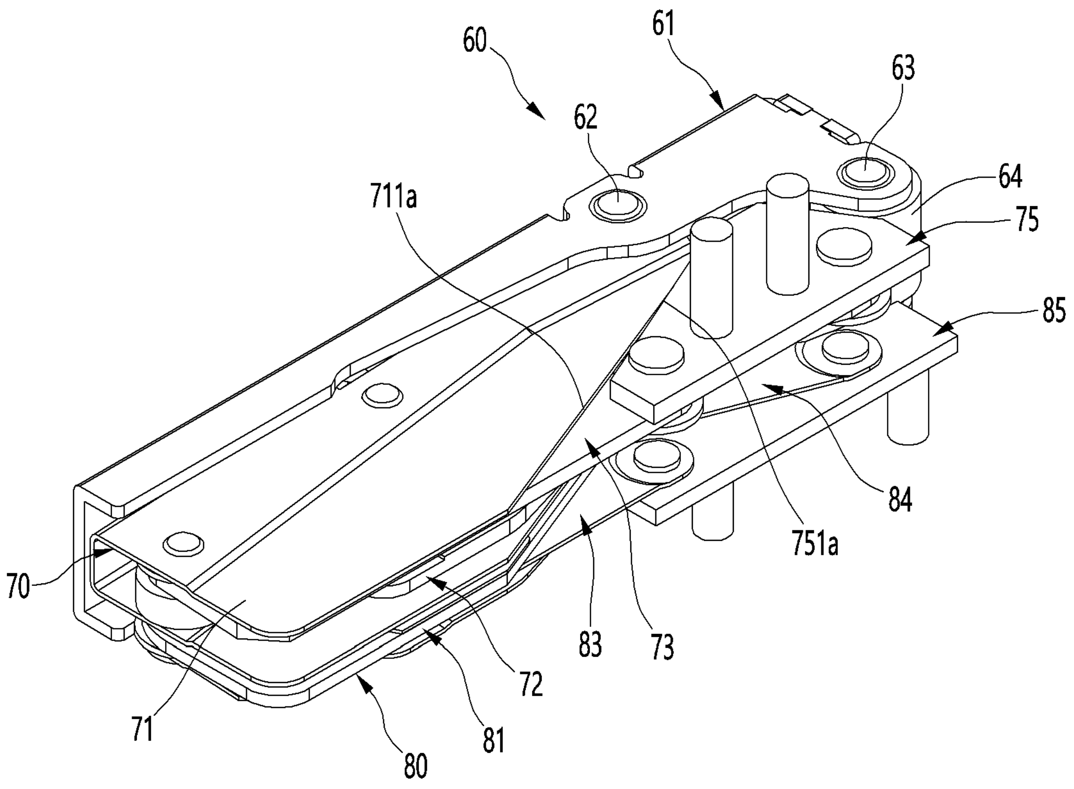
FIG. 27 is a view illustrating a state of the center hinge in a state in which all the upper door and the lower door are closed.

Referring to FIG. 27, when both the upper door 20 and the lower door 30 are closed, the multi-joint link hinge 60 may be in a compact state and have a substantially hexahedral shape. In this compact state, a space occupied by the multi-joint link hinge 60 may be reduced or minimized, and the multi-joint link hinge 60 may be effectively provided in a narrow space between the upper door 20 and the lower door 30.

The upper link assembly 70 and the lower link assembly 80 may be provided in an inner region of the hinge bracket 61 in the fully folded state. The first upper sub link 73, the second upper sub link 74, and the upper connection link 72 may be provided in the inner space of the upper main link 71 constituting the upper link assembly 70.

The upper door bracket 75 may be provided inside a space defined by the tilted portion 711*a* of the top surface of the upper main link 71 and the front end of the hinge bracket 61. The tilted portion 751*a* of the rear surface of the door bracket 75 may be provided to face each of the tilted portion 711*a* of the top surface of the upper main link 71 and the front end of the hinge bracket 61, and the front surface of the door bracket 75 may be provided parallel to the front end of the upper main link 71. In such an arrangement, the upper link assembly 70 may define a top surface shape of the multi-joint link hinge 60 together with the side 612 of the hinge bracket 61.

The lower link assembly 80 may be provided below the upper link assembly 70 in the fully folded state. The lower main link 81 may be provided below the upper main link 71, and the first lower sub link 83 and the second sub lower link 84 may be provided below the lower main link 81 in the state of being fully folded.

All the first lower sub link 83, the second sub lower link 84, and the lower door bracket 85 may be in the fully folded state and be maintained in the hexahedral shape as a whole without protruding to the outside of 60 like the upper link assembly 70. A straight section of the front end of the upper main link 71, a straight section of the front end of the first upper sub link 73, and a straight section of the front end of the upper door bracket 75 may be provided in a same extension line or in a straight line adjacent to the extension line. Thus, the multi-joint link hinge 60 may have a compact and clean appearance in the folded state.

When the user opens the upper door 20 or the lower door 30 from the compact state, the upper door 20 and the lower door 30 start to rotate, and the multi-joint link hinge 60 may operate. When the upper door 20 and the lower door 30 rotate, the upper hinge 40 connected to the upper end of the upper door 20 and the lower hinge 50 connected to the lower end of the lower door 30 may rotate along the same trajectory as the multi-joint link hinge 60. The upper link assembly 70 may rotate in the same manner as the rotational trajectory of the upper hinge 40 by the guide of the upper hinge 40, and the lower link assembly 80 may rotate in the same manner as the rotational trajectory of the lower hinge 50 by the guide of the lower hinge 50.

A structure and shape of the lower link assembly 80 may be the same as or similar to those of the upper link assembly 70. The lower main link 81, the first lower sub link 83, the second lower sub link 84, and the lower door bracket 85 may have the same or similar planar shape as the upper link assembly 70. When the lower link assembly 80 is folded, the lower link assembly 80 may have the same outer appearance structure as the upper link assembly 70.

Referring to FIGS. 28-31, when the user opens the upper door 20, the upper link assembly 70 starts to rotate. According to the rotation operation of the upper door 20, the upper link assembly 70 may operate from the fully folded state of FIG. 28 to the fully unfolded state of FIG. 31. The figures may demonstrate cases where an angle between the front surface of the upper door 20 and the front surface of the cabinet 10 is about 13° in FIG. 28, about 30° in FIG. 29, about 90° in FIG. 30, and about 130° in FIG. 31.

According to the user's manipulation for the upper door 20, the upper hinge 40 and the upper link assembly 70 of the multi-joint link hinge 60 operate, and the upper door 20 may rotate together along the rotational trajectory of the upper link assembly 70 of the multi-joint link hinge 60 and then be opened. The upper link assembly 70 may operate and support the upper door 20 from the lower side. The upper link assembly 70 may be sequentially changed in state as illustrated in FIGS. 28 to 31 until the upper door 20 starts to rotate and then is fully opened.

The upper main link 71 may rotate in a counterclockwise direction with respect to the main rotation shaft 62 together with the opening of the upper door 20, and the upper connection link 72 may start to rotate in a counterclockwise direction with respect to the sub rotation shaft 63. Ends of the first upper sub link 73 and the second upper sub link 74 connected to the upper main link 71 start to rotate in a clockwise direction. The upper door bracket 75 connected to the other ends of the first upper sub link 73 and the second upper sub link 74 may rotate in the counterclockwise direction.

The upper main link 71, the first upper sub link 73, and the second upper sub link 74 may be provided inside the upper main link 71, and the upper main link 71, the first upper sub link 73, and the second upper sub link 74 may rotate while moving together with the upper main link 71. The upper connection link 72 may be provided under the first upper sub link 73 and the second upper sub link 74 to support the first upper sub link 73 and the second upper sub link 74, preventing drooping of the first upper sub link 73 and the second upper sub link 74.

The first upper sub link 73 and the second upper sub link 74 may rotate while being spaced apart from each other, and the first tilted portion 734*a* of the first upper sub link 73 and the tilted portions 747 of the second upper sub link 74 may face each other. While the upper main link 71 and the upper connection link 72 continuously rotate according to an opening of the upper door 20, the first upper sub link 73 and the second upper sub link 74 also rotate together.

Figure 28:
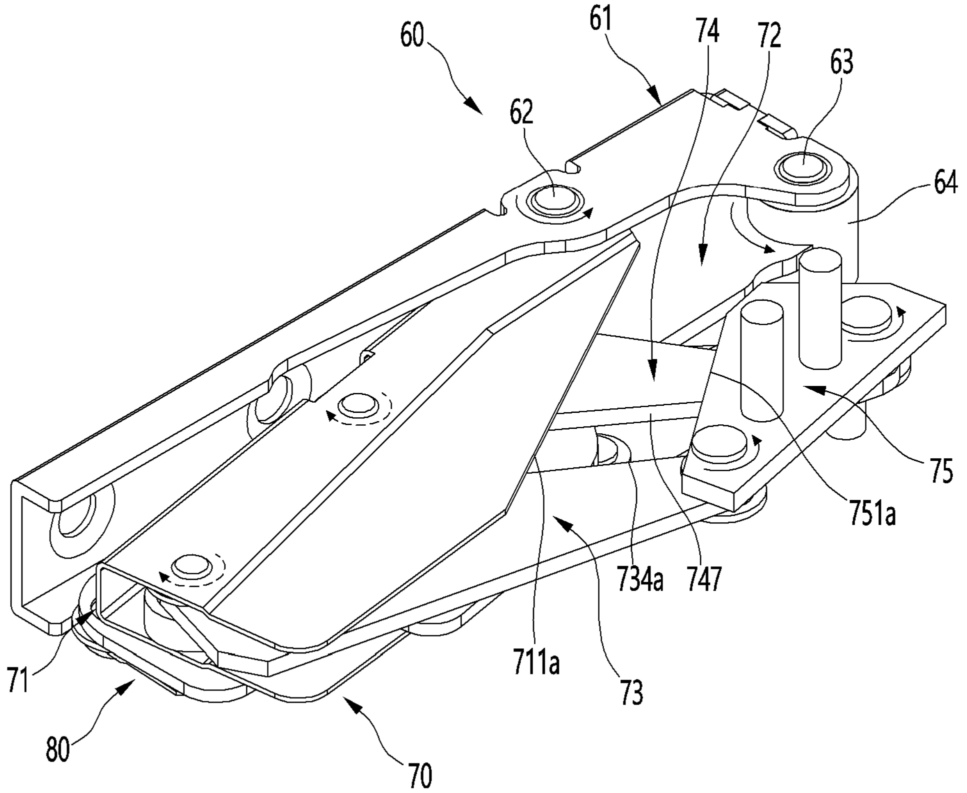
FIG. 28 is a view illustrating a state of the center hinge in a state in which the upper door is opened at a set angle.
Figure 29:
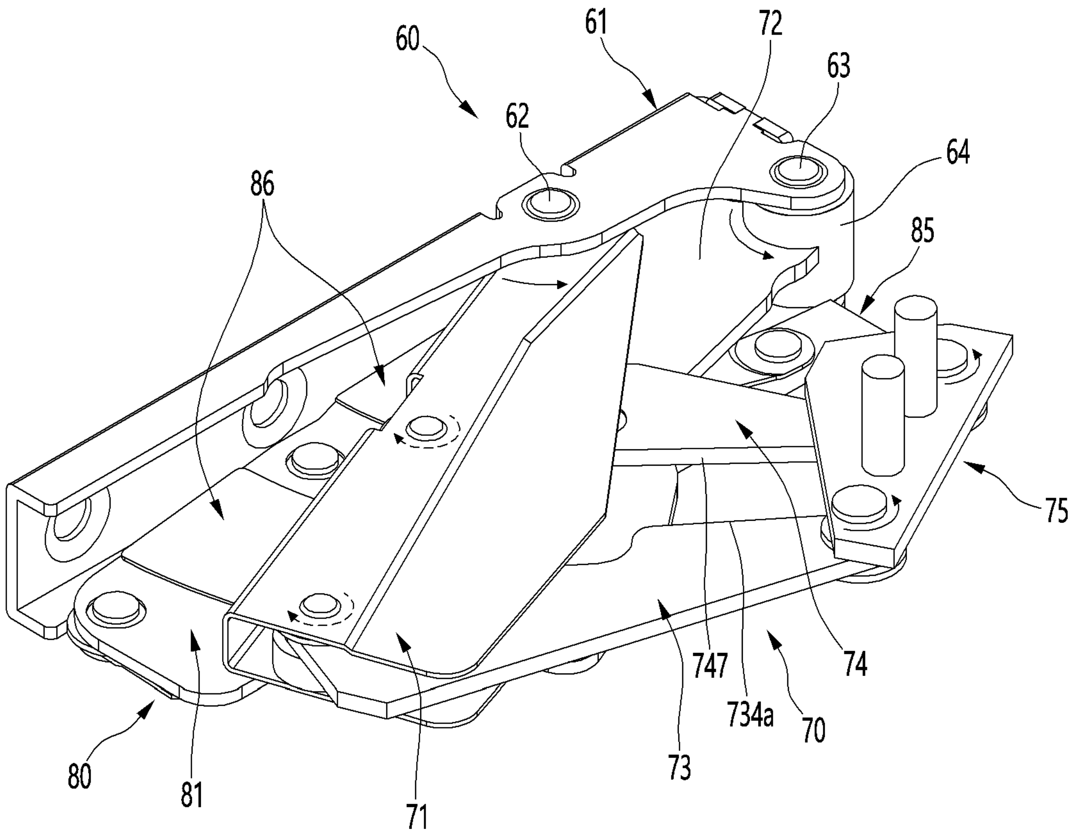
FIG. 29 is a view illustrating a state of the center hinge in a state in which the upper door is opened more than in FIG. 28.
Figure 30:
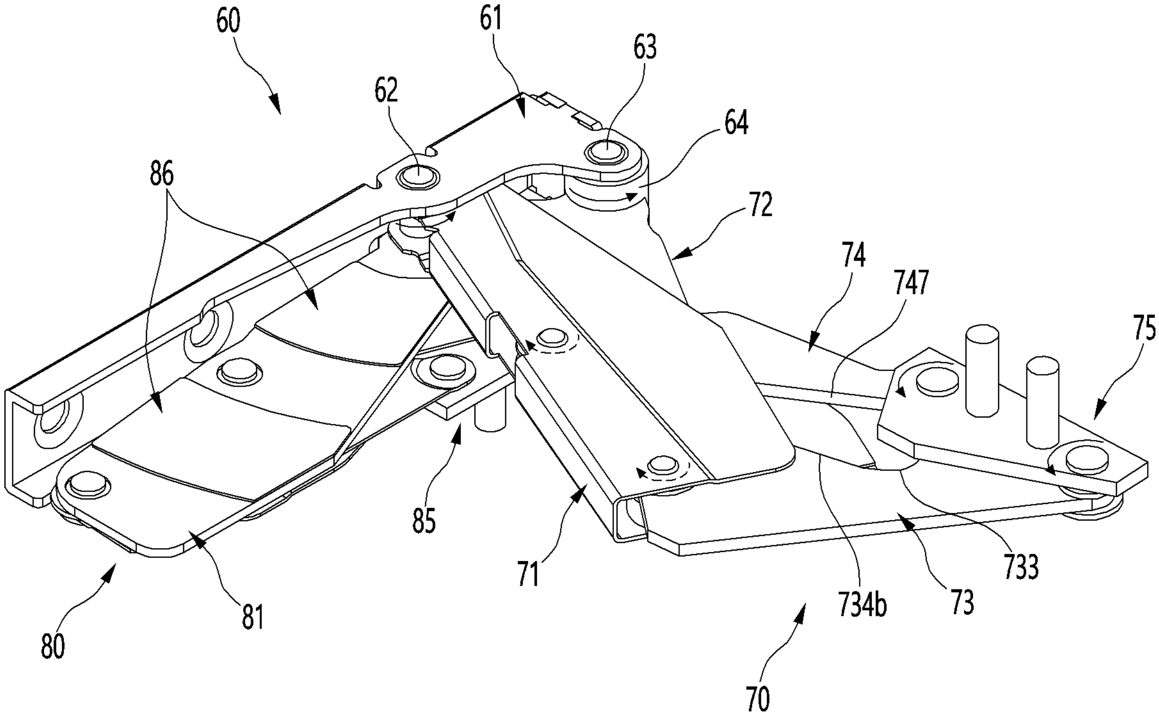
FIG. 30 is a view illustrating a state of the center hinge in a state in which the upper door is opened more than in FIG. 29.
Figure 31:
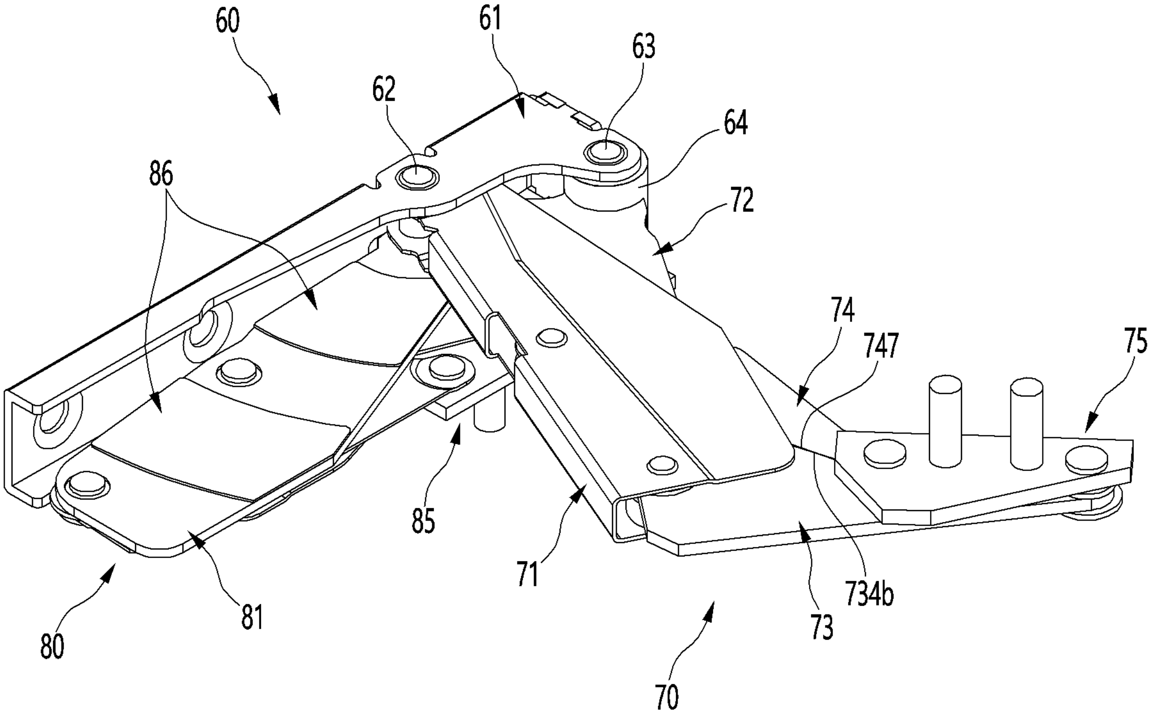
FIG. 31 is a view illustrating a state of the center hinge in a state in which the upper door is fully opened.

The first tilted portion 734*a* of the first upper sub link 73 and the tilted portion 747 of the second upper sub link 74 may be spaced away from each other as illustrated in FIGS. 28 and 29. When the upper link assembly 70 is further unfolded, as illustrated in FIGS. 30 and 31, the second tilted portion 734*b* of the first upper sub link 73 and the tilted portion 747 of the second upper sub link 74 may be close to each other as illustrated in FIGS. 30 and 31. As illustrated in FIG. 31, the second tilted portion 734*b* of the first upper sub link 73 and the tilted portion 747 of the second upper sub link 74 may be in contact with each other in a fully opened state.

In the fully opened state as shown in FIG. 31, the sub insertion portion 745 of the second upper sub link 74 may be inserted into the sub recessed portion 733 of the second upper sub link 74, and the tilted portion 747 of the second upper sub link 74 may be in contact with the second tilted portion 743*b* of the first upper sub link 73. The rotation of the first upper sub link 73 and the second upper sub link 74 may be restricted so as not to rotate any longer in the clockwise direction, and the rotation of the upper door bracket 75 in the counterclockwise rotation may restricted.

A further rotation of the upper door 20 may be prevented, and the upper door 20 may be considered to be completely or fully open.

When the upper door 20 is fully opened, the upper link assembly 70 may be fully unfolded, and in this state, the upper main link 71 may droop or be deformed by the load of the upper door 20. Since the upper main link 71 may have a bent structure, the upper link assembly 70 may not be or be less deformed by the load of the upper door 20.

The first upper sub link 73 and the second upper sub link 74 may be supported by the upper connection link 72 to prevent the first upper sub link 73 and the second upper sub link 74 from drooping. The user may perform an operation of closing the upper door 20, and while the upper door 20 is closed, the upper link assembly 70 may operate in a reverse order of the above-described process.

Referring to FIGS. 32-35, when the user opens the lower door 30, the lower link assembly 80 starts to rotate. According to a rotation of the lower door 30 during opening and closing, the lower link assembly 80 may operate from the fully folded state of FIG. 32 to the fully unfolded state of FIG. 35. As an example, an angle between the front surface of the lower door 30 and the front surface of the cabinet 10 may be about 13° in FIG. 32, about 30° in FIG. 33, about 90° in FIG. 34, and about 130° in FIG. 35.

According to the user's manipulation for the lower door 30, the lower door 30 may rotate together along the rotational trajectory of the lower link assembly 80 of the multi-joint link hinge 60 and then be opened. The lower link assembly 80 may connect the lower door 30 to the cabinet 10 from the upper side. The lower link assembly 80 may be sequentially changed in state as illustrated in FIGS. 32 to 35 until the lower door 30 starts to rotate and then is fully opened.

The lower main link 81 may rotate in a counterclockwise direction with respect to the main rotation shaft 62 together with the opening of the lower door 30, and the lower connection link 82 may start to rotate in a counterclockwise direction with respect to the sub rotation shaft 63. Ends of the first lower sub link 83 and the second lower sub link 84 connected to the lower main link 81 may start to rotate in a clockwise direction. The lower door bracket 85 connected to the other ends of the first lower sub link 83 and the second lower sub link 84 may rotate in the counterclockwise direction.

When the lower main link 81, the first lower sub link 83, and the second lower sub link 84 are provided inside the lower main link 81, the lower main link 81, the first lower sub link 83, and the second lower sub link 84 may rotate while moving together with the lower main link 81. The lower connection link 82 may be provided under the first lower sub link 83 and the second lower sub link 84 to support the first lower sub link 83 and the second lower sub link 84, thereby preventing the first lower sub link 83 and the second lower sub link 84 from drooping.

The first lower sub link 83 and the second lower sub link 84 may rotate while being spaced apart from each other, and the first tilted portion 834*a* of the first lower sub link 83 and the tilted portions 847 of the second lower sub link 84 may face each other. While the lower main link 81 and the lower connection link 82 continuously rotate according to an opening of the lower door 30, the first lower sub link 83 and the second lower sub link 84 may also rotate together.

Figure 32:
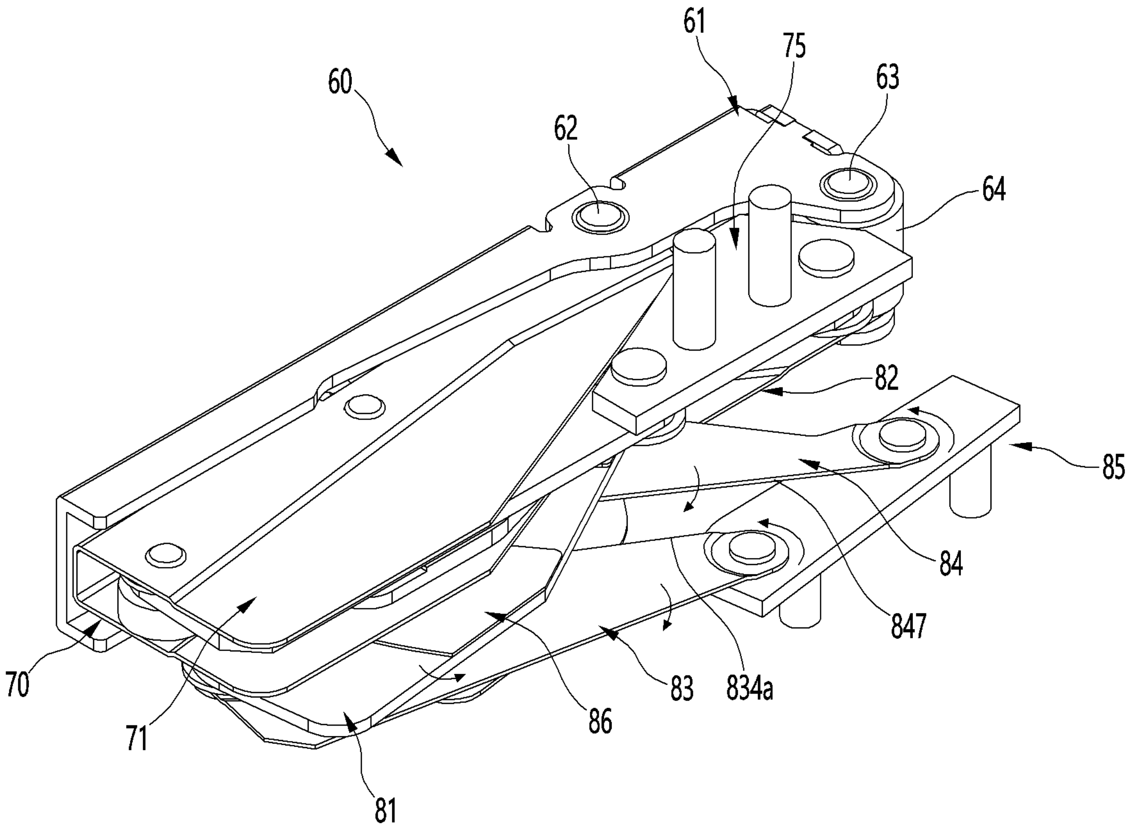
FIG. 32 is a view illustrating a state of the center hinge in a state in which the lower door is opened at a set angle.
Figure 33:
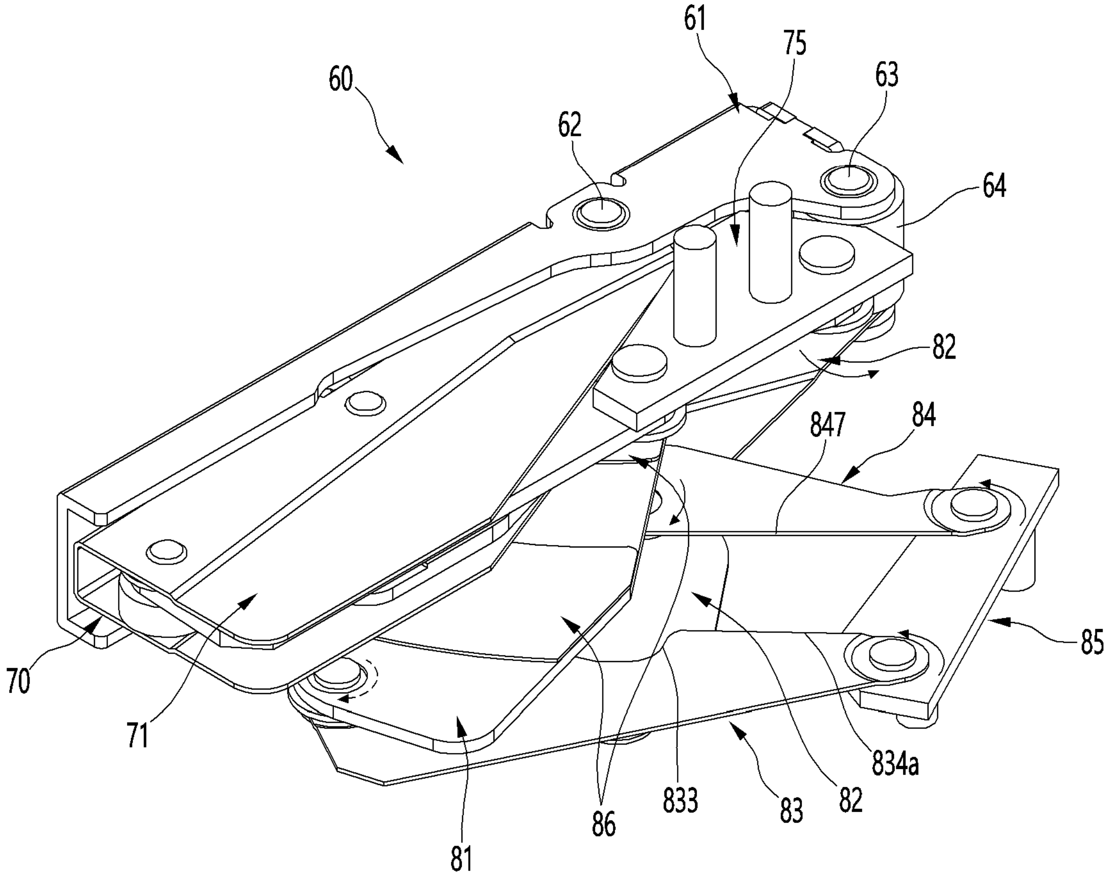
FIG. 33 is a view illustrating a state of the center hinge in a state in which the lower door is opened more than in FIG. 32.
Figure 34:
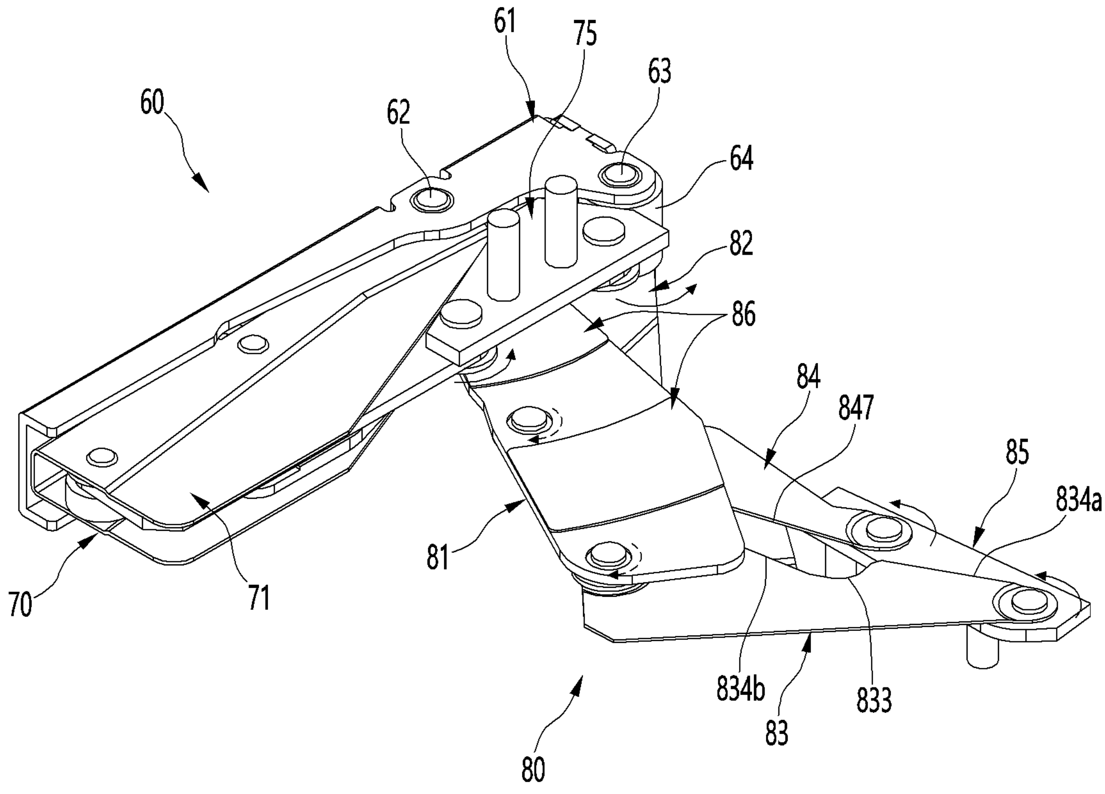
FIG. 34 is a view illustrating a state of the center hinger in a state in which the lower door is opened more than in FIG. 33.
Figure 35:
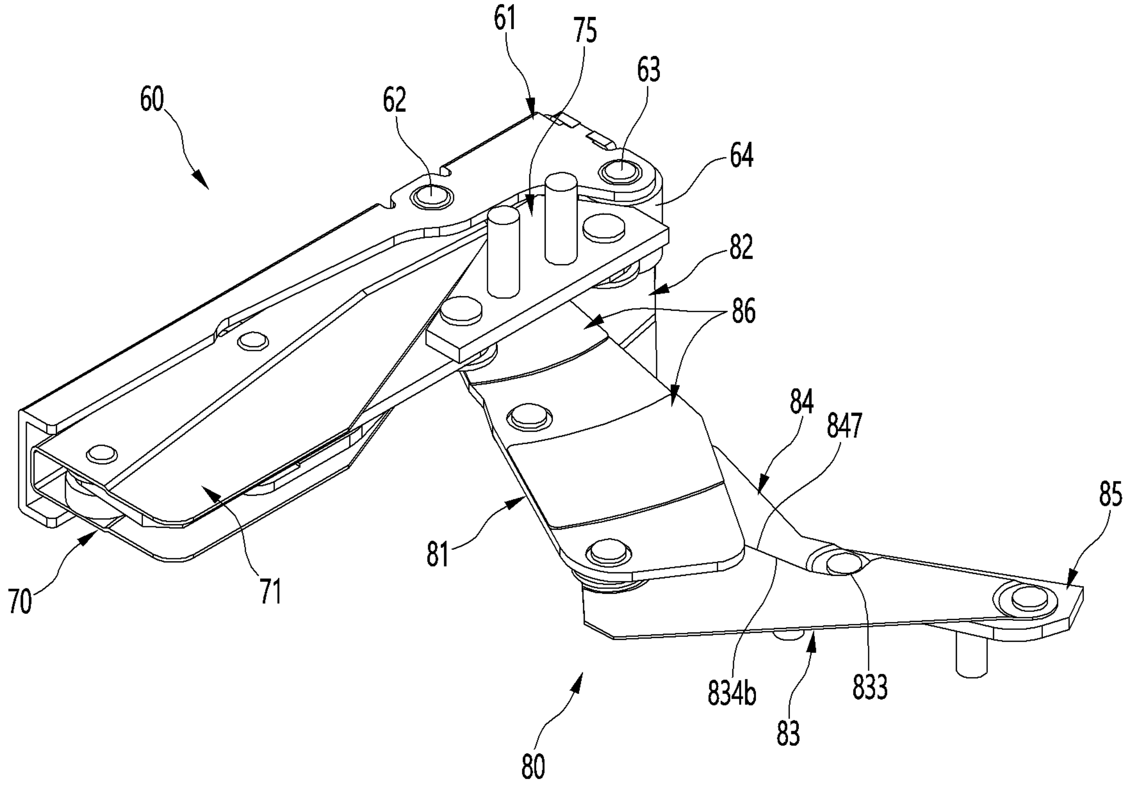
FIG. 35 is a view illustrating a state of the center hinge in a state in which the lower door is fully opened.

As illustrated in FIGS. 32-33, the first tilted portion 834*a* of the first lower sub link 83 and the tilted portion 847 of the second lower sub link 84 may be spaced away from each. When the lower link assembly 80 is further unfolded, as illustrated in FIGS. 34 and 35, the second tilted portion 834*b* of the first lower sub link 83 and the tilted portion 847 of the second lower sub link 84 may be close to each other as illustrated in FIGS. 30 and 31. Finally, the second tilted portion 834*b* of the first lower sub link 83 and the tilted portion 847 of the second lower sub link 84 may be in contact with each other.

FIG. 35 may indicate a state in which the lower door 30 is fully opened. The sub insertion portion 845 of the second lower sub link 84 may be inserted into the sub recessed portion 833 of the second lower sub link 84, and the tilted portion 847 of the second lower sub link 84 is in contact with the second tilted portion 843*b* of the first lower sub link 83. A rotation of the first lower sub link 83 and the second lower sub link 84 may be restricted so as not to rotate any longer in the clockwise direction, and the rotation of the lower door bracket 85 in the counterclockwise rotation is restricted. A further rotation of the lower door 30 may be prevented, and the lower door 30 may be considered to be fully opened.

When the lower door 30 is fully opened, the lower link assembly 80 may be fully unfolded. The first lower sub link 83 and the second lower sub link 84 may be supported from the lower side by the lower connection link 82 to prevent the first lower sub link 83 and the second lower sub link 84 from drooping. The user may close the lower door 30, and while the lower door 30 is closed, the lower link assembly 80 may operate in a reverse order of the above-described process.

In addition to the foregoing embodiment, the multi-joint link hinge according to various embodiments may be exemplified. In another embodiment, a combination of the upper link module or assembly and the lower link module or assembly of the multi-joint link hinge is different, but other detailed configurations may be the same or similar. Thus, the same or similar components are denoted using the same reference numerals and detailed descriptions thereof may be omitted to prevent duplication of description.

Figure 36:
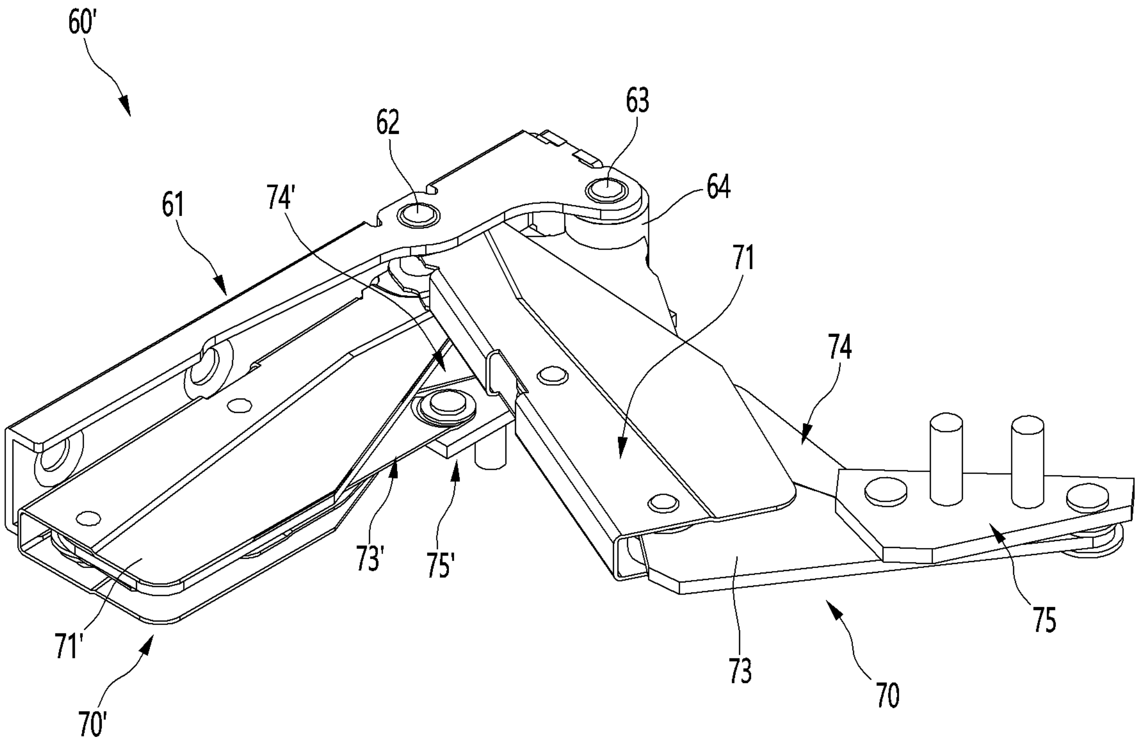
FIG. 36 is a perspective view of a center hinge according to another embodiment.

Referring to FIG. 36, a multi-joint link hinge 60' according to another embodiment may include a hinge bracket 61 fixed and mounted to a cabinet 10, and an upper link assembly 70 and a lower link assembly 70' arranged vertically inside the hinge bracket 61. A structure and shape of the hinge bracket 61 and the upper link assembly 70 may be the same as or similar to those of the above-described embodiment.

The hinge bracket 61 may have the same structure as the hinge bracket 61 according to the foregoing embodiment. A vertical width of the hinge bracket 61 may be predetermined or prescribed to receive both the upper link assembly 70 and the lower link assembly 70'. Each of the upper link assembly 70 and the lower link assembly 70' may have a thickness at which each of the upper link assembly 70 and the lower link assembly 70' may be rotatable within an accommodation or receiving space inside the hinge bracket 61. Each of the upper link assembly 70 and the lower link assembly 70' may have a thickness less than that in the foregoing embodiment. The hinge bracket 61 may have a larger vertical width within a range in which the hinge bracket 61 is capable of being attached to a barrier 11, and in this case, the lower link assembly 70', having the same structure and same or similar thickness as the upper link assembly 70 in this embodiment, may be mounted.

The upper link assembly 70 may include an upper main link 71, an upper connection link 72, a first upper sub link 73, a second upper sub link 74, and an upper door bracket 75, which are the same as those according to the previous embodiment.

The lower link assembly 70' may have the same structure as the upper link assembly 70. The lower link assembly 70' may also include a lower main link 71' having a bent structure like the upper main link 71, a first lower sub link 73' provided inside the lower main link 71', a second lower sub link 74', and a lower connection link. These configurations may differ only in their names, and may have the same shape as the upper main link 71, the first upper sub link 73, the second upper sub link 74, and the upper connecting link 72, respectively.

Since the lower link assembly 70' may be connected to a top surface of the lower door 30, a lower shaft of the lower door bracket 75' may be provided to face a lower side. The lower link assembly 70' may have the same structure and shape as the upper link assembly 70, but a thickness of the lower main link 71' may be slightly thinner than the thickness of the upper main link 71.

In another embodiment, a combination of the upper link module and the lower link module constituting the multi-joint link hinge may be different, but other detailed configurations may be the same or similar. Thus, the same components are denoted using the same reference numerals or detailed descriptions thereof will be omitted to prevent duplication of description.

Figure 37:
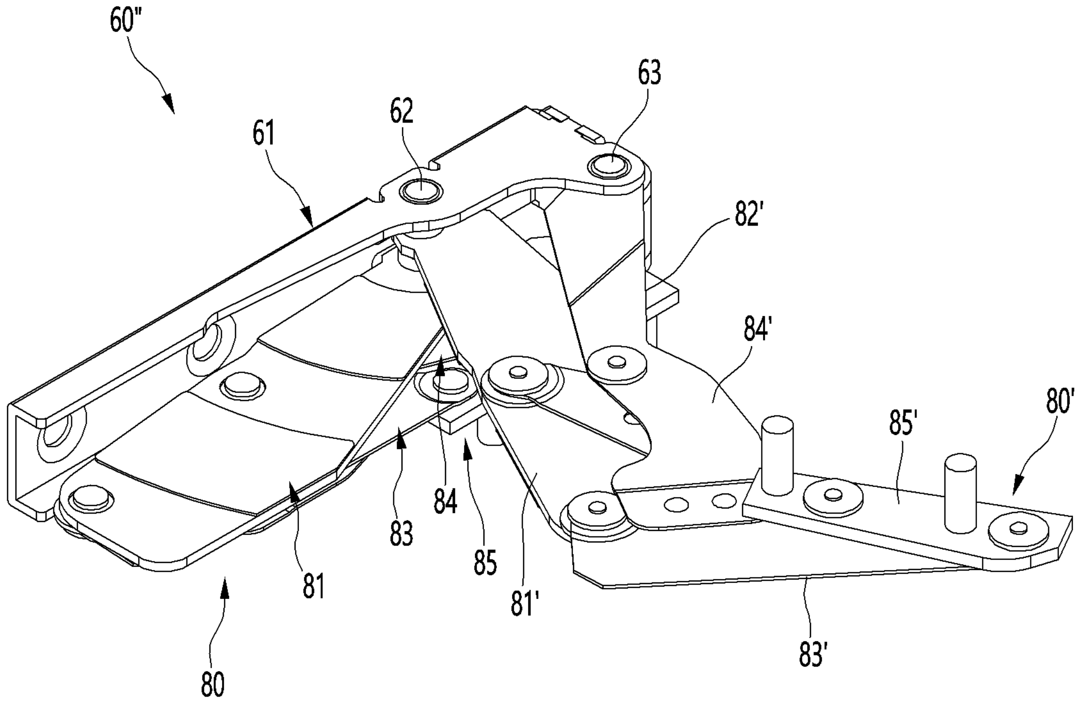
FIG. 37 is a perspective view of a center hinge according to further another embodiment.

Referring to FIG. 37, a multi-joint link hinge 60' according to another embodiment may include a hinge bracket 61 fixed and mounted to a cabinet 10 and an upper link assembly 80 and a lower link assembly 80' vertically arranged inside the hinge bracket 61. A structure and shape of the hinge bracket 61 and the lower link assembly 80 may be the same as or similar to those of the above-described embodiment.

The hinge bracket 61 may have an accommodation or receiving space in which the upper link assembly 80' and the lower link assembly 80 are provided. Each of the upper link assembly 80' and the lower link assembly 80 may have a plate shape, and a vertical thickness of the hinge bracket 61 may be thinner than that of the previous embodiments.

When the thickness of the hinge bracket 61 is thinner, a multi-joint link hinge 60" may be more compact. A thickness of the barrier 11 may be thinner, and an space between an upper door 20 and a lower door 30 may be narrower to improve an outer appearance.

The lower link assembly 80 may include a lower main link 81, a lower connection link 82, a first lower sub link 83, a second lower sub link 84, and a lower door bracket 85, which are the same as or similar to those according to the previous embodiment of the lower link assembly 80.

The upper link assembly 80' may have the same structure as the lower link assembly 80. The upper link assembly 80' may also include an upper main link 81' having a plate-shaped structure like the lower link assembly 80, and a first upper sub link 83' coupled to the upper main link 81', a second upper sub link 84', and an upper connection link 82. These configurations may differ only in their names and may have the same or similar shape as the lower main link 81, the first lower sub link 83, the second lower sub link 84, and the lower connecting link 82, respectively. Since the upper link assembly 80' may to be connected to a bottom surface of the upper door 20, an upper shaft of the upper door bracket 85' may be provided to face an upper side.

In addition to the foregoing embodiments, a refrigerator according to various embodiments may be exemplified. Such embodiment is different only in structure of the cabinet and the door, while configurations of the multi-joint link hinge may be the same as or similar to the previous embodiments. The same components are denoted using the same reference numerals and/or detailed descriptions thereof will be omitted to prevent duplication of description.

Figure 38:
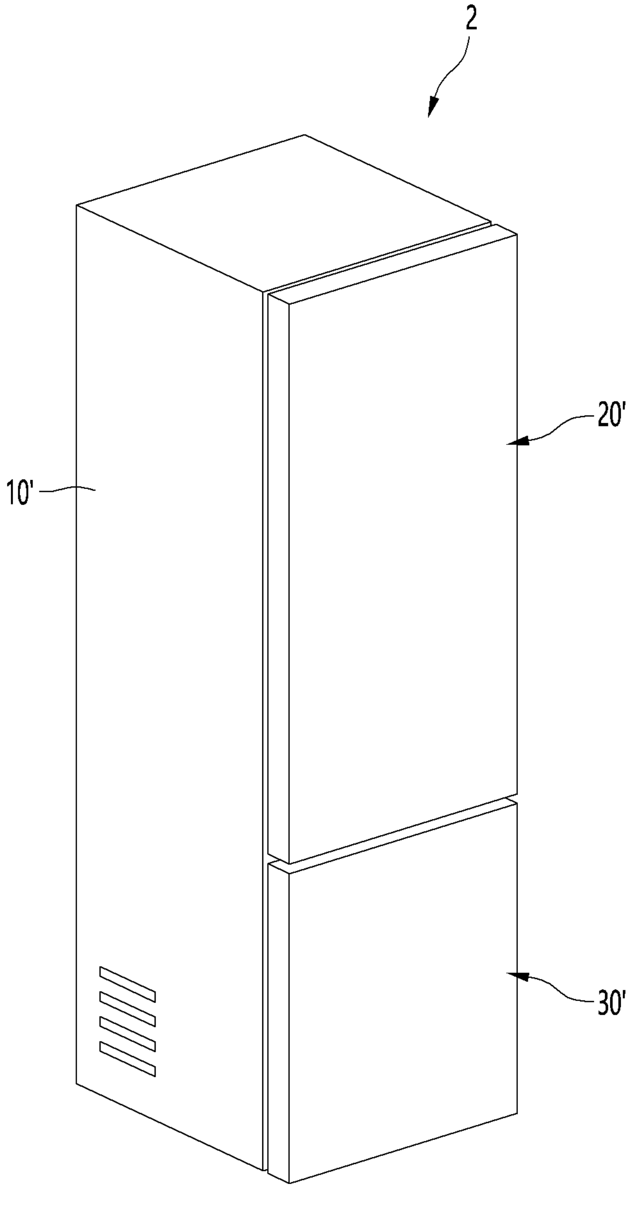
FIG. 38 is a perspective view of a refrigerator according to another embodiment.
Figure 39:
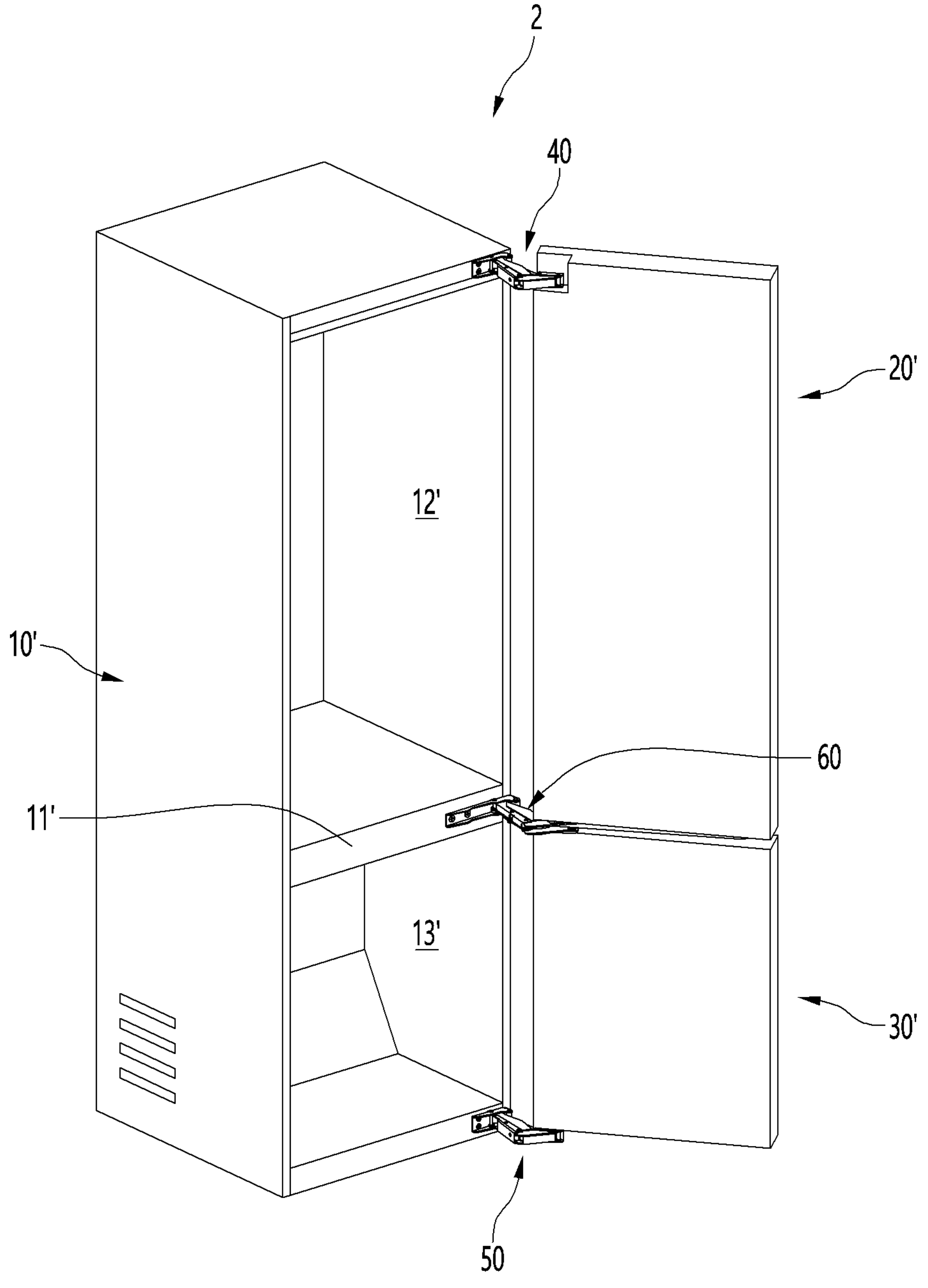
FIG. 39 is a perspective view illustrating a state in which an upper door and a lower door of the refrigerator are opened.

Referring to FIGS. 38-39, a refrigerator 1' according to another embodiment may include a cabinet 10' in which a storage space is defined and doors 20' and 30' that open and close the storage space. The storage space within the cabinet 10' may be vertically partitioned by a barrier 11' to provide a refrigerating compartment 12' at an upper side and a freezing compartment 13' at a lower side. The doors 20' and 30' may include a refrigerating compartment door 20' and a freezing compartment door 30', which open and close the refrigerating compartment 12' and the freezing compartment 13', respectively. The refrigerating compartment door 20' and the freezing compartment door 30' may be rotatably mounted to the cabinet 10'.

An upper hinge 40, a lower hinge 50, and a multi-joint link hinge 60 may be provided on a front surface of the cabinet 10'. A structure of each of the upper hinge 40, the lower hinge 50, and the multi-joint link hinge 60 may be the same as or similar to those of the previously described embodiments, and thus detailed descriptions thereof will be omitted.

The refrigerator 1' may be provided to be embedded in furniture, fixtures, or a wall, or a plurality of refrigerators 1' may be provided side by side or provided side by side with other home appliances. Since a periphery of the door 20' and 30' are provided very close to the furniture or the wall, other refrigerators, or home appliances, an interval therebetween may be substantially narrowed.

The refrigerating compartment door 20' and the freezing compartment door 30' may rotate so as not to interfere with the adjacent furniture or walls, other refrigerators, or the home appliances. The upper hinge 40, the lower hinge 50, and the multi-joint link hinge 60 may be configured as a combination of a plurality of links, and while the upper hinge 40, the lower hinge 50, and the multi-joint link hinge 60 operate, the doors 20' and 30' may be configured to rotate along a set trajectory that does not interfere with the furniture or wall, other refrigerators, or home appliances.

The multi-joint link hinge 60 may be mounted on the barrier 11' to independently support the refrigerating compartment door 20' and the freezing compartment door 30', and the refrigerating compartment door 20' and the freezing compartment door 30' may rotate by the multi-joint link hinge 60. The multi-joint link hinge 60 may be mounted on the barrier 11' having a narrow vertical width, and in particular, may have a compact structure and thus have a mounting structure in which a distance between a lower end of the refrigerating compartment door 20' and an upper end of the freezing compartment door 30' is minimized.

Even when weights of the doors 20' and 30', which respectively shield the refrigerating compartment 12' and the freezing compartment 13', are heavy, drooping may not occur, and an interference between upper link modules 70 and 70' and lower link modules 80 and 80', which may be provided in the multi-joint link hinges 60, 60', and/or 60" may be prevented, facilitating a stable and smooth opening/closing operation.

The structure of the multi-joint link hinge 60 connecting the cabinet 10 of the refrigerator 1 to the doors 20 and 30 has been described as an example, but are not limited thereto. For example, the structure of the multi-joint link hinge may be applied to other home appliances in addition to the refrigerator. When the doors are arranged vertically, the multi-joint link hinge 60 may be provided between an upper door and a lower door to be connected to the upper door and the lower door, respectively.

Embodiments disclosed herein may provide a multi-joint link hinge. The multi-joint link hinge may have a structure in which an upper link module or assembly rotatably connects an upper door to one hinge bracket and a lower link module or assembly rotatably connects a lower door to one hinge bracket. The upper and lower link modules may be coupled to each other. The upper link module and the lower link module may be configured by coupling the plurality of links to allow the user to more easily open and close the upper and lower doors because a rotation of the doors do not interfere with the furniture, the walls, or the home appliances.

Due to the link structure of the center hinge, when the upper door and the lower door are closed, a distance between the refrigerator and the furniture, the walls, or the home appliances may be reduced or minimized.

The main link module may have relatively thicker thickness than the lower link module, and the upper link module and/or the lower link module supporting the upper door, which may carry a relatively higher load in the limited space of the center hinge, may have a thicker thickness to prevent the upper link module from being deformed or drooping even when used for a long time.

The upper main link of the upper link module may be molded by bending the metal plate-like material to ensure or reinforce strength. While increasing in thickness of the upper main link, the upper connection link, the first upper sub link, and the second upper sub link may be received within the upper main link so that a strength in limited height specification may be satisfied, and thickness may be reduced or minimized.

The upper link module may include the upper connection link supporting the first upper sub link and the second upper sub link, and the lower link module may include the connection link supporting the first lower sub link and the second lower sub link. An interference due to the drooping of the upper link and the lower link may be prevented even in the rotation structure of the upper door and the lower door, each of which has a long operation distance and the large load, by having the plurality of link structures according to the embodiment. The opening and closing operations of the upper door and the lower door may be secured without interfering with each other.

The upper link module and the lower link module may be provided inside the hinge bracket in the folded state, and each of the links may have the tilted structure corresponding to each other so that the links have the hexahedral shape in the fully folded state. When the upper link module and the lower link module are folded, the size of each of the upper link module and the lower link module may be maintained in compact state, and due to this structure, the mounting space may be minimized or reduced, and the link modules may be prevented from being exposed to the outside.

The upper link module and the lower link module may be provided in the region inside a vertical height of the hinge bracket, and a thickness of each of the link modules may be reduced or minimized by the bent structure of the upper main link and the lower main link structure. A center hinge may be implemented to be slimmer, and an interval between the upper door and the lower door on which the center hinge is mounted may be minimized to improve the outer appearance. Due to the slim center hinge structure, the exposure of the center hinge between the upper door and the lower door may be minimized to further improve the outer appearance.

Since a vertical width or height of the center hinge may be reduced or minimized, the center hinge may be easily mounted on the front surface of the barrier having the limited thickness. Since the center hinge may be provided in the space between heating members such as hot gas or a heater provided in the barrier, when assembled, the interference with the heating member may be prevented to significantly improve the workability.

Since the thickness of the center hinge is reduced or minimized, there may be no need to secure the additional thickness of the barrier, and thus, the storage capacity of each of the upper storage space and the lower storage space may be prevented from being decreased by the barrier.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Embodiments disclosed herein may include a multi-joint link hinge which prevents an interference with adjacent objects and easily opens and close an upper door and a lower door, and a refrigerator including the multi-joint link hinge. The multi-joint link hinge may prevent an upper door from drooping. The multi-joint link hinge may be capable of securing opening and closing operability of an upper door and a lower door.

The multi-joint link hinge may have compact structure. The multi-joint link hinge may have a slim thickness. The multi-joint link hinge may have improved installation workability and convenience.

Embodiments disclosed herein may be implemented as a multi-joint link hinge including a hinge bracket provided with a base portion, in which a plurality of screw coupling holes are defined, and a plurality of side portions, which protrude from the base portion and are spaced apart from each other in a vertical direction. A plurality of link modules may be vertically arranged between the side portions and axially coupled to the hinge bracket by a rotation shaft. A door bracket may be axially coupled to each of the plurality of link modules.

The hinge bracket may be made of a metal material, and the side portions may be bent forward from upper and lower ends of the base portion, respectively. The multi-joint link hinge may further include a shielding portion that is bent forward from each of the ends of the base portion and connected to each of the side portions to shield a space between the side portions.

The rotation shaft may be coupled to pass through the side portions and sequentially pass through the plurality of link modules. A spacer penetrated by the rotation shaft and configured to support the plurality of link modules may be provided between side portions so that a set or predetermined distance or interval between the plurality of link modules is maintained. A spacer insertion groove may be defined in a circumferential surface of the spacer, and each of the link modules may be penetrated by the rotation shaft in a state of being inserted onto the spacer insertion groove.

Each of the plurality of link modules may be configured through coupling of a plurality of links. The rotation shaft may include a main rotation shaft and a sub rotation shaft. The main rotation shaft may be configured to pass through the side portions and one link of the plurality of links constituting the plurality of link modules. The sub rotation shaft may be configured to pass through the side portions, the spacer, and the other link of the plurality of links constituting the plurality of link modules at one side spaced apart from the main rotation shaft.

The plurality of link modules may be configured as a combination of a plurality of links to connect the hinge bracket to the door bracket. The plurality of link modules may include an upper link module provided in a space between the side portions to support an upper door at a lower side, and a lower link module provided under the upper link module to support a lower door at an upper side.

The upper link module may have a thickness greater than that of the lower link module. Each of the upper link module and the lower link module may be configured through coupling of the links having the same length and number.

The upper link module may include an upper main link that is axially coupled to the hinge bracket, a first upper sub link that is axially coupled to each of one side of the upper main link and one side of the door bracket, a second upper sub link that is axially coupled to each of the other side of the upper main link and the other side of the door bracket, and an upper connection link that is axially coupled to the hinge bracket, one side of the upper main link, and another side of the second upper sub link.

The upper main link may be made of a plate-shaped metal material and may be bent several times to define a space in which the first upper sub link, the second upper sub link, and the connection link are accommodated or received. The upper main link may include a top surface and a bottom surface spaced apart from each other and a connection surface configured to connect one end of the top surface to one end of the bottom surface. The first upper sub link, the second upper sub link, and the upper connection link may be provided in a space between the top and bottom surfaces and the connection surface. The first upper sub link, the second upper sub link, and the connection link may be provided in the space in a state of being folded. The upper connection link may be provided under the first upper sub link and the second upper sub link and extend to support the first upper sub link and the second upper sub link at a lower side.

The lower link module may include a lower main link that is axially coupled to the hinge bracket, a first lower sub link that is axially coupled to each of one side of the lower main link and one side of the door bracket, a second lower sub link that is axially coupled to each of the other side of the lower main link and the other side of the door bracket, and a lower connection link that is axially coupled to the hinge bracket, one side of the lower main link, and another side of the second lower sub link. The lower main link may have a plate shape having a thickness less than that of the upper main link.

Embodiments disclosed herein may be implemented as a refrigerator including a cabinet in which an upper storage space and a lower storage space are defined, an upper door configured to open and close the upper storage space through rotation thereof, an upper hinge configured to connect an upper end of the upper door to the cabinet so that the upper door is rotatable, a lower door configured to open and close the lower storage space through rotation thereof, a lower hinge configured to connect a lower end of the lower door to the cabinet so that lower door is rotatable, and a multi-joint link hinge provided between the upper hinge and the lower hinge. The multi-joint link hinge may include a hinge bracket provided with a base portion, in which a plurality of screw coupling holes are defined to be coupled to a cabinet, and a plurality of side portions which protrude from the base portion and are spaced apart from each other in a vertical direction. The multi-join link hinge may further include a plurality of link modules vertically provided between the side portions and axially coupled to the hinge bracket, and a door bracket which is axially coupled to each of the plurality of link modules and coupled to a door configured to open and close the cabinet.

The plurality of link modules may be configured as a combination of a plurality of links to connect the hinge bracket to the door bracket, and the plurality of link modules may include an upper link module provided between the side portions to support the upper door at a lower side, and a lower link module provided under the upper link module to support the lower door at an upper side. The upper link module may have a thickness greater than that of the lower link module.

The cabinet may include a barrier configured to partition the upper storage space and the lower storage space from each other, and the hinge bracket may be coupled to a front surface of the barrier. A heating member passing through the barrier may be provided on a circumference or outer side of each of the upper storage space and the lower storage space, and the hinge bracket may be mounted between the heating members that are provided vertically. A distance between a front lower end of the upper door and a front upper end of the lower door may be less than a thickness of the multi-joint link hinge.

Embodiments disclosed herein may be implemented as a refrigerator including a multi-joint link hinge. The multi-joint link hinge may include a hinge bracket provided between an upper door and a lower door, an upper link module having a plurality of links and configured to rotatably connect the hinge bracket to a lower end of the upper door, and a lower link module having a plurality of links and configured to rotatably connect the hinge bracket to an upper end of the lower door.

Embodiments disclosed herein may be implemented as a refrigerator including a multi-joint link hinge. The multi-joint link hinge may include a hinge bracket provided between an upper door and a lower door, an upper link module having a plurality of links and configured to rotatably connect the hinge bracket to a lower end of the upper door, a lower link module having a plurality of links and configured to rotatably connect the hinge bracket to an upper end of the lower door. The upper link module and the lower link module may be vertically provided, and the upper link module may be a thicker thickness.

Embodiments disclosed herein may be implemented as a refrigerator including a multi-joint link hinge. The multi-joint link hinge may include a hinge bracket mounted on a cabinet and an upper link module and a lower link module, which may be mounted on the hinge bracket and having a plurality of links. The upper link module and the lower link module may include a main link connected to the hinge bracket, a door bracket connected to an upper door or a lower door, and a first sub link and a second sub link, which may be configured to connect the main link to the door bracket. A connection link may be further coupled to the hinge bracket, and the connection link may be configured to support the first sub link and the second sub link at a lower side.

Embodiments disclosed herein may be implemented as a refrigerator including a multi-joint link hinge. The multi-joint link hinge may include a hinge bracket coupled to a cabinet, an upper link module having a plurality of links and configured to rotatably connect the hinge bracket to a lower end of the upper door, and a lower link module having a plurality of links and configured to rotatably connect the hinge bracket to an upper end of the lower door. The upper link module and the lower link module may be received in the hinge bracket in a state of being completely folded.

Embodiments disclosed herein may be implemented as a refrigerator including a multi-joint link hinge. The multi-joint link hinge may include a hinge bracket coupled to a cabinet, an upper link module having a plurality of links and configured to rotatably connect the hinge bracket to a lower end of the upper door, and a lower link module having a plurality of links and configured to rotatably connect the hinge bracket to an upper end of the lower door. The upper link module and the lower link module may be vertically provided inside the hinge bracket.

Embodiments disclosed herein may be implemented as a refrigerator including a multi-joint link hinge. The multi-joint link hinge may include a hinge bracket coupled to a barrier, an upper link module having a plurality of links and configured to rotatably connect the hinge bracket to a lower end of the upper door, and a lower link module having a plurality of links and configured to rotatably connect the hinge bracket to an upper end of the lower door. The hinge bracket may have a size less than a distance between a pair of heating members provided in the barrier and is provided between the pair of heating members.

A direction facing a front surface of the door illustrated in FIG. 1 may be defined as a front direction, a direction facing the inside of the refrigerator with respect to the front surface of the door may be defined as a rear direction, a direction facing a bottom surface on which the refrigerator may be installed may be defined as a downward direction, and a direction that may be away from the bottom surface may be defined as an upward direction.

Embodiments disclosed herein may be implemented as a multi-joint link hinge comprising a first bracket, a first linkage, a second linkage, at least one rotation shaft, and a second bracket. The first bracket may include a base plate having a plurality of screw holes and first and second side walls extending from the base plate and spaced apart from each other in a first direction. The first and second linkages may be arranged in the first direction and configured to be received between the first and second side walls. The at least one rotation shaft may rotatably couple the first and second linkages to the first bracket. The second bracket may be rotatably coupled to the first linkage.

The first bracket may be made of a metal material. The first and second side walls may extend in a second direction from first and second sides of the base plate, respectively, the first and second sides being spaced apart in the first direction. A cover may extend from the base plate and be connected to each of the first and second side walls to at least partially cover a space between the first and second side walls.

The rotation shaft may pass through the first and second side walls and the first and second linkages. The rotation shaft may be inserted through a space. The spacer may be configured maintain a prescribed distance between the first and second linkages.

An outer surface of the spacer may include a groove. The first linkage may include a first connection link configured to be inserted into the spacer groove.

The at least one rotation shaft may include a main rotation shaft and a sub rotation shaft. The main rotation shaft may be configured to pass through the side walls, a first main link of the first linkage, and a second main link of the second linkage. The sub rotation shaft may be configured to pass through the side walls, the spacer, a first connection link of the first linkage, and a second connection link of the second linkage. The main and sub rotation shafts may be spaced apart from each other.

The first direction may be a vertical direction and the first linkage may be provided above the second linkage. The first linkage may be configured to couple to a first door via the second bracket, and the second linkage being configured to couple to a second door provided below the first door via a third bracket.

The first linkage may have a thickness greater than that of the second linkage. The first linkage may have a plurality of first links, the second linkage may have a plurality of second links, a number of first links may be equal to a number of second links, and lengths of the respective first links are equal to lengths of the respective second links.

The first direction may be a vertical direction. The first linkage may be provided above the second linkage. The first linkage may include an upper main link that may be axially coupled to the first bracket, a first upper sub link that may be axially coupled to a first side of the upper main link and axially coupled to a first side of the second bracket, a second upper sub link that may be axially coupled to a second side of the upper main link and axially coupled to a second side of the second bracket, and an upper connection link that may be axially coupled to the first bracket, the first side of the upper main link, and a side of the second upper sub link.

The upper main link may be made of a plate-shaped metal material and may be bent several times to define a space in which the first upper sub link, the second upper sub link, and the connection link are received and arranged in a vertical direction.

The upper main link may include a top surface, a bottom surface provided below the top surface, and a connection surface connecting the top surface to the bottom surface. The first upper sub link, the second upper sub link, and the upper connection link may be provided between the top and bottom surfaces. The first upper sub link, the second upper sub link, and the connection link may be configured to be provided in a space defined by the top, bottom, and connection surfaces in a folded state.

The upper connection link may be provided under the first upper sub link and the second upper sub link. The upper connection link may be configured to extend to support lower sides of the first upper sub link and the second upper sub link.

The second linkage may include a lower main link that may be axially coupled to the first bracket, a first lower sub link that may be axially coupled to a first side of the lower main link and a first side of a third bracket, a second lower sub link that may be axially coupled to a second side of the lower main link and a second side of the third bracket, and a lower connection link that may be axially coupled to the first bracket, the first side of the lower main link, and a side of the second lower sub link. The lower main link may have a plate shape having a thickness less than that of the upper main link.

Embodiments disclosed herein may be implemented as a refrigerator comprising a cabinet having an upper storage space and a lower storage space, an upper door configured to open or close the upper storage space, an upper hinge configured to rotatably connect a top of the upper door to the cabinet, a lower door configured to open or close the lower storage space, a lower hinge configured to rotatably connect a bottom of the lower door to the cabinet, and a multi-joint link hinge provided between the upper hinge and the lower hinge. The multi-joint link hinge may comprise a hinge bracket provided with a base plate and first and second side walls extending from the base plate to be spaced apart from each other in a vertical direction, the base plate being configured to be coupled to the cabinet, an upper linkage rotatably coupled to the upper door, and a lower linkage provided below the upper linkage and rotatably coupled to the lower door, the upper and lower linkages configured to be provided between the first and second side walls and axially coupled to the hinge bracket.

The upper linkage may be configured to support the upper door at a lower side. The lower linkage may be configured to support the lower door at an upper side. The upper linkage may have a thickness greater than that of the lower linkage.

The cabinet may include a barrier configured to partition the upper storage space from the lower storage space. The hinge bracket may be coupled to the barrier.

A first heating member may pass through the barrier to surround the upper storage space. A second heating member may pass through the barrier to surround the lower storage space. The second heating member may be vertically spaced apart from the first heating member. The hinge bracket may be mounted between the first and second heating members.

A distance between a front lower end of the upper door and a front upper end of the lower door may be less than a thickness of the multi-joint link hinge.

Embodiments disclosed herein may be implemented as a home appliance having a multi-joint link hinge. The home appliance may include a cabinet having an upper storage space and a lower storage space, an upper door configured to open or close the upper storage space, an upper hinge configured to rotatably connect a top of the upper door to the cabinet, a lower door configured to open or close the lower storage space, and a lower hinge configured to rotatably connect a bottom of the lower door to the cabinet. The multi-joint link hinge may be provided between the upper hinge and the lower hinge.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:

a cabinet having an upper storage space and a lower storage space;

an upper door configured to open or close the upper storage space;

an upper hinge configured to rotatably connect a top of the upper door to the cabinet;

a lower door configured to open or close the lower storage space;

a lower hinge configured to rotatably connect a bottom of the lower door to the cabinet; and a center hinge provided between the upper hinge and the lower hinge, wherein the center hinge comprises:

a hinge bracket mounted at the cabinet;

an upper link module rotatably coupled to the hinge bracket and configured to rotate the upper door relative to the cabinet; and a lower link module disposed below the upper link module and rotatably coupled to the hinge bracket and configured to rotate the lower door relative to the cabinet, wherein the upper link module comprises:

a plurality of upper links rotatably coupled to the hinge bracket; and an upper door bracket mounted to a lower surface of the upper door, and coupled to at least one of the plurality of upper links, wherein the lower link module comprises:

a plurality of lower links disposed below the upper link module and rotatably coupled to the hinge bracket; and a lower door bracket mounted to an upper surface of the lower door, and coupled to at least one of the plurality of lower links, wherein the plurality of lower links comprise:

a lower main link rotatably coupled to the hinge bracket, and the lower main link faces a bottom surface of the upper link module;

a first lower sub link rotatably coupled to one side of the lower main link and one side of the lower door bracket;

a second lower sub link rotatably coupled to another side of the lower main link and another side of the lower door bracket; and a lower connection link rotatably coupled to the lower main link and the second lower sub link, and wherein a support is disposed on an upper surface of the lower main link, the support is disposed between shafts that separately pass through at least two of the lower links, and the support selectively contacts with a lower surface of the upper link module depending on a load of the upper door.

2. The refrigerator according to claim 1, wherein the support is in contact with the upper link module when the upper link module downward droops during rotation of the upper link module, and the support is made of material having abrasion resistance and lubricity.

3. The refrigerator according to claim 2, wherein the support includes a plurality of supporters spaced apart from each other on the upper surface of the lower link module.

4. The refrigerator according to claim 2, wherein the support is made of engineering plastic or polyoxymethylene (POM) material.

5. The refrigerator according to claim 1, wherein the lower main link, the first lower sub link, the second lower sub link, and the lower connection link are each separately made based on a plate-shaped metal material.

6. The refrigerator according to claim 1, wherein the upper link module comprises:

an upper main link rotatably coupled to the hinge bracket;

a first upper sub link rotatably coupled to a first side of the upper main link, and the first upper sub link is rotatably coupled to a first side of the upper door bracket;

a second upper sub link rotatably coupled to a second side of the upper main link, and the second upper sub link is rotatably coupled to a second side of the upper door bracket; and an upper connection link rotatably coupled to the hinge bracket, the first side of the upper main link, and the second upper sub link.

7. The refrigerator according to claim 6, wherein the upper main link is made based on a plate-shaped metal material that is bent a plurality of times so to define a space configured to receive the first upper sub link, the second upper sub link, and the upper connection link which are arranged in a vertical direction.

8. The refrigerator according to claim 7, wherein a thickness of the upper link module is greater than a thickness of the lower link module.

9. The refrigerator according to claim 1, wherein a distance between a front lower end of the upper door and a front upper end of the lower door is less than a thickness of the center hinge, and at least a portion of the center hinge is covered by the upper door or the lower door.

10. The refrigerator according to claim 9, wherein the upper surface of the lower door includes a recess to accommodate a lower part of the center hinge.

11. The refrigerator according to claim 10, wherein the recess is configured to accommodate at least a portion of the lower link module.

12. The refrigerator according to claim 11, wherein a lower end of the upper link module is disposed higher than the recess.

13. The refrigerator according to claim 1, wherein the upper door includes a frame configured to define a bottom surface of the upper door, and the frame includes an upper link mounting recess to couple with the upper door bracket.

14. The refrigerator according to claim 1, wherein the lower door includes a frame configured to define a top surface of the lower door, and the frame includes a lower link mounting recess to couple with the lower door bracket.

15. The refrigerator according to claim 1, wherein the hinge bracket includes:

a base mounted to a front surface of the cabinet;

a first wall that extends from an upper edge of the base; and a second wall that extends from a lower edge of the base, and the second wall is spaced apart from the first wall, and wherein the upper link module and the lower link module are rotatably coupled to the first and second walls.

16. The refrigerator according to claim 15, wherein the hinge bracket includes a receiving space between the first wall and the second wall to accommodate the upper link module and the lower link module when the upper door and the lower door are closed.

17. The refrigerator according to claim 15, wherein the hinge bracket includes a shield disposed at an end of the base and is coupled to the first wall and the second wall to cover part of the upper link module and part of the lower link module.

18. The refrigerator according to claim 15, wherein a shaft penetrates the first wall, the upper link module, the lower link module, and the second wall so as to rotatably couple the upper link module and the lower link module to the hinge bracket.

19. A refrigerator comprising:

a cabinet having an upper storage space and a lower storage space;

an upper door configured to open or close the upper storage space;

an upper hinge to couple a top of the upper door and the cabinet;

a lower door configured to open or close the lower storage space;

a lower hinge to couple a bottom of the lower door and the cabinet; and a center hinge provided between the upper hinge and the lower hinge, wherein the center hinge includes:

a hinge bracket, an upper link module rotatably coupled to the hinge bracket and configured to rotate the upper door relative to the cabinet, and a lower link module rotatably coupled to the hinge bracket and configured to rotate the lower door relative to the cabinet;

wherein the upper link module includes:

an upper door bracket to mount to the upper door, and a plurality of upper links configured to provide rotation of the upper door, wherein the lower link module includes:

a lower door bracket to mount to the lower door, and a plurality of lower links to provide rotation of the lower door, the plurality of lower links including a lower main link having a plate shape, a first lower sub link, a second lower sub link, and a lower connection link, the first lower sub link and the second lower sub link are rotatably connected to each other between the lower main link and the lower door bracket, and the lower connection link connecting the second lower sub link to the hinge bracket, wherein at least two lubricity supports are disposed on part of a surface of the lower main link having the plate shape and the at least two lubricity supports to face the upper link module when the upper door and the lower door are both closed, and the at least two lubricity supports are to physically contact the upper link module and thereby provide space between the surface of the lower main link and the upper link module during rotation of the upper link module.

* * * * *